US010572740B2

(12) United States Patent
Ribeiro et al.

(10) Patent No.: US 10,572,740 B2
(45) Date of Patent: Feb. 25, 2020

(54) METHOD AND SYSTEM FOR DETECTING A THREAT OR OTHER SUSPICIOUS ACTIVITY IN THE VICINITY OF A MOTOR VEHICLE

(71) Applicant: 360AI Solutions LLC, Hauppauge, NY (US)

(72) Inventors: Claudio Santiago Ribeiro, Evanston, IL (US); Kolja S. Hegelich, Dorsten (DE); Ralf Niebecker, Parkland, FL (US); Gustavo D. Leizerovich, Aventura, FL (US)

( * ) Notice: Subject to any disclaimer, the term of this patent is extended or adjusted under 35 U.S.C. 154(b) by 0 days.

(21) Appl. No.: 16/505,620

(22) Filed: Jul. 8, 2019

(65) Prior Publication Data

US 2019/0354776 A1 Nov. 21, 2019

Related U.S. Application Data

(63) Continuation-in-part of application No. 15/981,838, filed on May 16, 2018, now Pat. No. 10,366,586.
(Continued)

(51) Int. Cl.
*G08B 13/00* (2006.01)
*G06K 9/00* (2006.01)
(Continued)

(52) U.S. Cl.
CPC ...... *G06K 9/00771* (2013.01); *G06K 9/00711* (2013.01); *G06T 7/246* (2017.01);
(Continued)

(58) Field of Classification Search
CPC ............ G06K 9/00771; G06K 9/00711; G06T 17/292; G06T 7/246; G06T 2207/10016;
(Continued)

(56) References Cited

U.S. PATENT DOCUMENTS

2002/0196330 A1\* 12/2002 Park ................. G08B 13/19608
348/49
2005/0104961 A1\* 5/2005 Han ................. G08B 13/19604
348/143
(Continued)

OTHER PUBLICATIONS

Christopher Streiffer et al., DarNet: A Deep Learning Solution for Distracted Driving Detection, Proceedings of Middleware Industry '17: Proceedings of the Industrial Track of the 18th International Middleware Conference, Association for Computing Machinery, Dec. 11-15, 2017, Las Vegas, NV, USA, 7 pages.

*Primary Examiner* — Naomi J Small
(74) *Attorney, Agent, or Firm* — Daniel C. Crilly; Mansour Ghomeshi

(57) ABSTRACT

A processor of a video processing system receives video data from a video camera pivotally mounted within a motor vehicle. The processor also receives sensor data from a motion-sensing subsystem mounted in or to the vehicle. The processor determines, based upon the sensor data, a reference longitudinal axis and an orientation of an optical axis of the camera's lens. The processor then determines an angular difference between the orientation of the camera lens' optical axis and the reference longitudinal axis. The processor further determines, based upon the angular difference, a location of a target capture area within horizontal and vertical fields of view of the camera's lens. The processor then selects a portion of the received video data corresponding to the target capture area, determines whether the selected video data includes data representing one or more predefined patterns, and if so, tracks the predefined pattern(s) within the selected video data.

20 Claims, 26 Drawing Sheets

Related U.S. Application Data

(60) Provisional application No. 62/813,464, filed on Mar. 4, 2019.

(51) Int. Cl.
*G08B 25/01* (2006.01)
*H04N 5/225* (2006.01)
*H04N 7/18* (2006.01)
*H04N 5/247* (2006.01)
*G06T 7/292* (2017.01)
*G06T 7/246* (2017.01)

(52) U.S. Cl.
CPC .......... *G06T 7/292* (2017.01); *G08B 25/016* (2013.01); *H04N 5/2253* (2013.01); *H04N 5/247* (2013.01); *H04N 7/181* (2013.01); *G06T 2207/10016* (2013.01); *G06T 2207/30196* (2013.01); *G06T 2207/30232* (2013.01)

(58) Field of Classification Search
CPC .......... G06T 2207/30196; G06T 2207/30232; G08B 25/016; H04N 5/2253; H04N 5/247; H04N 7/181

USPC ........................................................ 340/541
See application file for complete search history.

(56) References Cited

U.S. PATENT DOCUMENTS

| | | | |
|---|---|---|---|
| 2006/0243798 A1* | 11/2006 | Kundu ............... | G07F 17/3241 235/383 |
| 2008/0208828 A1* | 8/2008 | Boiman ............. | G06K 9/00342 |
| 2009/0231432 A1 | 9/2009 | Grigsy et al. | |
| 2012/0169882 A1* | 7/2012 | Millar .................. | H04N 7/181 348/159 |
| 2014/0063239 A1* | 3/2014 | Furness, III et al. .. | G01N 21/31 348/143 |
| 2014/0371599 A1* | 12/2014 | Wu ...................... | A61B 5/0077 600/476 |
| 2015/0356840 A1* | 12/2015 | Wang ............... | G08B 13/19682 382/103 |
| 2016/0344918 A1* | 11/2016 | Tao .................... | H04N 5/23206 |
| 2018/0300557 A1* | 10/2018 | Rodenas ........... | G06K 9/00771 |
| 2018/0322749 A1* | 11/2018 | Kempel .......... | G08B 13/19608 |

* cited by examiner

METHOD AND SYSTEM FOR DETECTING A THREAT OR OTHER SUSPICIOUS ACTIVITY IN THE VICINITY OF A MOTOR VEHICLE

CROSS-REFERENCE TO RELATED APPLICATIONS

This application is a continuation-in-part of U.S. application Ser. No. 15/981,838, which was filed on May 16, 2018 and is incorporated herein by this reference as if fully set forth herein. The present application also claims priority under 35 U.S.C. § 119(e) upon U.S. Provisional Application No. 62/813,464, which was filed on Mar. 4, 2019 and is incorporated herein by this reference as if fully set forth herein.

TECHNICAL FIELD

The present disclosure relates generally to video-based monitoring systems and, more particularly, to methods and systems for detecting threats or other suspicious activity using real-time or near real-time video data analysis.

BACKGROUND

Mobile and fixed video surveillance systems are well known. Such systems are regularly utilized for a variety of reasons, including to monitor the activities and surroundings of employees of package delivery service companies and cash transport service companies, as well as to monitor activities within banks and stores, at automated teller machines (ATMs), and in the vicinities of public safety or law enforcement personnel. Most existing surveillance systems record video over a period of time and then store the video to a separate external memory device or to internal memory for later viewing. Where memory for storing surveillance video is limited in size, such memory may become full prior to storing new video or during the storage of new video. In such a case, the new video may be stored by overwriting the oldest stored video, such that video data for a most recent chosen time period is always stored in memory for later viewing.

Some business and government video surveillance systems, such as those in casinos or prisons, are monitored in real time by employees or contractors of the business or government. Such systems are costly to operate due to the need for regular or continual human interaction.

Other video surveillance systems are not configured to facilitate real-time human monitoring and instead store video for later viewing as discussed above. Such systems include law enforcement systems containing in-vehicle and/or body cameras. Few, if any, of such video surveillance systems perform real-time or near real-time object tracking and automated threat or suspicious activity notification based thereon.

SUMMARY

Generally, the present disclosure relates to a method and system for detecting suspicious activity, including a potential threat, in a vicinity of a motor vehicle. According to one exemplary embodiment, a processor of a video processing system receives video data in real time or near real time from at least one video camera pivotally mounted in or to the motor vehicle. The video data includes data representing a plurality of time-sequenced video frames. The video camera captures images within a video capture area proximate the motor vehicle. The video capture area is defined by horizontal and vertical fields of view of a lens of the video camera. In addition to receiving video data, the processor receives sensor data in real time or near real time from a motion-sensing subsystem mounted in or to the motor vehicle. The sensor data is time-synchronized with the video data and indicates at least one of a change in orientation of the video camera, a change in orientation of the motor vehicle, and a direction of movement of the motor vehicle.

After receiving the sensor data, the processor determines, based upon the sensor data, a reference longitudinal axis and an orientation of an optical axis of the video camera's lens. The reference longitudinal axis corresponds to the direction of movement of the motor vehicle. The processor also determines one or more angular differences between the orientation of the optical axis of the lens of the video camera and the reference longitudinal axis. Based upon the one or more angular differences, the processor determines a location of a target capture area within the horizontal and vertical fields of view of the video camera's lens, where the target capture area is within the video capture area, centered on the reference longitudinal axis, and substantially parallel to a horizon. The processor then selects, on a video frame-by-video frame basis, a portion of the video data received from the video camera corresponding to the target capture area to produce target capture area video data. The processor determines whether the target capture area video data for a first set of one or more video frames of the plurality of video frames includes data representing one or more predefined patterns. If so, the processor tracks the one or more predefined patterns within the target capture area video data to produce one or more tracked patterns.

According to an alternative exemplary embodiment, after image pattern tracking has begun, the processor determines whether the target capture area video data for a second set of one or more video frames includes data representing the one or more tracked patterns, where images in the second set of video frames were captured later in time than images in the first set of video frames. Responsive to determining that the target capture area video data for the second set of video frames includes data representing the one or more tracked patterns, the processor determines whether the one or more tracked patterns have changed position in a suspicious manner. Responsive to determining that the one or more tracked patterns have changed position in a suspicious manner, the processor communicates an alert (e.g., to an operator of the motor vehicle or to an emergency management system).

According to another exemplary embodiment, a system for detecting suspicious activity in a vicinity of a motor vehicle includes a video camera, a motion-sensing subsystem, and a video processing apparatus. The video camera is pivotally mounted in or to the motor vehicle and positioned to capture images of a video capture area proximate the motor vehicle. The video camera is configured to output video data in real time or near real time based upon the captured images. The video data includes data representing a plurality of time-sequenced video frames. The video capture area is defined by horizontal and vertical fields of view of a lens of the video camera. The motion-sensing subsystem is mounted in or to the motor vehicle and operable to output sensor data in real time or near real time. The sensor data indicates at least one of a change in orientation of the video camera and a direction of movement of the motor vehicle.

The video processing apparatus is communicatively coupled to the video camera and the motion-sensing subsystem, and includes at least one communication interface and a video processor. The one or more communication interfaces of the video processing apparatus are operable to receive video data from the video camera and sensor data from the motion-sensing subsystem. The video data and the sensor data are time-synchronized.

The video processor is operably coupled to the one or more communication interfaces and operable in accordance with a set of operating instructions to perform several functions. For example, the video processor determines, based upon the sensor data, a reference longitudinal axis and an orientation of an optical axis of the video camera's lens. The reference longitudinal axis corresponds to the direction of movement of the motor vehicle. The video processor also determines one or more angular differences between the orientation of the optical axis of the lens of the video camera and the reference longitudinal axis. Based upon the one or more angular differences, the video processor determines a location of a target capture area within the horizontal and vertical fields of view of the video camera's lens, where the target capture area is within the video capture area, centered on the reference longitudinal axis, and substantially parallel to a horizon. The video processor then selects, on a video frame-by-video frame basis, a portion of the video data received from the video camera corresponding to the target capture area to produce target capture area video data. The video processor determines whether the target capture area video data for a first set of one or more video frames of the plurality of video frames includes data representing one or more predefined patterns.

According to another embodiment, the video processor may be further operable to remotely activate a body camera secured to an operator of the motor vehicle, responsive to determining that the target capture area video data in the first set of video frames includes data representing the one or more predefined patterns. In such a case, the video processor receives and stores video data received from the activated body camera. The video camera may also be secured to or form part of a rear-view mirror assembly of the motor vehicle and be positioned to capture images from in front of the motor vehicle.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the one or more embodiments of the present invention as set forth in the appended claims.

Skilled artisans will appreciate that elements in the figures are illustrated for simplicity and clarity and have not necessarily been drawn to scale or to include every component of an element. For example, the dimensions of some of the elements in the figures may be exaggerated alone or relative to other elements, or some and possibly many components of an element may be excluded from the element, to help improve the understanding of the various embodiments of the present disclosure. Skilled artisans will also appreciate that the drawings are not intended to be comprehensive; thus, they may exclude elements and functions that would be readily apparent to those skilled in the art in order to implement the methods and systems described herein.

DETAILED DESCRIPTION

Detailed embodiments of video analysis-based threat detection methods and systems are disclosed herein; however, such embodiments are merely exemplary in nature. Therefore, specific structural and functional details disclosed herein are not to be interpreted as limiting, but rather should be interpreted merely as a basis for the claims and as a representative basis for teaching one skilled in the art how to carry out the disclosed methods and systems in appropriate circumstances. Except as expressly noted, the terms and phrases used herein are not intended to be limiting, but rather are intended to provide an understandable description of the disclosed methods and systems.

Figure 1:
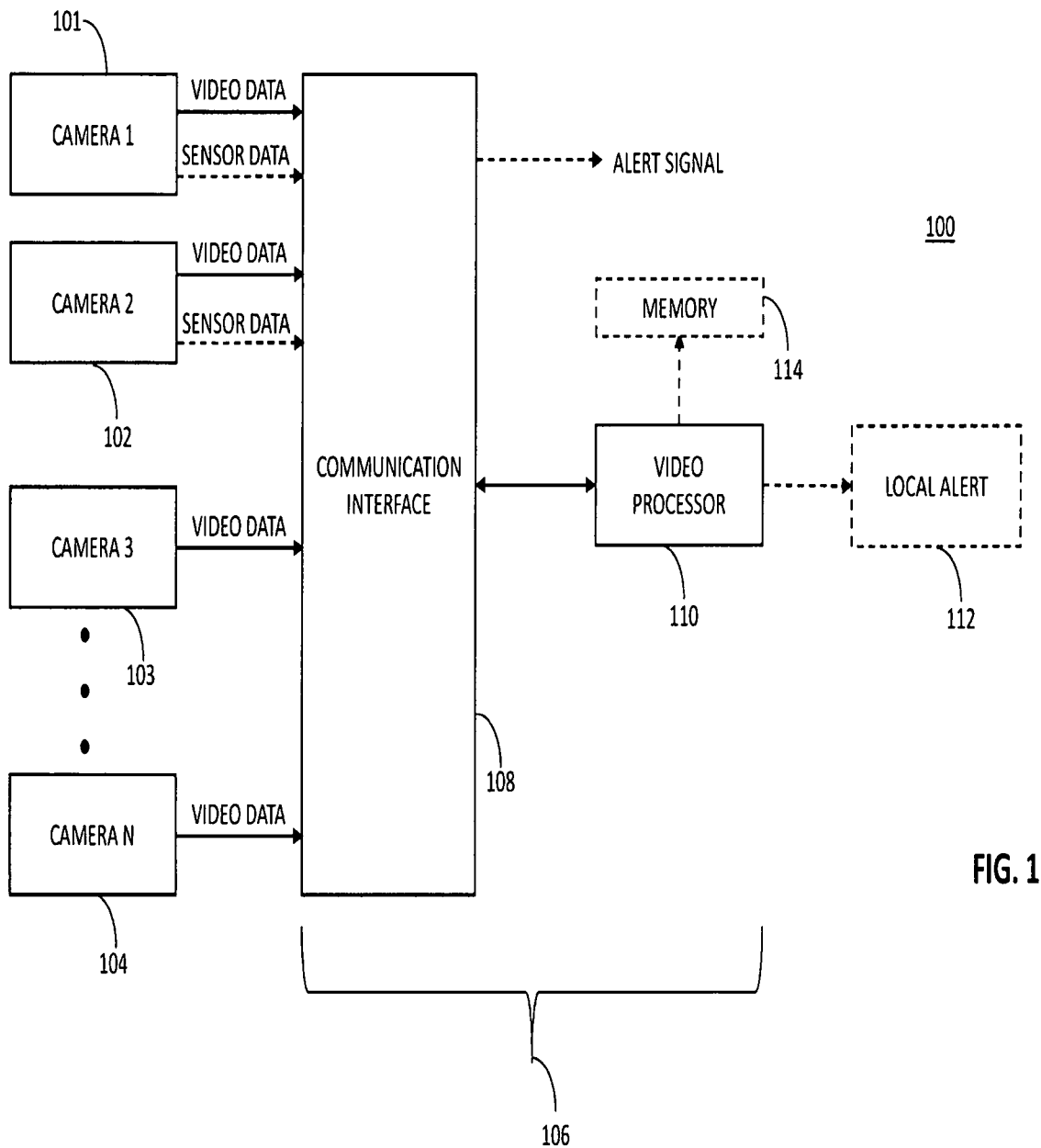
FIG. 1 is an electrical block diagram of a video processing system in accordance with an exemplary embodiment of the present disclosure.

Exemplary embodiments of the present disclosure can be more readily understood with reference to FIGS. 1-26, in which like reference numerals designate like items. FIG. 1 is an electrical block diagram of a video processing system 100 in accordance with an exemplary embodiment of the present disclosure. According to this embodiment, the video processing system 100 includes, inter alia, one or more cameras 101-104 (four shown for illustration) and a video processing apparatus 106. The video processing apparatus 106 may include, inter alia, a communication interface 108, a video processor 110, and an optional memory 114.

The cameras 101-104 are preferably commercially-available, digital, high-definition cameras, such as panoramic cameras available from 360fly, Inc. of Fort Lauderdale, Fla., but may also or alternatively be any high definition security cameras with the capability to communicate video data over one or more communication networks. Where one of the cameras (e.g., camera 101) or the only camera is intended to be secured to a body of a person under surveillance, the camera 101 may be a low profile, wide-angle, panoramic camera, such as the panoramic camera disclosed in U.S. Patent Application Publication No. US 20170195563 A1, which publication is incorporated herein by this reference. Additionally, where one or more of the cameras (e.g., cameras 101, 102) are secured to a person's body, a vehicle, or other movable object, the cameras 101, 102 may include one or more types of motion sensors, such as two-axis or three-axis accelerometers, gyroscopes, magnetometers, GPS units, and/or composite inertial measurement units. Where the cameras 101-104 are positioned apart from the video processing apparatus 106, the cameras 101-104 may further include communication circuitry sufficient to communicate video data and optional motion data (e.g., sensor data) over wireless and/or wired networks to the video processing apparatus 106. Where a camera 101-104 is collocated with the video processing apparatus 106, the camera 101-104 may include one or more data buses or other communication paths to communicate video data and optional motion data (e.g., sensor data) to the video processing apparatus 106.

With regard to the video processing apparatus 106, the communication interface 108 includes antennas, filters, amplifiers, transceivers, modems, transcoders, and any other hardware and/or software necessary to facilitate communication between the cameras 101-104 and the video processor 110 over known or future-developed wired or wireless networks. Such networks may include Wi-Fi (IEEE 802.11 a/b/g/n/ac); WiMAX (IEEE 802.16); 3G (CDMA, GSM), 4G LTE, and 5G cellular networks; and/or Ethernet. The communication interface 108 provides communicative coupling between the video processing apparatus 106 and the cameras 101-104.

The video processor 110 is operably coupled to the communication interface 108 and may be any digital video processor or combination of digital video processors capable of decoding, analyzing, and otherwise processing video data and optional sensor data received from the cameras 101-104. Where the video processing apparatus 106 is operable to communicate video data or augmented video data to a wireless communication device carried by a person under surveillance, such as a smartphone, tablet computer, personal digital assistant-type device, or other handheld mobile device, the video processor 110 may further include capability to encode video data for viewing on such a device. According to one exemplary embodiment, the video processor 110 is implemented as a system on a chip (SoC)

programmed to execute a video codec and real-time communication protocols, as well as perform other processing functions on video data and optional sensor data received from the cameras 101-104 in accordance with various embodiments of the present disclosure.

Where the video processor 110 does not include onboard memory or includes an inadequate amount of onboard memory for purposes of carrying out all of its functions in accordance with the present disclosure (e.g., where the video processor 110 includes onboard memory to store firmware, but not application software), the video processing apparatus 106 may include separate memory 114 to meet the operational requirements of the video processing apparatus 106. The memory 114 may store executable code that contains the operating instructions for the video processor 110, as well as store video data, motion data, or other data used during video processing or desired for later retrieval. The memory 114 may include volatile memory (such as random access memory (RAM)) and non-volatile memory (such as various types of read only memory (ROM)).

Where the video processing apparatus 106 is collocated with a local alerting mechanism 112, such mechanism 112 may include an audio speaker, a horn, a haptic or tactile alerting device, one or more lights or lighting units, and/or a video display. The local alerting mechanism 112 is intended to quickly alert the person under surveillance as to the presence of a possible threat when the video processing apparatus 110, as part of the overall video processing system 100, determines from received video data (and optionally motion data) that such a potential threat is present. Where a local alerting mechanism is not present or desired, the video processor 110 may communicate an alert signal to a remote alerting device, such as a wireless communication device carried by the person under surveillance, by way of the communication interface 108.

Operation of video processing systems, such as video processing system 100, will be described below in connection with FIGS. 2-7. An optional cloud-based implementation of the video processing apparatus 106 is described below in connection with FIG. 8.

Figure 2:
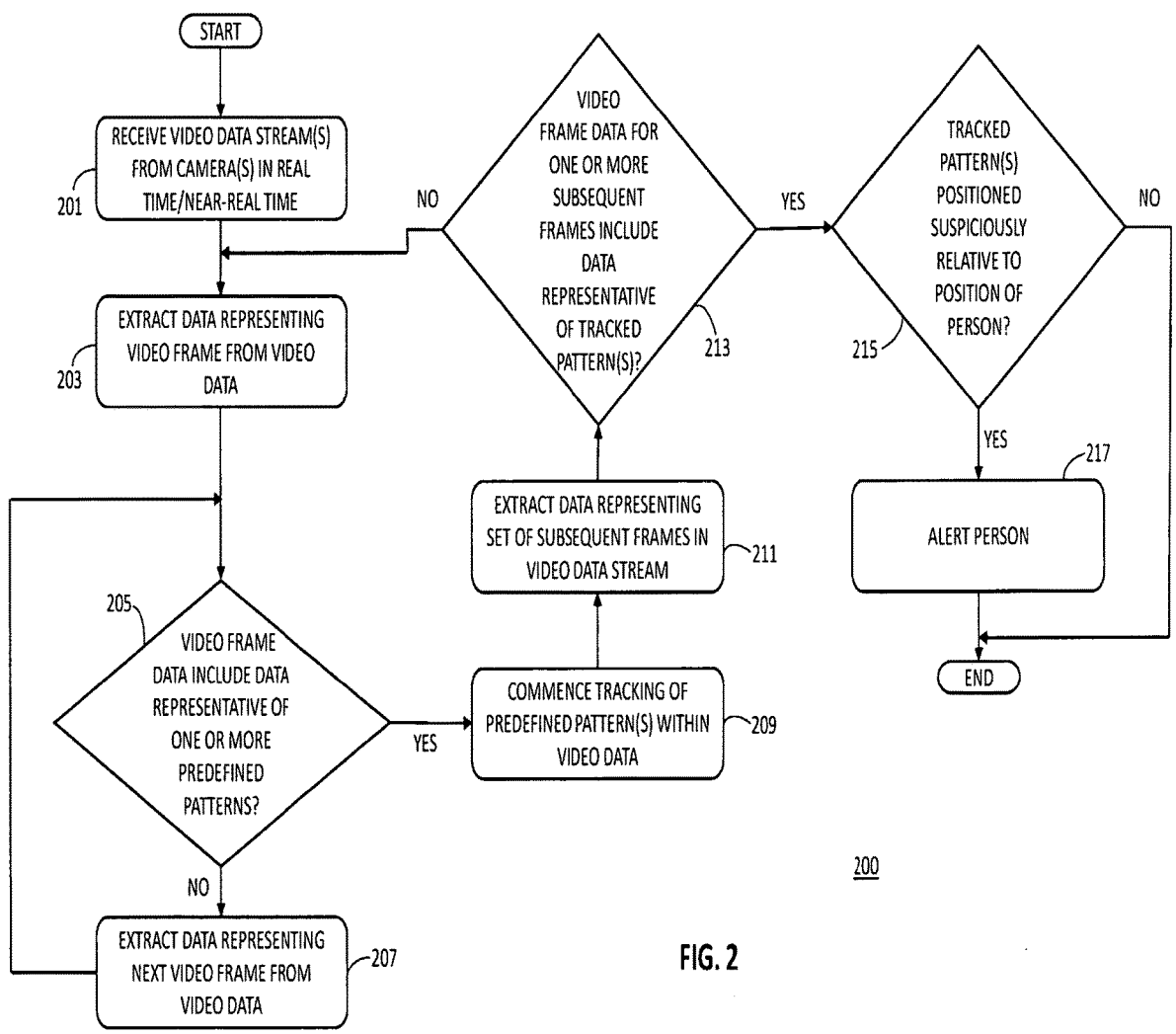
FIG. 2 is a process flow diagram of steps executed by a video processing system to detect a threat to a person based on real-time or near real-time video analysis in accordance with another exemplary embodiment of the present disclosure.

Referring now to FIG. 2, there is shown a process flow diagram 200 of steps executed by a video processing system to detect a threat to a person based on real-time or near real-time video analysis in accordance with an exemplary embodiment of the present disclosure. The steps of the process flow diagram 200 may be performed by the video processing system (and primarily by its video processor) through execution of stored operating instructions (firmware and/or software). By way of example, but not limitation, the threat detection process flow of FIG. 2 is described below with reference to the video processing system 100 of FIG. 1.

The process flow begins when one or more cameras 101-104 capture images within video capture areas defined by the cameras' respective fields of view. The cameras 101-104 generate encoded video data streams from the images and divide the video streams into a series of time-sequenced or time-stamped video frames according to the video streaming protocol being used. In one exemplary embodiment, the camera or cameras 101-104 are configured to capture images and encode video data at a rate of at least 30 frames per second. The video streams are communicated to the video processing apparatus 106 for video analysis processing.

The cameras' fields of view are such that the cameras' video capture areas are proximate the location of the person under surveillance when the threat detection process is being executed. For example, one camera 101 may be a low profile or other style body camera secured to the front or back of the person under surveillance, such as through use of a strap or belt, vest, holster, or other device. Such a camera 101 may, depending on its capabilities, capture images extending out several feet or meters (e.g., 150 feet or 50 meters or more) as referenced from the person's position.

Another one or more cameras 102-104 may be mounted at predetermined locations on a vehicle (e.g., truck, car, boat, bus, motorcycle, and so forth) that transported the person to his or her current location or that is otherwise positioned near the person under surveillance. The positioning of the cameras 102-104 on the vehicle may be such that the cameras 102-104 captures images of the person and his surroundings at locations where the person is expected to be after stopping the vehicle. For example, where the person is a courier for a package delivery service company or a security guard for a cash management or transport service company, the vehicle-mounted cameras 102-104 may be mounted to the vehicle at multiple locations, such as the driver's side of the vehicle (e.g., adjacent the driver's side door or on the driver's side of the hood), the passenger's side of the vehicle, and/or the back of the vehicle (e.g., above and/or adjacent to the rear doors). Depending on the types of cameras 102-104 utilized, the cameras 102-104 may capture images extending out several feet or meters (e.g., 150 feet or 50 meters or more) from the vehicle.

Other cameras may be mounted at fixed locations near the location of the person. For example, cameras may be mounted to buildings, canopies, trees, or other objects, or within structures (e.g., within an ATM) at the general location of the person. Due to their positioning, such cameras may capture images within a much wider video capture area than the video capture areas of body-mounted or vehicle-mounted cameras.

The video processing apparatus 106 receives (201) a video data stream from each camera 101-104 in real time or near real time via the apparatus' communication interface 108. In other words, each camera 101-104 captures images, encodes the images into video data containing time-sequenced video frames, and communicates the video data to the video processing apparatus 106 as a stream of video frames in accordance with a video streaming protocol, without intentionally delaying the flow of video data any more than is necessary. That is, neither the video processing apparatus 106 nor the video processing system 100 as a whole introduces any delays other than normal processing and communication delays. Use of the terms "real time," "real-time," "near real-time," and "near real time" take into account such inherent delays. The video processor 110 may use one or more video streaming control protocols, such as version 2.0 of the Real Time Streaming Protocol (RTSP 2.0) or any successor thereof as standardized by the Internet Engineering Task Force (IETF) or another standards body, to control the delivery of video data from the cameras 101-104. According to one exemplary embodiment, the cameras 101-104 and the video processor 110 use video transport and streaming protocols, such as the Real-Time Messaging Protocol (RTMP) and the Real-Time Transport Protocol (RTP) or any successors thereof as standardized by the IETF or another standards body, to transmit and receive video data in real time or near real time.

As the video data from a particular camera 101-104 is received at the video processor 110, the video processor 110 extracts (203) data representing a video frame from the video data based on the video streaming protocol and the video codec (e.g., H.264 or H.265) used by the camera 101-104 and the video processor 110, and determines (205)

whether the video frame data includes data representative of one or more predefined patterns. For example, the video processor 110 may compare portions of the video frame data to data representative of a set of predefined, potential threat patterns previously stored in memory 114 to determine whether the video frame or any portion thereof includes data substantially similar to data representative of a potential threat pattern. Video data may be considered substantially similar to pattern data where the video data has at least a fifty percent (50%) correspondence with the pattern data. Additionally or alternatively, the video processor 110 may execute machine learning and computer vision algorithms to perform object detection, face detection, face recognition, summarization, threat detection, natural language processing, sentiment analysis, traffic monitoring, intention detection and so on to evaluate whether the video frame data includes data representative of one or more predefined patterns.

The set of predefined patterns may include, for example, the outline or other features of a human body or a portion thereof, the outline or other features of one or more predetermined objects (such as a firearm, knife, bat, club, TASER, or other object that could be used as a weapon), the outline or other features of a vehicle, and/or the features of one or more types of locations. The video processor 110 may be programmed to update and/or expand the stored threat pattern data by applying machine learning techniques, such as supervised learning techniques (e.g., pattern recognition, object classification, and/or regression algorithms), unsupervised learning techniques (e.g., association, clustering, and/or dimensionality reduction algorithms), and/or reinforcement learning techniques, to video data received by the video processor 110 over time.

Where the video processing apparatus 106 receives video data streams from multiple cameras 101-104, the video processor 110 analyzes each video stream separately and may use metadata within the video streams to time-synchronize the streams. The metadata for each video data stream may include a time-and-date stamp, which permits the video processor 110 to align the video frames of the video data streams even though such streams may be received at different times by the video processing apparatus 106.

When the video frame data from a particular camera 101-104 does not include data representative of a predefined pattern, the video processor 110 extracts (207) data representing the next video frame from the video data stream and determines (205) whether that video frame data includes data representative of one or more of the predefined patterns. When the video frame data from a particular camera includes data representative of at least one predefined pattern (e.g., a pattern match or correspondence occurs), the video processor 110 commences (209) tracking of the detected pattern or patterns within the video data and extracts (211) data representing one or more subsequent video frames from the video data stream.

According to one exemplary embodiment, pattern tracking continues for a predetermined period of time over a predetermined set of subsequent video frames, which period may be extended by the video processor 110 based on pre-established extension criteria. The set of subsequent video frames may include contiguous video frames, periodically positioned video frames (e.g., every other video frame in the set, every third video frame in the set, and so forth), or randomly selected video frames within the tracking time period. For example, where the video data was captured by the camera 101-104 at 30 frames per second, pattern tracking may continue for a fraction of a second (e.g., 333 milliseconds or 500 milliseconds) or for multiple seconds as may be selected by the system operator. As a further example, where pattern tracking is to be performed on contiguous video frames for a period of 500 milliseconds after a pattern has been detected and the video data includes 30 frames per second, pattern tracking may be programmed to occur for data representing fifteen consecutive video frames.

The video processor 110 analyzes the data representing the set of one or more subsequent video frames and determines (213) whether that video frame data includes data representative of the tracked pattern or patterns (e.g., determines whether any portion of the video frame data in the tracked video frames is substantially similar to the tracked pattern or patterns). If a tracked pattern is found in the data representing the set of subsequent video frames, the video processor 110 determines (215) whether the tracked pattern is positioned suspiciously relative to the position of the person under surveillance. Otherwise, the video processor 110 extracts (203) the next video frame from the video data and the process repeats.

To determine whether the tracked pattern is positioned suspiciously, the video processor 110 may determine a motion vector (e.g., velocity) for the tracked pattern based on the video frame data and, responsive thereto, determine whether the motion vector is on a track to intercept or pass closely to the person under surveillance. For example, by analyzing video data from a camera (e.g., camera 102) positioned other than on the person under surveillance's body, the video processor 110 may initially (e.g., at block 205) detect a potential threat pattern, as well as the pattern of the person under surveillance. The video processor 110 may thereafter commence pattern tracking and compute a velocity of the tracked pattern and a velocity of the person under surveillance over the tracking period. If the tracked pattern and person are projected to intercept at a threshold time in the future (e.g., within five seconds), the video processor 10 may determine that the tracked pattern is positioned suspiciously relative to the person under surveillance. Alternatively, by analyzing video data from a camera (e.g., camera 101) positioned on the person's body, the video processor 110 may determine that the tracked pattern is approaching the person under surveillance, which may be deemed a suspicious positioning of the tracked pattern depending on other factors, such the position and rate of approach, and/or the presence of another predefined pattern in the video data (e.g., the pattern for a weapon). One exemplary process for determining whether a tracked pattern is positioned suspiciously relative to the position of a person under surveillance is described below with respect to FIG. 3. Another exemplary process for determining whether a tracked pattern is positioned suspiciously relative to the position of a person under surveillance based on analysis of video data from the person's body camera and from a nearby fixed-position or static camera is described below with respect to FIG. 4.

When the video processor 110 determines that one or more tracked patterns are positioned suspiciously relative to the position of the person under surveillance, the video processor 110 alerts (217) the person under surveillance as to a potential threat. For example, the video processor 110 may activate a local alert, such as activate an audible and/or visual alarm or send an audio message to a local sound speaker, to notify the person. Alternatively, the video processor 110 may communicate, via the communication interface 108, an alert message to a mobile application executing on a wireless communication device carried by the person (e.g., smartphone, cellular phone, tablet computer, personal digital assistant). In the latter case, the alert message may cause the mobile application to activate an audible alarm and/or a haptic alarm of the wireless communication device to notify the person of the potential threat. Still further, the video processor 110 may communicate, via the communication interface 108, at least some of the video data from the analyzed video stream (e.g., the last ten seconds or 300 video frames) to a mobile video processing and display application executing on a wireless communication device carried by the person. In this case, the mobile application may be configured to automatically play and display the received video to enable the person under surveillance to assess the potential threat and react thereto as necessary.

Figure 3:
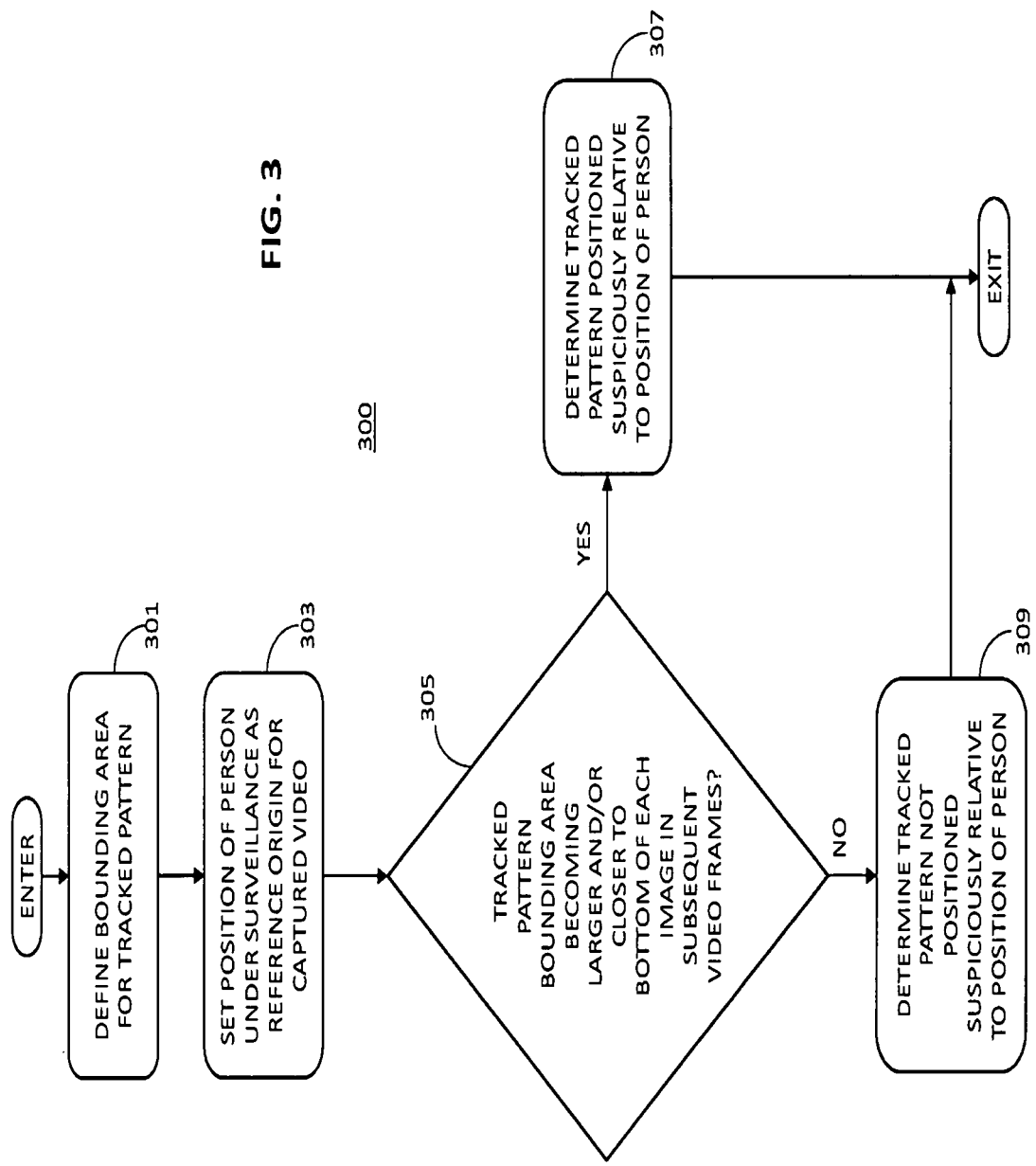
FIG. 3 is a process flow diagram of steps executed by a video processing system to determine whether a tracked pattern is positioned suspiciously relative to a position of a person under video surveillance, in accordance with another exemplary embodiment of the present disclosure.

FIG. 3 is a process flow diagram 300 of steps executed by a video processing system 100 (e.g., through operation of its video processor 110) to determine whether a tracked pattern is positioned suspiciously relative to a position of a person under video surveillance, in accordance with one exemplary embodiment of the present disclosure. The process flow illustrated in FIG. 3 may have particular applicability for analyzing video data supplied by a camera secured to the body of the person under surveillance.

According to the logic flow of FIG. 3, the video processor 110 defines (301) a bounding area for the tracked pattern. The bounding area may be defined by a square, rectangle, oval, triangle, or other geometric shape positioned around the tracked pattern to form a trackable area for purposes of reducing the amount of processing resources necessary to track the pattern and its positioning relative to a position of the person under surveillance. In other words, each tracked pattern may be "bounded" within a predefined or adaptive virtual area to make pattern tracking less processing intensive.

In addition to defining a bounding area for each tracked pattern, the video processor 110 sets (303) the position of the person under surveillance as the reference origin for the video data stream being processed. Thus, the position of the person under surveillance is the reference point for all calculations and other determinations relevant to evaluating the positioning of the tracked pattern according to this exemplary embodiment.

Once the tracked pattern bounding area has been defined and the reference origin set, the video processor 110 determines (305) whether the tracked pattern bounding area is becoming larger and/or closer to the bottom of each image in the set of subsequent video frames that is subject to pattern tracking analysis. To determine whether the tracked pattern bounding area is becoming larger in the set of subsequent video frames, the video processor 110 may, according to an exemplary embodiment, determine a size of the tracked pattern bounding area in each video frame of the set of subsequent video frames. Based on such bounding area size data, the video processor 110 may determine a linear regression to model how the size of the tracked pattern bounding area (e.g., size of the pixel area) changes across the set of subsequent video frames. Thereafter, the video processor 110 may determine a gradient for the linear regression and compare the gradient to a threshold. When the gradient exceeds the threshold, the video processor 110 may determine that the tracked pattern bounding area is becoming larger over the subsequent video frames. Therefore, according to this exemplary embodiment, the video processor 110 may be programmed to use a simple or Bayesian linear technique to interpret the bounding area data captured over the set of subsequent video frames for the purpose of evaluating whether the tracked pattern bounding area is becoming larger over time. Those of ordinary skill in the art will readily recognize and appreciate that the video processor 110 may be programmed to use other known regression or statistical analysis techniques to evaluate how the size of the tracked pattern bounding area is changing over the set of subsequent video frames.

To determine whether the tracked pattern bounding area is becoming closer to a bottom of each image in the set of subsequent video frames, the video processor 110 may, according to an exemplary embodiment, determine a position of a coordinate along a bottom edge of the tracked pattern bounding area in each video frame of the set of subsequent video frames. The determined position may be a pixel position or an estimated physical position of the edge of the boundary area under an assumption that the boundary area actually existed in the real world. For example, the video processor 110 may determine a position of the center coordinate along the bottom edge of the tracked pattern bounding area, although the position of any coordinate along the bottom edge of the tracked pattern bounding area may suffice with appropriate angular correction applied, if necessary.

The video processor 110 may then use the bottom coordinate position data to determine a relationship (e.g., an estimated distance) between the position of the coordinate along the bottom edge of the tracked pattern bounding area and the reference origin for each video frame of the set of subsequent video frames. Based on such relationship, the video processing system may determine a linear regression to represent how the relationship between the position of the coordinate along the bottom edge of the tracked pattern bounding area and the reference origin changes across the set of subsequent video frames. For example, the video processor 110 may determine a distance (e.g., an estimated actual distance or pixel distance) between the position of the coordinate along the bottom edge of the tracked pattern bounding area and the reference origin for each video frame of the set of subsequent video frames and then determine a linear regression to model how the distance changes over time across the set of subsequent video frames.

The video processor 110 may further determine a gradient for the linear regression and compare the gradient, which may be negative, to a threshold. When the gradient is less than the threshold, the video processor 110 may determine that the tracked pattern bounding area is becoming closer to a bottom of each image in the set of subsequent video frames. Those of ordinary skill in the art will readily recognize and appreciate that the video processor 110 may be programmed to use other known regression or statistical analysis techniques to evaluate how the position of the tracked pattern bounding area is changing over the set of subsequent video frames. Additionally, those of ordinary skill in the art will readily recognize and appreciate that the video processor 110 may be programmed to use other position coordinates along another edge or edges of the tracked pattern bounding area in order assess whether the tracked pattern bounding area is becoming closer to a bottom of each image in the set of subsequent video frames. More detailed exemplary embodiments for using tracked pattern bounding area changes (or lack thereof) over multiple video frames to assist in the determination of whether a tracked pattern is positioned suspiciously relative to a person under surveillance are described below with respect to FIGS. 5-7.

When the video processor 110 determines that the tracked pattern bounding area is becoming larger and/or closer to the bottom of each image in the set of subsequent video frames that is subject to pattern tracking analysis, the video processor determines (307) that the tracked pattern is positioned suspiciously relative to the person under surveillance. On the other hand, when the video processor 110 determines that the tracked pattern bounding area is not becoming larger and/or closer to the bottom of each image in the set of subsequent video frames that is subject to pattern tracking analysis, the video processor determines (309) that the tracked pattern is not positioned suspiciously relative to the person under surveillance. Thus, according to this embodiment, the video processor 110 may determine that the tracked pattern is positioned suspiciously relative to the person under surveillance if the tracked pattern bounding area is becoming larger over the set of subsequent video frames, the tracked pattern is becoming closer to the bottom of each image over the set of subsequent video frames, or both. For example, if the tracked pattern is a pattern of a person, the bounding area is the area of a rectangle positioned around the tracked pattern, and the person is running toward the person under surveillance, the size of the tracked pattern bounding area will increase and a coordinate along the bottom edge of the tracked pattern bounding area will become closer to a bottom of each image over the set of subsequent video frames indicating suspicious positioning of the tracked pattern. On the other hand, if the tracked pattern is the pattern of a drone, the bounding area is the area of a rectangle positioned around the tracked pattern, and the drone is flying toward the person under surveillance while also increasing in altitude, the size of the tracked pattern bounding area may not increase over the set of subsequent video frames, but a coordinate along the bottom edge of the tracked pattern bounding area will become closer to a bottom of each image over the set of subsequent video frames. In this case, movement of the drone toward the person under surveillance results in the tracked pattern bounding area becoming closer to a bottom of each image in the subsequent video frames, thereby indicating suspicious positioning of the tracked pattern relative to the person under surveillance.

Figure 4:
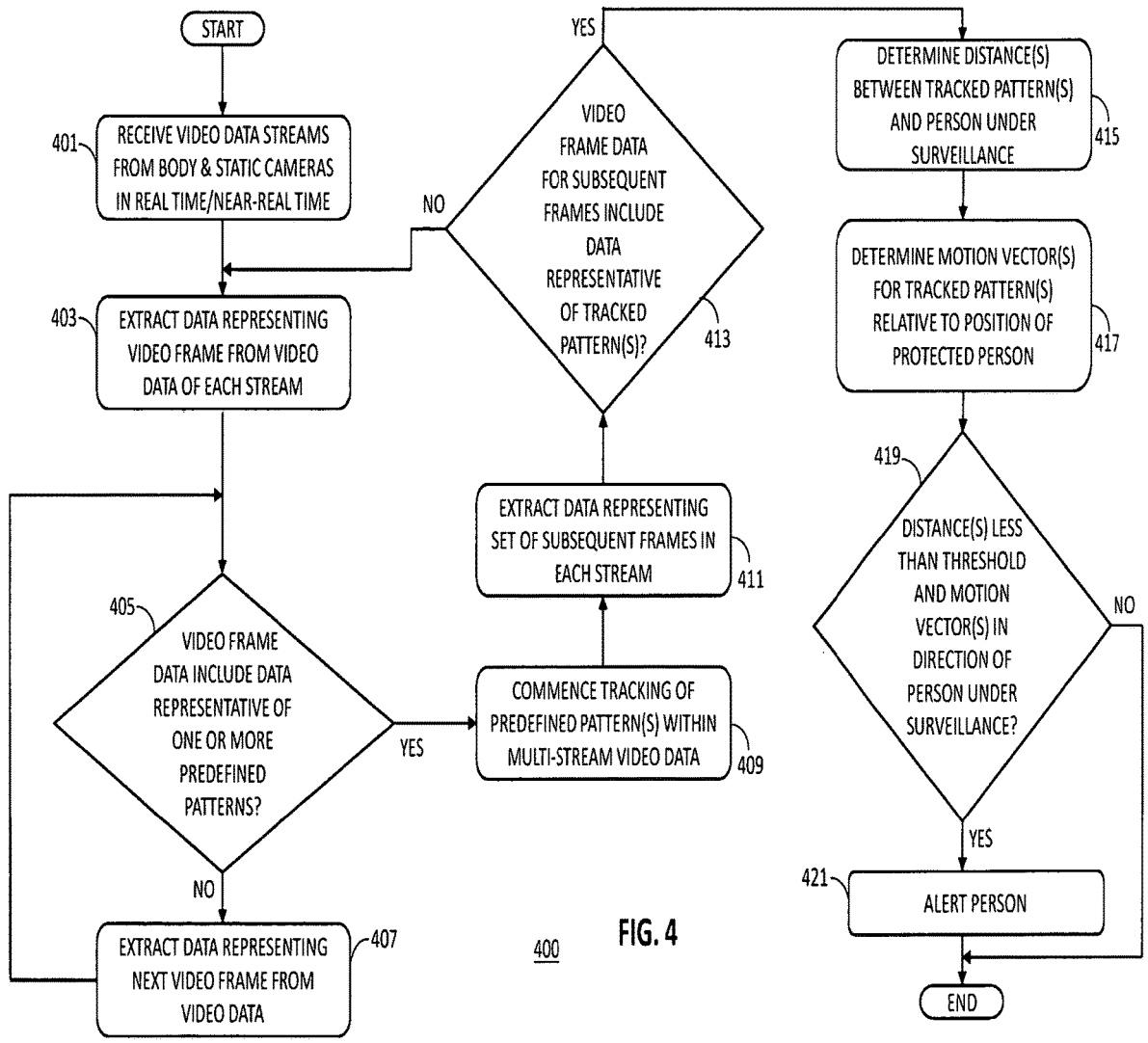
FIG. 4 is a process flow diagram of steps executed by a video processing system to detect a threat to a person based on real-time or near real-time analysis of video data supplied by multiple cameras in accordance with a further exemplary embodiment of the present disclosure.

FIG. 4 is a process flow diagram 400 of steps executed by a video processing system 100 to detect a threat to a person based on real-time or near real-time analysis of video data supplied by multiple cameras in accordance with a further exemplary embodiment of the present disclosure. According to this embodiment, the video processing system 100, through operation of its communication interface 108 and video processor 110, receives (401) video data streams from a camera secured to the body of the person under surveillance and one or more statically-positioned cameras. The statically-positioned cameras may be mounted to or within one or more objects, such as a vehicle, a light pole, an awning or canopy, a structural support pole, a telephone pole, a tree, an automated teller machine (ATM), or any other object. The video processor 110 may also be programmed to use a streaming control protocol, such as RTSP, to control the video data streams from the multiple cameras.

As each video data stream is received at the video processor 110, the video processor 110 extracts (403) data representing a video frame from the video data based on the video streaming protocol and the video codec used by the camera 101-104 and the video processor 110, and determines (405) whether the video frame data includes data representative of one or more predefined patterns. As discussed above with respect to FIG. 1, the video processor 110 may compare portions of the video frame data to data representative of a set of predefined, potential threat patterns previously stored in memory 114 to determine whether the video frame or any portion thereof includes data substantially similar to data representative of a potential threat pattern.

When the video frame data from a particular camera 101-104 does not include data representative of a predefined pattern, the video processor 110 extracts (407) data representing the next video frame from the video data stream and determines (405) whether that video frame data includes data representative of one or more of the predefined patterns. When the video frame data from a particular camera includes data representative of at least one predefined pattern, the video processor 110 commences (409) tracking of the detected pattern or patterns within the video data and extracts (411) data representing one or more subsequent video frames from the video data stream.

According to one exemplary embodiment, tracking continues for a predetermined period of time over a predetermined set of subsequent video frames, which period may be extended by the video processor 110 based on pre-established extension criteria. The set of subsequent video frames may include contiguous video frames, periodically positioned video frames (e.g., every other video frame in the set, every third video frame in the set, and so forth), or randomly selected video frames within the tracking time period. The video processor 110 analyzes the data representing the set of one or more subsequent video frames and determines (413) whether that video frame data includes data representative of the tracked pattern or patterns (e.g., determines whether any portion of the video frame data in the tracked video frames is substantially similar to the tracked pattern or patterns). If a tracked pattern is found in the data representing the set of subsequent video frames, the video processor 110 proceeds to determine whether the one or more tracked patterns are positioned suspiciously relative to a position of the person under surveillance. To make a suspicious positioning determination according to this particular exemplary embodiment, the video processor 110 determines (415) a distance between the tracked pattern and the person under surveillance. If a tracked pattern is not found in the data representing the set of subsequent video frames, the video processor 110 extracts (403) the next video frame from the video data and the process repeats.

To determine the distance between a tracked pattern and the person under surveillance, the video processor 110 may be programmed to measure pixel distances between points on the tracked pattern and points on the person for video captured from one or more statically-positioned cameras (e.g., cameras 103, 104). In other words, the video processor 110 may analyze the video frames in the video data streams received from one or more statically-positioned cameras capturing images of video capture areas that include the subject of the tracked pattern and the person under surveillance. The video processor 110 may also use the body camera of the person under surveillance (e.g., camera 101) to aid in the determination of distance, such as by using video data from the body camera to determine an angle at which the subject of the tracked pattern is located relative to a reference axis. The video processor 110 may further determine the distance between the tracked pattern and the person under surveillance as a function of camera lens profile specifications for the camera from which the video data under analysis was received, a position of the tracked pattern within the video frame, and a size of the tracked pattern bounding area. For example, the video processor 110 may receive video data streams from two statically-positioned cameras to improve the accuracy of the potential threat assessment made by just using video data from the body camera of the person under surveillance. In another example, two or more statically-positioned cameras and the body camera of the person under surveillance may be used to generate a three-dimensional (3D) model of the person's environment and determine a distance vector between the tracked pattern and the person under surveillance.

Alternatively, the video processor 110 may be programmed to determine a distance between a tracked pattern and the person under surveillance by determining coordinates of the tracked pattern within a 3D environment model ($X_i$, $Y_i$, $Z_i$) generated from video data supplied by two or more statically-positioned cameras and the body camera of the person under surveillance, and computing the distance as follows:

$$\text{Distance}=\text{SQRT}[(X_{i+n}-X_i)^2+(Y_{i+n}-Y_i)^2+(Z_{i+n}-Z_i)^2],$$

where "i" is the frame index and "n" is the number of frames used to compute the distance.

In addition to determining a distance between each tracked pattern and the person under surveillance, the video processor 110 determines (417) a motion vector for each tracked pattern relative to the person under surveillance. To determine such a vector, the video processor 110 may be programmed to compute a velocity vector as follows:

$$\text{Velocity Vector}=[(X_{i+n}-X_i),(Y_{i+n}-Y_i),(Z_{i+n}-Z_i)]/(T_{i+n}-T_i)$$

where "i" is the frame index, "n" is the number of frames used to compute the velocity vector, and "$T_i$" is the time corresponding to index i.

After the distance between the tracked pattern and the person under surveillance and the tracked pattern's motion vector have been determined, the video processor 110 determines (419) whether the determined distance is less than a threshold and whether the motion vector is in a general direction of the person under surveillance. When both conditions have been met according to this embodiment, the video processor alerts (421) the person under surveillance as to a potential threat. By contrast, when both conditions have not been met, the logic flow ends with respect to the currently processed set of video frames and may be restarted with respect to the next set of video frames.

For example, where the video processing system 100 is utilized to monitor potential threats to employees of a cash transport service, the threshold distance may be set to about thirty feet (about ten meters) and the motion vector may be deemed to be in the general direction of the employee when the motion vector is within a 40° range (+/−20°) about a longitudinal or optical axis of the employee's body camera. Thus, according to this example, the video processor 110 may determine that a tracked pattern is a potential threat if, in an analyzed video frame, the pattern is positioned less than thirty feet from the employee and is moving within a range of +/−20° from the longitudinal axis of the employee's body camera. When the distance and motion conditions have been met, the video processor 110 may alert the person under surveillance as to a potential threat. Such alerting may be achieved by, for example: activating a local alert (such as an audible and/or visual alarm); communicating, via the communication interface 108, an alert message to a mobile application executing on a wireless communication device carried by the person; and/or communicating, via the communication interface 108, at least some of the video data from the analyzed video stream (e.g., the last ten seconds or 300 video frames) to a mobile video processing and display application executing on a wireless communication device carried by the person. In the latter case, the application may be configured to automatically play and display the received video to enable the person under surveillance to promptly assess the potential threat and react thereto as necessary.

Figure 5:
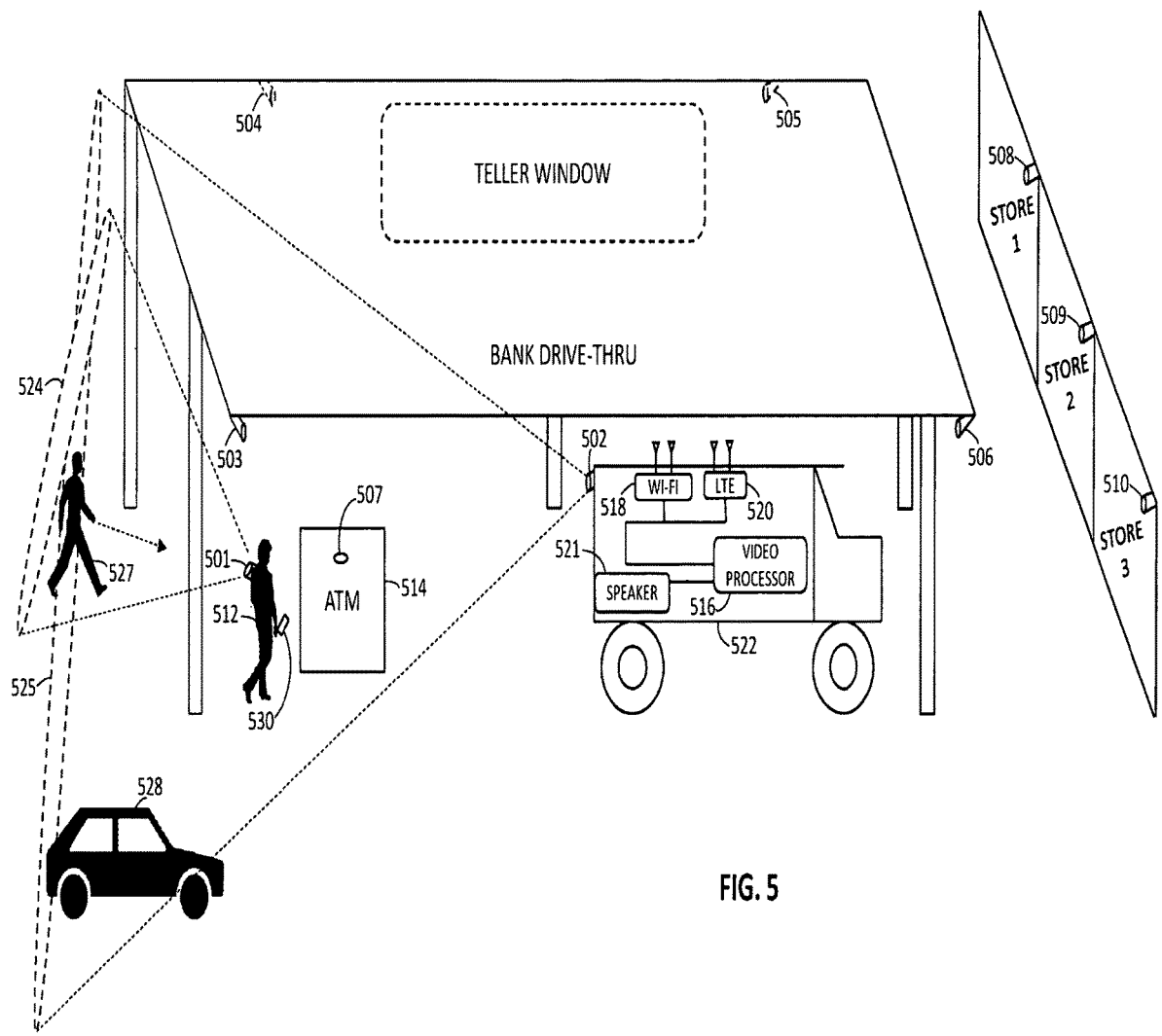
FIG. 5 illustrates an exemplary use case for the processes and system of FIGS. 1-4.
Figure 6:
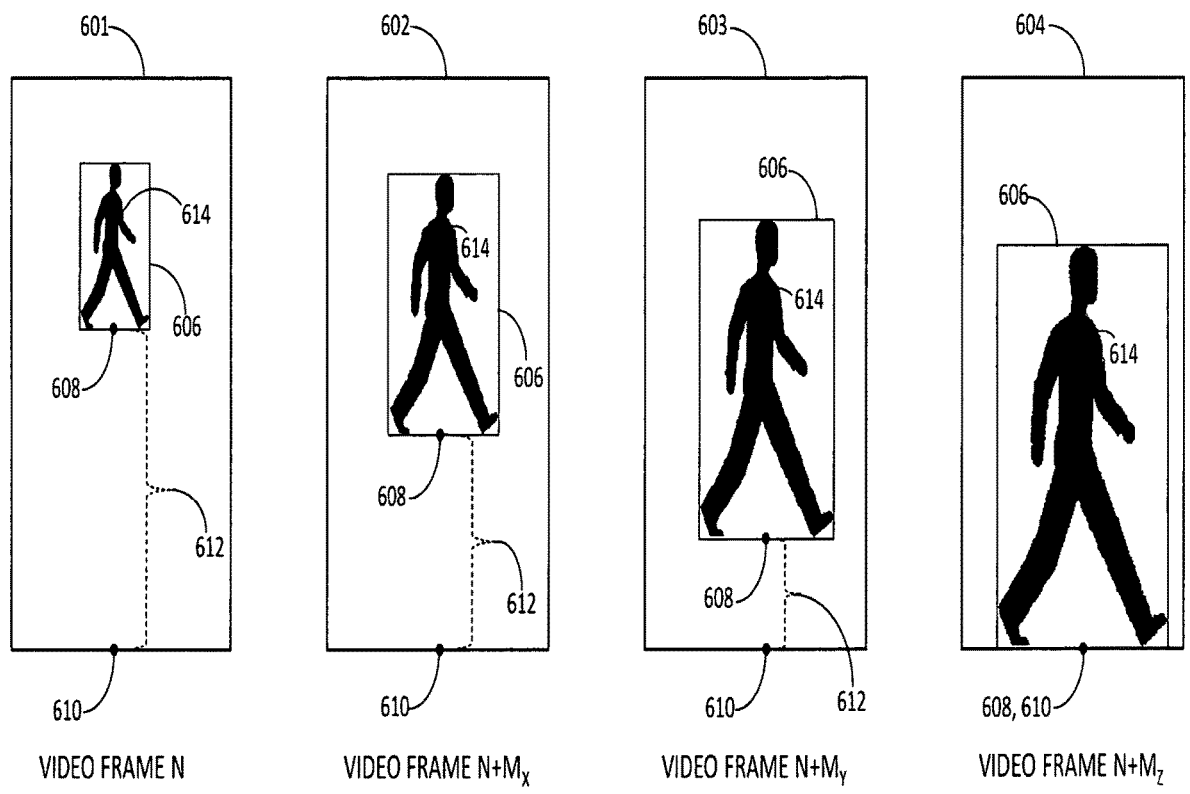
FIG. 6 illustrates an exemplary set of video frames received and analyzed by a video processing system while performing threat detection for the use case of FIG. 5.
Figure 7:
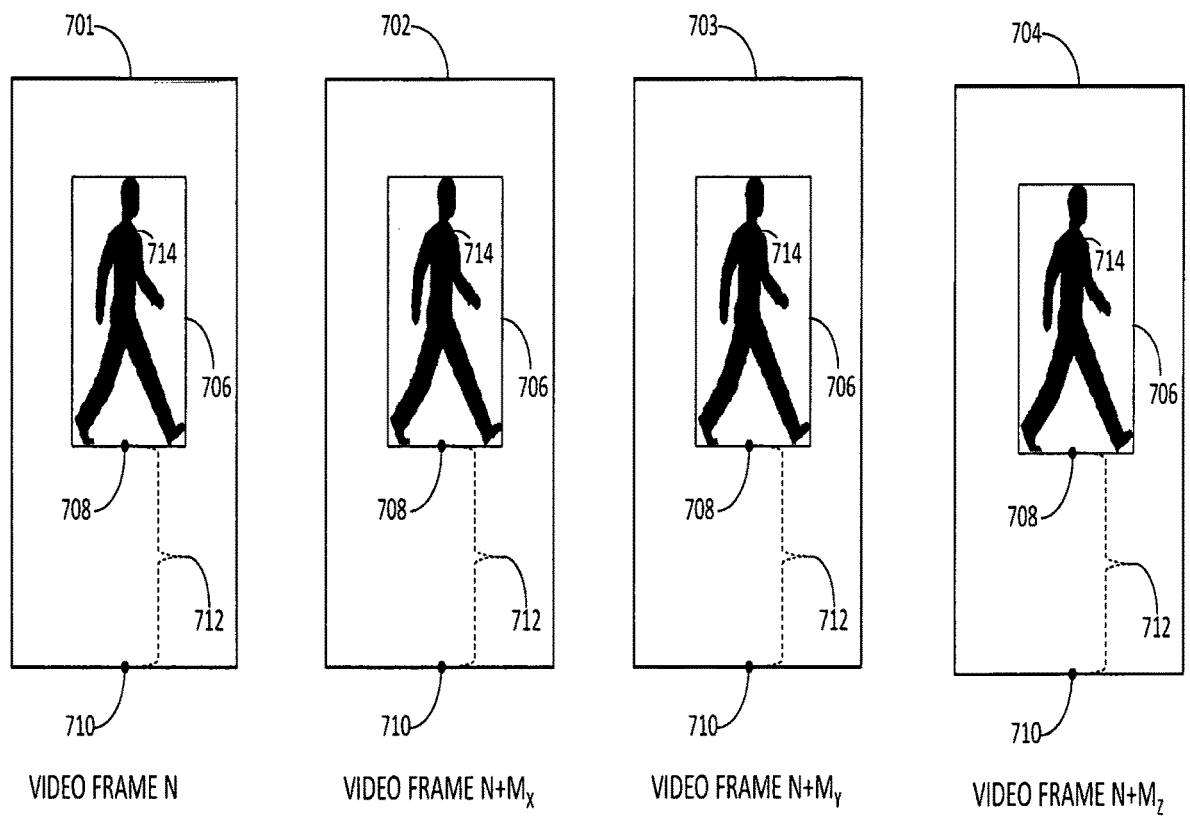
FIG. 7 illustrates an alternative exemplary set of video frames received and analyzed by a video processing system while performing threat detection for the use case of FIG. 5.

FIGS. 5-7 illustrate an exemplary use case for the processes and system of FIGS. 1-4. According to this exemplary scenario, a cash transport service employee 512 has driven into and parked in the automated teller machine (ATM) drive-thru lane of a bank. The vehicle 522 used to transport the employee 512 may be parked a few feet in front of the ATM 514 to be serviced, as generally shown in FIG. 5. In this particular situation, the video processing system may include a video processing apparatus and one or more cameras. Where the video processing system is a closed system, the cameras may include a camera 501 secured to the body of the employee 512 (e.g., as installed in or attached to a vest, jacket, shoulder harness or other item worn by the employee 512 while performing his job function) and one or more vehicle-mounted cameras 502 (one shown for illustration purposes). Where the video processing system is an open system capable of receiving and processing video data from third party video cameras, the cameras may further include a variety of cameras that may be positioned at or near the monitored location. Such cameras may include bank video surveillance cameras 503-506, an internal ATM camera 507, and video surveillance cameras 508-510 mounted outside nearby stores (e.g., of a nearby strip mall).

The video processing apparatus in the exemplary scenario of FIG. 5 may include a video processor 516 and a communication interface. The communication interface may include a short-range wireless interface, such as a Wi-Fi interface 518, and/or a wide-area wireless interface, such as a 4G LTE interface 520. The Wi-Fi interface 518 may be used to communicate video data and control signaling between the video processor 516 and the cameras 501-510 used in the particular implementation of the system, as well as between the video processor 516 and a wireless communication device 530 (e.g., smartphone) carried by the employee 512 (where such device 530 is used to provide threat alerts and/or related video to the employee 512). The LTE interface 520 may be similarly used to communicate video data and control signaling between the video processor 516 and the body-mounted camera 501, the vehicle-mounted camera 502, and/or a wireless communication device 530, but may be further used to communicate video data and other information between the video processor 516 (and/or the cameras 501, 502) and one or more remote devices, such as a remote control center for the cash transport service company, a law enforcement emergency response center, a cloud storage service, and/or any other remote device that may interface with the video processing system.

The video processing system may further include or be connected to a local alerting mechanism, such as a speaker 521. The alerting mechanism may be controlled by the video processor 516 to alert (e.g., audibly alert in the case of speaker 521) the employee 512 of a potential threat. In the embodiment illustrated in FIG. 5, the video processing apparatus is located entirely within the employee's transport vehicle 522. In an alternative embodiment, the video processing apparatus and/or its function may be distributed, such that some or all of the video processor function is performed by one or more server instances in a cloud server. An exemplary architecture for a cloud-based implementation of the video processor 110, 516 is described below with respect to FIG. 8.

For the sake of brevity and ease of understanding, operation of the video processing system in connection with the exemplary scenario illustrated in FIG. 5 will be limited to considering video images captured by the employee's body-mounted camera 501 and the vehicle-mounted camera 502. However, those of ordinary skill in the art will readily recognize and appreciate that the general principles of operation described below and otherwise herein may be applied to systems in which video and/or still images captured by other cameras 503-510 are considered in the threat determination process.

As shown in an exemplary manner in FIG. 5 by dashed conically-shaped patterns, the body-mounted camera 501 captures images in a first video capture area 524 and the vehicle-mounted camera 502 captures images in a second video capture area 525. Each video capture area 524, 525 is defined by the particular characteristics of its respective camera 501, 502. As shown in FIG. 5, each video capture area 524, 525 includes an area that is proximate the employee 512, who is the person under surveillance in this example. The video capture area 525 of the vehicle-mounted camera 502 includes the employee 512; whereas, the video capture area 524 of the body-mounted camera 501 is basically from the employee's viewing perspective in the direction and field of view of the camera 501. Although depicted as a rearward-facing camera, the body camera 501 may alternatively be forward-facing and/or the employee 512 may wear multiple cameras facing in multiple directions.

In the exemplary scenario depicted in FIG. 5, two potential threats to the employee 512 are shown for illustrative purposes. The first potential threat is a person 527 who is walking in the general direction illustrated by the dashed arrow originating from the person 527. The second potential threat is a parked car 528 positioned generally near the location of the employee 512.

After the video processing system has been activated, each camera 501, 502 begins capturing images from its respective video capture area 524, 525 and communicating video data representing time-sequenced video frames to the video processor 516. The video data may include metadata, such as time stamps (e.g., where each video camera 501, 502 includes a global positioning satellite (GPS) unit or other accurate time source), or other information based upon which the video frames from each camera 501, 502 can be time-synchronized. The video processor 516 receives the video data from the cameras 501, 502 in real time or near real time using a streaming control protocol, such as RTSP, to control the streams of video data from the two cameras 501, 502. The video processor 516 analyzes the video data in each video frame from each camera 501, 502 to determine whether the video frame data includes data representative of one or more potential threat patterns. The set of potential threat patterns may be stored in memory of, or otherwise accessible to, the video processor 516. To determine whether a video frame received from a camera 501, 502 includes a potential threat pattern, the video processor 516 may compare the video frame data to the previously stored data representative of the set of potential threat patterns. The set of potential threat patterns may include, for example, the outline or other features of a human body or a portion thereof, the outline or other features of one or more predetermined objects (such as a firearm, knife, bat, club, TASER, or other object that could be used as a weapon), and/or the outline or other features of a vehicle. The video processor 516 may be programmed to update and/or expand the stored potential threat pattern data by applying machine learning techniques, such as supervised learning techniques (e.g., classification and/or regression algorithms), unsupervised learning techniques (e.g., association, clustering, and/or dimensionality reduction algorithms), and/or reinforcement learning techniques, to video data received by the video processor 516 from the system's cameras 501, 502 over time.

When the video processor 516 has determined that at least a portion of the video frame data includes data substantially similar to stored data representative of one or more potential threat patterns, the video processor 516 may determine that the video frame data includes potential threat pattern data. As discussed above with respect to FIG. 2, the video processor 516 may determine video data is substantially similar to potential threat pattern data where the video data has at least a fifty percent (50%) correspondence with data for a particular potential threat pattern within the set of potential threat patterns. In an alternative embodiment, the video processor 516 may determine whether the video frame data includes potential threat pattern data or other predefined pattern data by comparing combinations of position and velocity vectors for multiple simultaneously-tracked patterns to prestored reference combinations of position and velocity vectors and assigning a threat probability for each tracked pattern based on the degree of correspondence between the combination of position and velocity vector for the tracked pattern and one or more prestored reference combinations of position and velocity vectors.

When the video processor 516 has determined that at least a portion of the video frame data includes data representative of one or more potential threat patterns, the video processor 516 commences tracking of such pattern or patterns within the video data received from the cameras 501, 502. Pattern tracking may be performed on a video frame-by-video frame basis or on any other periodic or aperiodic basis (e.g., every other video frame, every fifth video frame, every third video frame during daylight hours, but every video frame during nighttime hours, and so forth). According to one exemplary embodiment, the video processor 516 may define a bounding area for each tracked pattern and initiate tracking to monitor for changes to the tracked pattern bounding area over time, especially within each camera's video capture area. For example, once a tracked pattern is detected in video data representing a video frame, the video processor 516 may position a shape as a boundary around the tracked pattern to form a trackable area for purposes of reducing the amount of processing resources necessary to track the pattern and its positioning relative to the employee 512. In other words, when a particular predefined pattern has been detected within a video frame, the pattern may be "bounded" within a reference area to make evaluating the pattern's positioning over multiple video frames and the potential threat to the employee 512 less processing intensive.

Pattern tracking may be commenced immediately upon detecting that video frame data includes data representative of one or more potential threat patterns or pattern tracking may be commenced selectively, such as only when certain other conditions are met. For example, the video processor 516 may use characteristics of the bounding area as a basis for deciding whether or not to initiate and perform pattern tracking. In such a case, the bounding area characteristics based upon which the video processor 516 may decide to initiate and perform pattern tracking include the size of the bounding area, the proximity of one or more points within the bounding area or on one or more of its edges to a location of the employee 512, and/or the presence of one or more other potential threat patterns in or near the bounding area.

For example, the video processor 516 may determine a location of the tracked pattern bounding area (e.g., within or along an edge of the tracked pattern bounding area) relative to a location of the employee 512 and selectively initiate pattern tracking only when the location of the tracked pattern bounding area is estimated to be within a threshold distance (e.g., within about 45 feet or 14 meters) of the location of the employee 512. As another example, the video processor 516 may determine bounding areas of multiple tracked patterns (e.g., tracked patterns for a vehicle 528 and one or more persons 527) within the video frame data of the cameras 501, 502 and selectively initiate pattern tracking only when the location of the tracked pattern bounding areas for two or more of the tracked patterns are estimated to be within a threshold distance (e.g., about 15 feet or 5 meters) of one another.

After pattern tracking has been commenced, the video processor 516 determines whether data representing one or more subsequent video frames includes data representative of the tracked pattern or patterns. In other words, after pattern tracking has commenced, the video processor 516 analyzes some or all of the data representing video frames subsequent in time to the video frame that triggered the tracking to determine whether such data includes any tracked pattern or patterns. Such analysis may include comparing some or all of the video data representative of a subsequent video frame to previously stored data representative of one or more stored potential threat patterns or comparing some or all of the video data representative of a subsequent video frame to data representative of a potential threat pattern detected in a prior video frame. According to one exemplary embodiment, the video processor 516 analyzes video frame data on a periodic basis after pattern tracking has commenced. For example, the video processor 516 may analyze data representing ten consecutive video frames where the camera 501, 502 supplying the video data is capturing images at a rate of thirty frames per second (30 fps). In such a case, the video processor 516 analyzes every 333 milliseconds of video data to determine whether such data includes the tracked pattern(s) after pattern tracking has commenced. As another example, the video processing system may analyze data representing fifteen consecutive video frames where the camera 501, 502 supplying the video data is capturing images at a rate of sixty frames per second (60 fps). In this particular case, the video processor 516 may analyze every 250 milliseconds of video data to determine whether such data includes the tracked pattern(s) after pattern tracking has been commenced. The quantity of video frames analyzed by the video processing system may be selected based on several factors, including camera video quality, location and/or size of video capture area, positioning of the person within the video capture area, quantity and type of physical and natural structures in or near the video capture area, and so forth.

When data representing one or more subsequent video frames includes data representative of the tracked pattern or patterns, the video processor 516 determines whether the tracked pattern or patterns are positioned suspiciously relative to the employee 512. According to one exemplary embodiment, the video processor 516 may determine whether the analyzed data includes data indicative of movement of the tracked pattern or patterns (or their respective bounding areas) in a potentially threatening manner relative to the employee 512. For example, the video processor 516 may compare the size and positioning one or more tracked patterns in one subsequent video frame to data representative of the same tracked pattern or patterns in one or more other subsequent video frames. According to one embodiment, the video processor 516 may set the position of the employee 512 as a reference origin for images captured by either or both cameras 501, 502. The video processor 516 may then determine whether the tracked pattern bounding area is becoming larger and/or closer to a bottom of each image in the analyzed subsequent video frames based upon the data representing the subsequent video frames. When the tracked pattern bounding area is becoming larger and/or closer to a bottom of each image in the subsequent video frames, the video processor may determine that the tracked pattern is positioned suspiciously relative to the position of the employee 512 or other person under surveillance.

FIG. 6 provides an illustration for how the video processor 516 may analyze a set of video frames to initiate and continue pattern tracking. According to this embodiment, the video processor 516 receives streaming video data from a camera (e.g., camera 501) and extracts therefrom data representing a video frame 601 (e.g., Video Frame N in FIG. 6). The video processor 516 compares the video frame data to data representing a set of potential threat patterns. In the illustrated case, the set of potential threat patterns includes one or more patterns for a person 527 and the video processor 516 determines that the outline of a person 527 is substantially similar to a stored potential threat pattern 614. In response to such determination, the video processor 516 defines a bounding area 606 for the detected pattern 614 by overlaying the pattern 614 with a simpler geometric shape (e.g., a rectangle in this particular case).

According to one exemplary embodiment, the video processor 516 may commence pattern tracking upon defining the tracked pattern bounding area 606. According to another exemplary embodiment, the video processor 516 may determine a location of the tracked pattern bounding area 606 relative to a location of the employee 512 and then initiate pattern tracking when the location of the tracked pattern bounding area 606 is estimated to be within a threshold distance of the location of the employee 512. To determine the distance between the tracked pattern bounding area 606 and the employee 512, the video processor 516 may set the position of the employee 512 or other person under surveillance as the reference origin for the images captured by the camera 501 and determine a pixel or other distance 612 between a point or pixel coordinate 608 on an edge (e.g., bottom edge) of the bounding area 606 and a corresponding point or coordinate 610 along an edge (e.g., bottom edge) of the video frame 601. When the determined distance 612 is less than a predefined threshold distance (e.g., a pixel distance that equates to an actual, physical distance of less than about 100 feet or about 30 meters, or such other distance as may be defined by the system operator), the video processor 516 may commence pattern tracking.

According to the embodiment illustrated in FIG. 6, the video processor 516 may set the position of the employee 512 or other person under surveillance as the reference origin for images captured by the camera 501, if the video processor 516 hasn't already done so when determining whether to commence pattern tracking. Setting the position of the employee 512 or other person under surveillance as the reference origin provides a point of view for the video processor 516 to assess the potential threat of the tracked pattern's subject to the employee 512. To evaluate the potential threat, the video processor 516 may monitor the size of the tracked pattern bounding area 606 over a set of video frames 602-604 that are subsequent in time to the video frame 601 that resulted in commencement of pattern tracking (three video frames 602-604 are shown in the set of subsequent video frames for illustration, but the set may include ten or more video frames as described above). The set of subsequent video frames 602-604 over which a tracked pattern is analyzed may be sequential in nature (e.g., using the nomenclature from FIG. 6, $M_y$ may equal $M_{x+1}$ and $M_z$ may equal $M_{y+1}$) or may be otherwise selected over the tracking time period (e.g., $M_y$ may equal $M_{x+2}$, $M_z$ may equal $M_{y+3}$, and so forth based on how the frames to be analyzed are selected).

When the size of the tracked pattern bounding area 606 becomes larger over the set of subsequent video frames 602-604 (e.g., as illustrated in FIG. 6), the video processor 516 may determine that the tracked pattern 614 is approaching the employee 512 and, therefore, is positioned suspiciously relative to the employee 512. To determine whether the tracked pattern bounding area 606 is becoming larger over several video frames, the video processor 516 may use statistical processing to analyze the measured bounding area sizes. For example, the video processor 516 may determine a linear regression from the bounding area size data to represent how the size of the tracked pattern bounding area 606 changes across the set of subsequent video frames 602-604. The video processor 516 may then determine a gradient for the linear regression and compare the gradient to a threshold. For example, in the context of a potentially threatening person approaching the employee 512, the gradient threshold may be set in the range of 0.040 and 0.060, which equates to a 4.0% to 6.0% increase in boundary area size per second. When the gradient is greater than its threshold, the video processor 516 determines that the tracked pattern bounding area 606 is becoming larger over the set of subsequent video frames 602-604.

Additionally or alternatively, the video processor 516 may be programmed to determine whether the tracked pattern bounding area 606 is becoming closer to a bottom of each image in the subsequent set of video frames 602-604. Where the position of the employee 512 or other person under surveillance is set as the reference origin for images captured by the camera 501, movement of the tracked pattern 614 toward the bottom of the image over multiple video frames indicates that the tracked pattern 614 is approaching the person under surveillance (e.g., employee 512) and, therefore, may be a potential threat to the person under surveillance. According to this embodiment, the video processor 516 determines a position of a coordinate 608 along a bottom edge of the tracked pattern bounding area 606 and a relationship between the position of the coordinate 608 along the bottom edge of the tracked pattern bounding area 606 and the reference origin for each video frame 601-604 being analyzed. In the example illustrated in FIG. 6, the relationship between the position of the coordinate 608 along the bottom edge of the tracked pattern bounding area 606 and the reference origin is a distance 612 (e.g., pixel distance) between the coordinate 608 along the bottom edge of the tracked pattern bounding area 606 and a coordinate 610 along the bottom edge of the image as defined by the dimensions of the video frame 601-604. For illustration purposes only, the coordinate 608 along the bottom edge of the tracked pattern bounding area 606 is approximately centered along the bottom edge of the tracked pattern bounding area 606 and the coordinate 610 along the bottom edge of the image is likewise centered along the bottom edge of the image.

To determine whether the tracked pattern bounding area 606 is becoming closer to the bottom of the image over the analyzed subsequent video frames 602-604, the video processor 516 may use statistical processing to analyze the change in relationship (e.g., distance) between the tracked pattern bounding area 606 and the bottom of each image. For example, the video processor 516 may determine a linear regression from the bounding area-to-reference image distance data to represent how the relationship between the position of the coordinate 608 along the bottom edge of the tracked pattern bounding area 606 and the reference origin changes across the set of subsequent video frames 602-604. The video processor 516 may then determine a gradient for the linear regression and compare the gradient to a threshold. For example, in the context of a potentially threatening person approaching the employee 512, the gradient threshold may be set in the range of −0.010 and −0.020, which equates to a 1% to 2% decrease in distance per second. When the gradient is less than its threshold, the video processor 516 determines that the tracked pattern bounding area 606 is becoming closer to the bottom of each image (and, therefore, closer to the reference origin) over the set of subsequent video frames 602-604. The video processor 110, 516 may analyze bounding area size changes, bounding area positioning relative to a reference origin or other reference point, both bounding area size changes and bounding area positioning, and/or any other video data-based characteristics to make its final determination as to whether a tracked pattern is positioned suspiciously relative to a position of the person under surveillance.

According to another exemplary embodiment, the video processor 516 may compare data representative of a tracked pattern 614 in one set of subsequent video frames 602, 603 to data representative of the tracked pattern 614 in another, later-in-time set of subsequent video frames 603, 604. Responsive to such comparison, the video processor 516 may determine one or more motion vectors that represent movement of the tracked pattern 614 over time. Thereafter, the video processor 516 may determine, based on the motion vector or vectors, whether the tracked pattern 614 is moving generally toward the person under surveillance (e.g., employee 512). When the tracked pattern 614 is moving generally toward the employee 512, the video processor 516 may determine a distance between the tracked pattern 614 and the employee 512. When the determined distance is less than a threshold, the video processor 516 may determine that video data representing the one or more subsequent video frames 602-604 includes data indicative of movement of the tracked pattern 614 in a potentially threatening manner relative to the employee 512. To assess whether the tracked pattern 614 is moving generally toward the employee 512, the video processor 516 may determine whether the tracked pattern 614 is moving directly toward the employee 512 or toward a position that is close enough to the employee 512 to pose a threat to the employee 512 depending on, for example, the details of the tracked pattern 614, or is moving on a path that will, with a high probability, intersect with or be in close proximity to a path of the employee 512.

According to another exemplary embodiment, the video processor 516 may receive motion data associated with the employee 512 or other person under surveillance, where the motion data is time-synchronized with the video data. For example, the motion data may be received from the employee's body camera 501, such as from one or more motion sensors (e.g., accelerometer, gyroscope, global positioning system (GPS), or other sensors) embedded within the camera 501, or from a mobile device 530 carried by the employee 512 (e.g., from a smartphone running a mobile application that is time-synchronized with the employee's body camera 501). Where the motion data is supplied by the employee's body camera 501, the motion data may be received by the video processor 516 as metadata within the video data stream from the camera 501.

Where motion data for the employee 512 or other person under surveillance is received in addition to video data, the video processor 516 may use the motion data to assist with determining whether one or more tracked patterns are positioned suspiciously relative to the employee 512 or other person under surveillance. In such a case, when the video processor 516 determines that the employee 512 is in motion, the video processor 516 may further determine, based on video data over multiple video frames, whether the tracked pattern 614 is becoming substantially smaller in size (e.g., at least twenty-five percent smaller over one or more video frames) or is no longer present in the video capture area 524. When the employee 512 is in motion and the tracked pattern 614 is not becoming substantially smaller in size and/or remains present in the video capture area 524, the video processor 516 may determine that the tracked pattern 614 is positioned suspiciously relative to the position of the employee 512. For example, not having the tracked pattern 614 become substantially smaller and/or having the tracked pattern 614 remain in the video capture area 524 could indicate that the person 527 represented by the tracked pattern 614 is following the employee 512 or other person under surveillance. Alternatively, when the employee 512 is in motion and the tracked pattern 614 is becoming substantially smaller in size or is no longer present in the video capture area 524, the video processor 516 may determine that the tracked pattern 614 is not positioned suspiciously relative to the position of the employee 512. According to one exemplary embodiment, the video processor 516 may be programmed to consider a decrease in the size of the tracked pattern 614 or the tracked pattern's bounding area 606 by at least twenty-five percent over the analyzed video frames 601-604 to indicate that the tracked pattern 614 is becoming substantially smaller in size for purposes of assessing whether the tracked pattern 614 is positioned suspiciously relative to the position of the employee 512.

FIG. 7 provides an illustration for how the video processor 516 may analyze a set of video frames 701-704 in connection with receipt of motion data associated with a person under surveillance (e.g., employee 512). According to this embodiment, the video processor 516 receives streaming video data from a camera (e.g., camera 501) and extracts therefrom data representing a video frame 701 (Video Frame N). The video data stream or metadata thereof may include motion data representing outputs from one or more motion sensors within the camera 501. For example, the motion data may have been inserted by the camera 501 into the video data stream through use of supplemental enhancement information (SEI) messages in accordance with the H.264 video codec (MPEG-4 Advanced Video Coding Part 10) standard. As detailed above with respect to FIG. 6, the video processor 516 compares the video frame data to stored data representing a set of potential threat patterns. In the illustrated case, the set of potential threat patterns includes one or more patterns for a person 527 and the video processor 516 determines that the outline of a person 527 is substantially similar to a stored potential threat pattern 714. In response to such determination, the video processor 516 defines a bounding area 706 for the detected pattern 714 by overlaying the pattern 714 with a simpler geometric shape (e.g., a rectangle in this particular case).

According to one exemplary embodiment, the video processor 516 may commence pattern tracking upon defining the tracked pattern bounding area 706. According to another exemplary embodiment, the video processor 516 may determine a location of the tracked pattern bounding area 706 relative to a location of the person under surveillance and then initiate pattern tracking when the location of the tracked pattern bounding area 706 is estimated to be within a threshold distance of the location of the person under surveillance. To determine the distance between the tracked pattern bounding area 706 and the person under surveillance, the video processor 516 may set the position of the person under surveillance as the reference origin for the images captured by the camera 501 and determine a pixel or other distance 712 between a point or pixel coordinate 708 on an edge (e.g., bottom edge) of the bounding area 706 and a corresponding point or coordinate 710 along an edge (e.g., bottom edge) of the image or video frame 701. When the determined distance 712 is less than a predefined threshold distance, the video processor 516 may commence pattern tracking.

According to the embodiment illustrated in FIG. 7, the video processor 516 may set the position of the person under surveillance as the reference origin for images captured by the camera supplying the video data (e.g., body camera 501), if the video processor 516 hasn't already done so when determining whether to commence pattern tracking. To evaluate a potential threat, the video processor 516 may monitor the size of the tracked pattern bounding area 706 over a set of video frames 702-704 that are subsequent in time to the video frame 701 that resulted in commencement of pattern tracking (three video frames 702-704 are shown in the set of subsequent video frames for illustration, but the set may include ten or more video frames as described above). The set of subsequent video frames 702-704 over which a tracked pattern is analyzed may be sequential in nature (e.g., using the nomenclature from FIG. 7, $M_y$ may equal $M_{x+1}$ and $M_z$ may equal $M_{y+1}$) or may be otherwise selected over the tracking time period (e.g., $M_y$ may equal $M_{x+2}$, $M_z$ may equal $M_{y+3}$, and so forth based on how the frames to be analyzed are selected).

When the video processor 516 determines from the motion data that the person under surveillance is in motion (e.g., walking) and further determines from analyzing the data representing the set of subsequent video frames 702-704 that the size of the tracked pattern bounding area 706 is becoming substantially smaller in size or that the tracked pattern 714 is no longer present in the video captured from the camera's video capture area 524, the video processor 516 may determine that the tracked pattern 714 is not positioned suspiciously relative to the person under surveillance. On the other hand, when the video processor 516 determines from the motion data that the person under surveillance is in motion and further determines from analyzing the data representing the set of subsequent video frames 702-704 that the size of the tracked pattern bounding area 706 is not becoming substantially smaller in size and that the tracked pattern 714 remains present in the video captured from the camera's video capture area 524, the video processor 516 may determine that the tracked pattern 714 is positioned suspiciously relative to the person under surveillance.

In an alternative embodiment, the video processor 516 may analyze the distance 712 between the tracked pattern 714 or its associated bounding area 706 and a bottom of the video frame image across the analyzed set of video frames 701-704. To determine the distance between the tracked pattern bounding area 706 and the person under surveillance (e.g., employee 512), the video processor 516 may set the position of the person under surveillance as the reference origin for the images captured by the camera 501 and determine a pixel or other distance 712 between a point or pixel coordinate 708 on an edge (e.g., bottom edge) of the bounding area 706 and a corresponding point or coordinate 710 along an edge (e.g., bottom edge) of the image or video frame 701. When the video processor 516 determines from the motion data that the person under surveillance is in motion and further determines from analyzing the data representing the set of subsequent video frames 702-704 that the distance 712 between the bottom edge coordinate 708 of the tracked pattern bounding area 706 and the bottom edge coordinate 710 of the video frame 702-704 is increasing, the video processor 516 may determine that the tracked pattern 714 is not positioned suspiciously relative to the person under surveillance. On the other hand, when the video processor 516 determines from the motion data that the person under surveillance is in motion and further determines from analyzing the data representing the set of subsequent video frames 702-704 that the distance 712 between the bottom edge coordinate 708 of the tracked pattern bounding area 706 and the bottom edge coordinate 710 of the video frame 702-704 is decreasing or remaining substantially unchanged, the video processor 516 may determine that the tracked pattern 714 is positioned suspiciously relative to the person under surveillance. As described above with respect to FIG. 6, the change in distance 712 from the bounding area edge to the frame/image edge may be used alone or together with the change in the size of the bounding area 706 to determine whether the tracked pattern 714 is positioned suspiciously relative to the person under surveillance when the person under surveillance is in motion.

The exemplary set of video frames 701-704 depicted in FIG. 7 show one example where the size of the bounding area 706 remains substantially unchanged over the analyzed set of video frames 701-704. As a result, where the motion data associated with the person under surveillance indicates that the person under surveillance is in motion, the video data in combination with the motion data indicate to the video processor 516 that the person 527 represented by the tracked pattern 714 may be following the person under surveillance and that the tracked pattern 714 is, therefore, positioned suspiciously relative to the person under surveillance.

The exemplary set of video frames 701-704 depicted in FIG. 7 also show one example where the distance 712 between the bottom edge coordinate 708 of the tracked pattern bounding area 706 and the bottom edge coordinate 710 of the video frame 702-704 remains substantially unchanged. As a result, where the motion data associated with the person under surveillance indicates that the person under surveillance is in motion, the video data in combination with the motion data indicate to the video processor 516 that the person 527 represented by the tracked pattern 714 may be following the person under surveillance and that the tracked pattern 714 is, therefore, positioned suspiciously relative to the person under surveillance.

After one or more tracked patterns 614, 714 have been determined to be positioned suspiciously relative to the position of the person under surveillance (e.g., employee 512), the video processor 516 may alert the person under surveillance of a potential threat. For example, the video processor 516 may communicate a message to an application executing on the employee's wireless communication device 530, where the message causes the application to activate an audible alarm and/or a haptic alarm of the wireless communication device 530. Alternatively, the video processor 516 may communicate at least some of the video data to a video processing and display application executing on the employee's wireless communication device 530. Such video data may include static images, a video stream, or both to enable the employee 512 to independently analyze any potential threat. Alternatively, when a tracked pattern bounding area 606, 706 is defined for a tracked pattern 614, 714, the video data communicated to the employee's wireless device 530 may be augmented with data representing at least one overlay for the tracked pattern bounding area 606, 706. For example, when a rectangular bounding area 606, 706 is defined for the tracked pattern 614, 714, the video data communicated to the employee's wireless device 530 may be augmented with data representing a rectangle overlay positioned over the tracked pattern 614, 714 so as to visibly indicate the tracked pattern bounding area 606, 706 to the employee 512.

Figure 8:
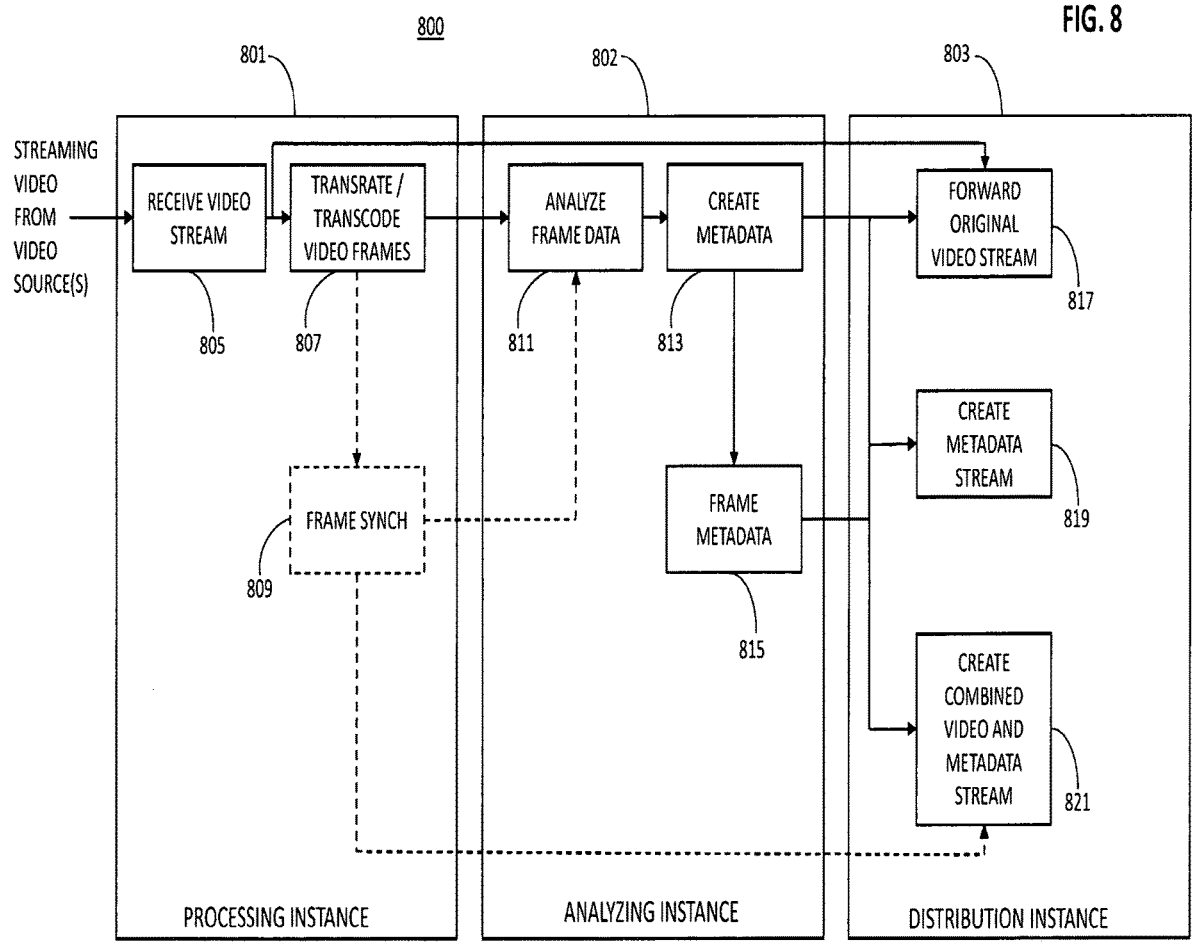
FIG. 8 is a block diagram illustrating a cloud-based architecture for implementing a threat detection method based on real-time or near real-time video analysis, in accordance with a further exemplary embodiment of the present disclosure.

FIG. 8 is a block diagram illustrating a cloud-based architecture 800 for implementing a threat detection method based on real-time or near real-time video analysis, in accordance with a further exemplary embodiment of the present disclosure. The exemplary cloud architecture 800 may include or utilize multiple cloud server instances, including, for example, a processing instance 801, an analyzing instance 802, and a distribution instance 803. The processing instance 801 includes software modules that operate to, inter alia, receive (805) streaming video from the video sources (e.g., cameras), transrate and/or transcode (807) the video frames of the video stream, and optionally perform frame synchronization (809) by, for example, determining frame timing from the received video data and supplying frame synchronization signals to various functions within the analyzing instance 802 and the distribution instance 803. The frame synchronization function (809) may be necessary for video streams, such as MJPEG streams, that do not provide timing themselves. The frame synchronization function (809) is unnecessary for video streams, such as MPEG-4 and H.264 streams, that include video frame presentation time information in their respective container or wrapper formats.

The analyzing instance 802 includes software modules that operate to, inter alia, analyze (811) the video frame data in real time or near real time to determine whether the video frame data includes one or more stored patterns and, if so, track the pattern or patterns over a set of subsequent video frames in the video stream. The analyzing instance 802 may also include software modules to create (813) metadata that may be individually accessible or that may be included with or accompany the video stream. Once created, metadata may be stored in a database together with the presentation time and the video stream identifier of the video frame and video stream to which the metadata respectively relates. At the time of distribution by the distribution instance 803, the analyzing instance 802 may arrange (815) the created metadata into a frame structure that mirrors the frame structure of the video data stream to be forwarded to an end user. Frame synchronization for analyzing the video frame data may also be provided, when necessary, from the frame synchronization function (809) executing in the processing instance 801.

The distribution instance 803 includes software modules that operate to, inter alia, forward (817) the originally-received video stream to a requesting client application, create (819) and communicate to the client application a metadata stream for use by the client application to augment the original video stream, or create (821) and communicate to the client application a combined video and metadata stream that already includes the tracked pattern bounding area overlaid upon the original video stream. Where the metadata is integrated into a combined video and metadata stream, the metadata may be inserted into the video stream as SEI messages when the video data stream is created according to the H.264 video codec. Frame synchronization for creating the metadata stream and/or the combined video and metadata stream may be provided, when necessary, from the frame synchronization function (809) executing in the processing instance 801. The client application to which the video and/or metadata stream is sent may be, for example, a mobile application running on the monitored person's wireless device 530, an enterprise or other software application running on a server/computer at a surveillance monitoring location, an Internet application (e.g., a media player), a web browser, or any other software program that permits viewing videos.

To implement the cloud-based architecture 800 of FIG. 8 according to one exemplary embodiment, a video streaming engine (such as the commercially-available WOWZA video streaming engine) and an object detection process (such as the commercially-available YOLO object detection system) may be run simultaneously on cloud server instances provided through a web services company, such as Amazon Web Services, Inc. ("AWS"). In such a case, the video streaming engine receives (805) one or more video streams from one or more cameras 101-104, 501-510 over the Internet. To achieve low latency in furtherance of performing real-time or near real-time video processing, the cameras used in the video processing system may use the Real-Time Messaging Protocol (RTMP), which is an open specification from Adobe Systems Incorporated, to transmit their video streams to the cloud-based processing instance 801. The video streaming engine transrates (807) each video stream and runs the object detection process on it. The object detection process analyzes (811) each video frame of the video stream and detects any pre-stored patterns in the video frame. Once a pattern is detected, the detected pattern may be tracked by running a threat detection algorithm over a set of subsequent video frames (e.g., a set of 10-20 consecutive video frames following or including the video frame in which the pattern was originally detected). Based on the results of the threat detection algorithm, metadata may be created (813) to facilitate placement of a geometrically-shaped overlay over the tracked pattern to form a tracked pattern bounding area. The metadata may contain the type of geometric shape, positioning of the shape in the video frame, a class name for the tracked pattern (e.g., person, car, weapon, etc.), and a probability that such pattern was accurately detected. The video streaming engine may then create (819, 821) a metadata stream and/or a combined video and metadata stream (video stream augmented with the tracked pattern overlay) and provide (817, 821, 823) the original video stream, the metadata stream, and/or the combined video and metadata stream to one or more client applications via the Internet.

The cloud-based architecture 800 illustrated in FIG. 8 or another similarly-configured architecture may be also or alternatively used to perform video post-processing of one or more videos previously recorded by one or more cameras 101-104, 501-510. In such a case, the recorded video files may be uploaded to a storage unit or bucket of a cloud storage service, such as the AWS S3 service. After uploading has been completed, a compute service, such as the AWS LAMBDA service, may be automatically or manually triggered to run a processing script on the processing instance 801. The processing script downloads the video files (video data) from the cloud storage service into local storage of the cloud server. The video data may then be processed in the same manner as described above with respect to processing of streaming video to ultimately create overlay metadata associated with a video frame or a series of video frames in the processed video data. The created metadata may be stored in a separate file or new videos may be created based on the metadata and the original video data. When created, such new video files may be uploaded to the cloud storage service (e.g., into a new storage unit, such a new AWS S3 bucket) and the original video files may be deleted from the local storage of the cloud server. One exemplary reason to use cloud-based video post-processing may be to generate a highlight or summation video from videos captured by different cameras 101-104, 501-510 so as to enable a pattern to be tracked from different viewing angles.

Figure 9:
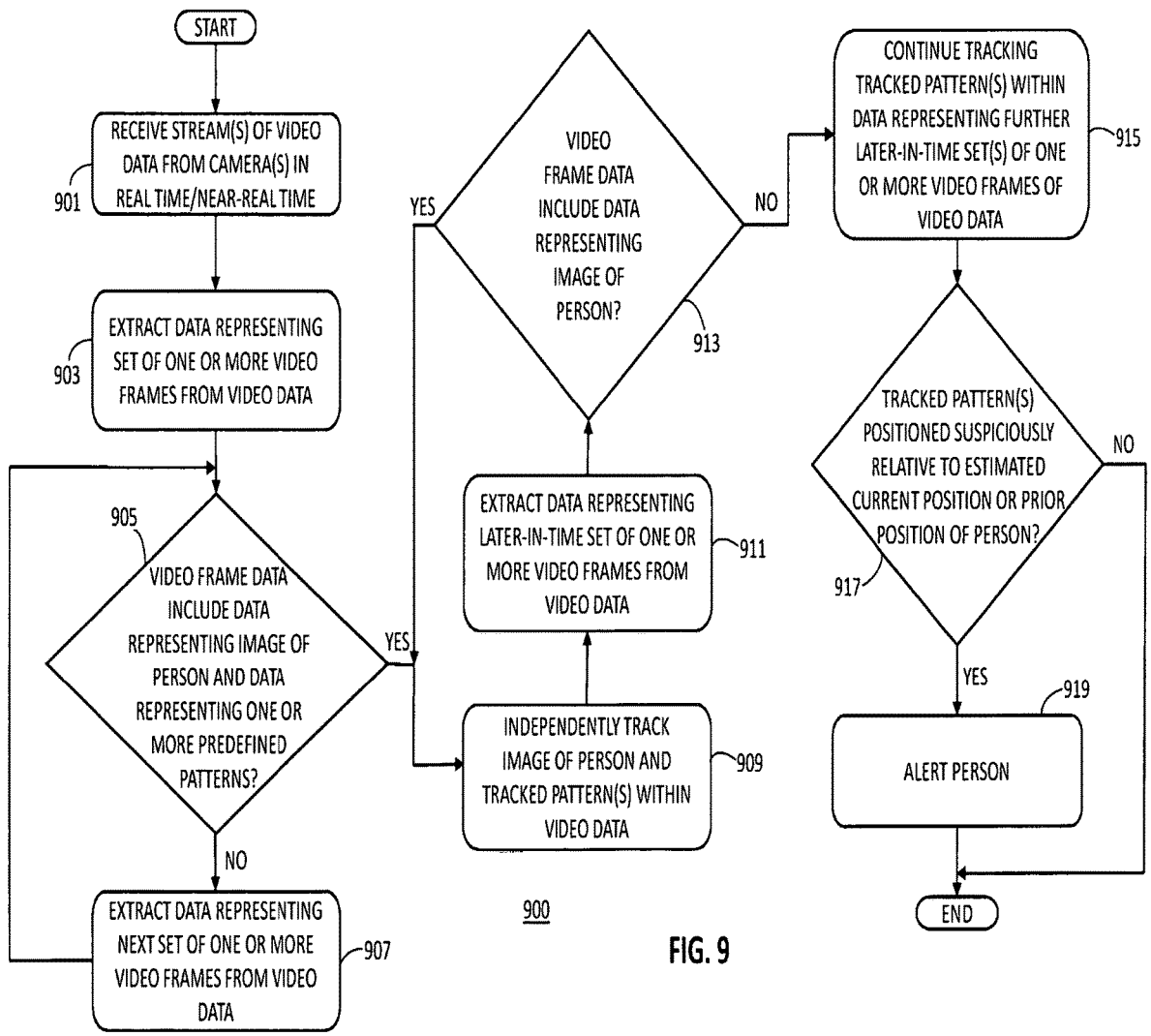
FIG. 9 is a process flow diagram of steps executed by a video processing system to determine whether a tracked pattern is positioned suspiciously relative to an estimated current position or a prior position of a person under video surveillance under circumstances in which the person under surveillance leaves the video coverage area(s) of one or more video cameras, in accordance with another exemplary embodiment of the present disclosure.

FIG. 9 is a process flow diagram 900 of steps executed by a video processing system 100 to detect suspicious activity, including a potential threat, to a person based on real-time or near real-time analysis of video data supplied by one or more cameras in accordance with a further exemplary embodiment of the present disclosure. According to this embodiment, the video processing system 100, through operation of its communication interface 108 and video processor 110, receives (901) one or more video data streams from one or more respective cameras 101-104. The cameras 101-104 may be mounted to or within one or more objects, such as a vehicle, a light pole, an awning or canopy, a wall, a roof, a structural support pole, a telephone pole, a tree, an automated teller machine (ATM), or any other object. The video processor 110 may also be programmed to use a streaming control protocol, such as RTSP, to control the video data streams from the cameras 101-104 when multiple cameras 101-104 are used.

As each video data stream is received at the video processor 110, the video processor 110 extracts (903) data representing a set of one or more video frames from the video data based on the video streaming protocol and the video codec used by the respective camera 101-104 and the video processor 110. Responsive to extracting the video frame data, the video processor 110 determines (905) whether the video frame data includes data representing (or equivalently, representative of) an image of the person under surveillance and data representing one or more predefined patterns. As discussed above with respect to FIGS. 1 and 4, the video processor 110 may compare portions of the video frame data to data representative of a set of predefined patterns previously stored in memory 114 to determine whether a video frame or any portion thereof includes data substantially similar to data representing a predefined pattern. The predefined patterns may include, inter alia, object patterns, animal patterns, and general human image patterns. The video processor 110 may further compare portions of the video frame data to data representative of a set of human image patterns previously stored in memory 114 to determine whether the video frame or any portion thereof includes data substantially similar to data representing an image of the person under surveillance. The process flow of FIG. 9 contemplates that the video processing system 100 may be used to provide suspicious activity alerts to multiple persons under surveillance either simultaneously or at different times. Thus, the system memory 114 may include one or more databases of human image patterns representing images of persons who may be subject to surveillance by the video processing system 100 over time.

When the video frame data from a particular camera 101-104, or from multiple cameras 101-104 over a synchronized time period (e.g., a period of 500 video frames), does not include data representing one or more predefined patterns and data representing an image of the person under surveillance, the video processor 110 extracts (907) data representing the next set(s) of one or more video frames from the video data stream(s) and determines (905) whether that video frame data includes data representing an image of the person under surveillance and data representing one or more predefined patterns. When the video frame data from a particular camera or set of cameras includes data representing one or more predefined patterns and data representing an image of the person under surveillance, the video processor 110 commences independently tracking (909) the image of the person under surveillance and the detected pattern or patterns within the video data and extracts (911) data representing one or more later-in-time sets of video frames from the video data stream or streams. The video processor 110 analyzes the later-in-time video frame data to determine (913) whether such video frame data continues to include data representing the image of the person under surveillance. So long as analyzed video frame data continues to include data representing an image of the person under surveillance, the video processor 110 continues to independently track (909) the image of the person under surveillance and the detected pattern or patterns within the video data. The video processor 110 may also contemporaneously perform the processes described above with respect to FIGS. 2-7 to alert the person under surveillance as to suspicious activity, including potential threats, while such independent person and pattern tracking continues.

Person and pattern tracking may be performed using bounding areas, such as those described above with respect to FIGS. 3 and 6. For example, a bounding area may be defined by the video processor 110 for each predefined pattern that is detected and for the person under surveillance. The bounding areas may then be monitored for changes over time to determine whether the person under surveillance has left the system's video capture area(s) and/or whether a tracked pattern is headed toward a prior position or an estimated current position of the person under surveillance. Additionally, the video processor 110 may determine a location of a tracked pattern bounding area relative to the estimated current position or a prior position of the person under surveillance and initiate monitoring for changes to the tracked pattern bounding area only if the location of the tracked pattern bounding area is estimated to be within a threshold distance of the estimated current position or the prior position of the person under surveillance. The process of defining bounding areas and using them for identification and tracking purposes substantially reduces the processing resources necessary to reliably track patterns and persons over large quantities of video frames.

When the later-in-time video frame data is determined (913) to exclude data representing an image of the person under surveillance, the video processor 110 continues (915) independently tracking data representing the previously detected pattern or patterns within video frame data representing further later-in-time sets of one or more video frames received from the one or more cameras 101-104. In other words, according to the process embodiment depicted in FIG. 9, the video processor 110 continues tracking the tracked pattern or patterns in received video frame data after the person under surveillance has left the video capture area(s) of the video camera(s) 101-104. If the video processor 110 determines (917) that a tracked pattern is positioned suspiciously relative to either a prior position of the person under surveillance within the video capture area(s) of the system's video camera(s) 101-104 or an estimated current position of the person under surveillance (e.g., a position at which the person under surveillance was last determined to be prior to leaving the video capture area(s) of the camera(s) 101-104, or a position of the person as reported to the video processing system 100 via an out-of-system means, such as through use of a third party camera or report), then the video processor 110 alerts (919) the person under surveillance of a potential threat or other suspicious activity. If, on the other hand, the video processor 110 never determines (917) that a tracked pattern is positioned suspiciously relative to either a prior position of the person under surveillance within the video capture area(s) of the system's video camera(s) 101-104 or an estimated current position of the person under surveillance, the tracked pattern monitoring process ends.

To determine whether a tracked pattern is positioned suspiciously relative to a prior position or an estimated current position of the person under surveillance, the video processor 110 may employ the techniques described above with respect to FIGS. 2-6. However, when using such techniques, the position of the person under surveillance would be replaced by either a prior position of the person under surveillance (e.g., as determined by the video processor 110 from positions occupied by the person under surveillance when the person was within the video capture area(s) of the system's camera(s) 101-104) or an estimated current position of the person under surveillance (e.g., a position at which the person under surveillance was last determined to be prior to leaving the video capture area(s) of the camera(s) 101-104, or a position of the person as reported to the video processing system 100 via an out-of-system means, such as through use of a third party camera or report). For example, the video processor 110 may determine whether video frame data, as extracted from received video data, includes data indicative of movement of one or more tracked patterns in a potentially threatening manner relative to the person under surveillance. For instance, the video processor 110 may compare data representing one or more tracked patterns in one set of video frames to data representing the same tracked pattern(s) in at least one subsequent or other later-in-time set of video frames to determine a motion vector (e.g., velocity) for each such tracked pattern representing movement of the tracked pattern over time. Responsive to determining the motion vector(s), the video processor 110 may determine whether each motion vector is in a general direction of either a prior position of the person under surveillance or an estimated current position of the person under surveillance. In other words, the video processor 110 uses the motion vector for a tracked pattern to determine whether the tracked pattern is moving generally toward a prior position or an estimated current position of the person under surveillance.

When the one or more motion vectors are determined to be in a general direction of a prior position or an estimated current position of the person under surveillance, the video processor 110 may determine that the video frame data includes data indicative of movement of one or more tracked patterns in a potentially threatening manner relative to the person under surveillance. For example, the video processor 110 may determine whether the motion vector indicates that a tracked pattern is on a track to intercept or pass near a prior position or an estimated current position of the person under surveillance. In such a case, if a tracked pattern is projected to intercept or pass near a prior position or an estimated current position of the person under surveillance within a threshold time period in the future (e.g., within five seconds or 150 video frames), the video processor 110 may determine that the tracked pattern is positioned suspiciously relative to the person under surveillance. Alternatively, when the one or more motion vectors are determined to be in a general direction of a prior position or the estimated current position of the person under surveillance, the video processor 110 may estimate, based upon the one or more motion vectors, one or more distances between the one or more tracked patterns and the estimated current position or a prior position of the person. In this case, when a distance between a tracked pattern and the estimated current position or a prior position of the person is less than a threshold (e.g., fifty feet), the video processor 110 may determine that the tracked pattern is positioned suspiciously relative to the estimated current position or a prior position of the person, and proceed to alert the person.

According to one exemplary embodiment, tracking of predefined patterns further continues if and when the person under surveillance returns into the video capture area(s) of the system's video camera(s) 101-104 until surveillance is no longer necessary (e.g., the messenger, security guard, or other person under surveillance returns to his or her vehicle and leaves the scene). In other words, the processes described above with respect to FIGS. 2-7 continue to be performed when the person under surveillance returns into the video capture area(s) of the system's video camera(s) 101-104 so as to determine whether any threat may be posed to the person.

The video processor 110 may alert (919) the person under surveillance using one or more of a variety of methods, including those described above with respect to FIGS. 2-7. For example, the video processor 110 may activate a local alert, such as activate an audible and/or visual alarm or send an audio message to a local sound speaker, to notify the person. Alternatively, the video processor 110 may communicate, via the communication interface 108, an alert message to a mobile application or another application (e.g., operating system application) executing on a wireless communication device carried by the person under surveillance (e.g., smartphone, cellular phone, tablet computer, personal digital assistant). In the latter case, the alert message may cause the application to activate an audible alarm and/or a haptic alarm of the wireless communication device and display textual, graphical, and/or other information to notify the person of the suspicious activity. Further, the video processor 110 may generate a report containing information regarding the one or more tracked patterns and communicate the report, via the communication interface 108, to the application executing on the wireless communication device carried by the person under surveillance. The report may include details regarding the suspicious activity and/or a threat assessment as determined and inserted by the video processor 110, or another locally or remotely connected processor, based on data representing video frames that include the predefined pattern or patterns. The threat assessment may be a number on a scale (e.g., a scale of one to five), a color code (e.g., red, yellow, green), or any other mechanism for generally or specifically quantifying a threat level associated with the detected suspicious activity, if any.

In the event that the wireless communication device carried by the person under surveillance had previously lost communication contact with the video processing system 100 (e.g., because the communication device left the coverage area of the video processing system's Wi-Fi network), the video processor 110 may delay communicating the alert (including any suspicious activity report) to the wireless communication device until after the wireless communication device regains communication contact with the video processing system 100. Alternatively or additionally, the video processor 110 may alert the person under surveillance of detected suspicious activity before the person returns to the video capture area(s) of the video processing system 100 (i.e., before an image of the person under surveillance reappears in data representing a future set of one or more video frames received from the one or more video cameras 101-104) so long as the wireless communication device carried by the person under surveillance continues to remain in communication contact with the video processing system 100.

Still further, the video processor 110 may communicate, via the communication interface 108, at least some of the video data from the analyzed video stream(s) (e.g., the last ten seconds or 300 video frames) to a video processing and display application executing on the wireless communication device carried by the person under surveillance. In this case, the application may be configured to automatically play and display the received video to enable the person under surveillance to assess the suspicious activity and react thereto as necessary. According to an alternative embodiment, the video processor 110 may select sequences of video frames from received video frames to create one or more video clips that include the one or more tracked patterns and insert the video clips into a suspicious activity report communicated to the person under surveillance's wireless communication device. The inserted video clips may then be played by an application installed on or accessible from the person's wireless device. As noted above, such a report may further include details regarding the suspicious activity and/or a threat assessment.

Figure 10:
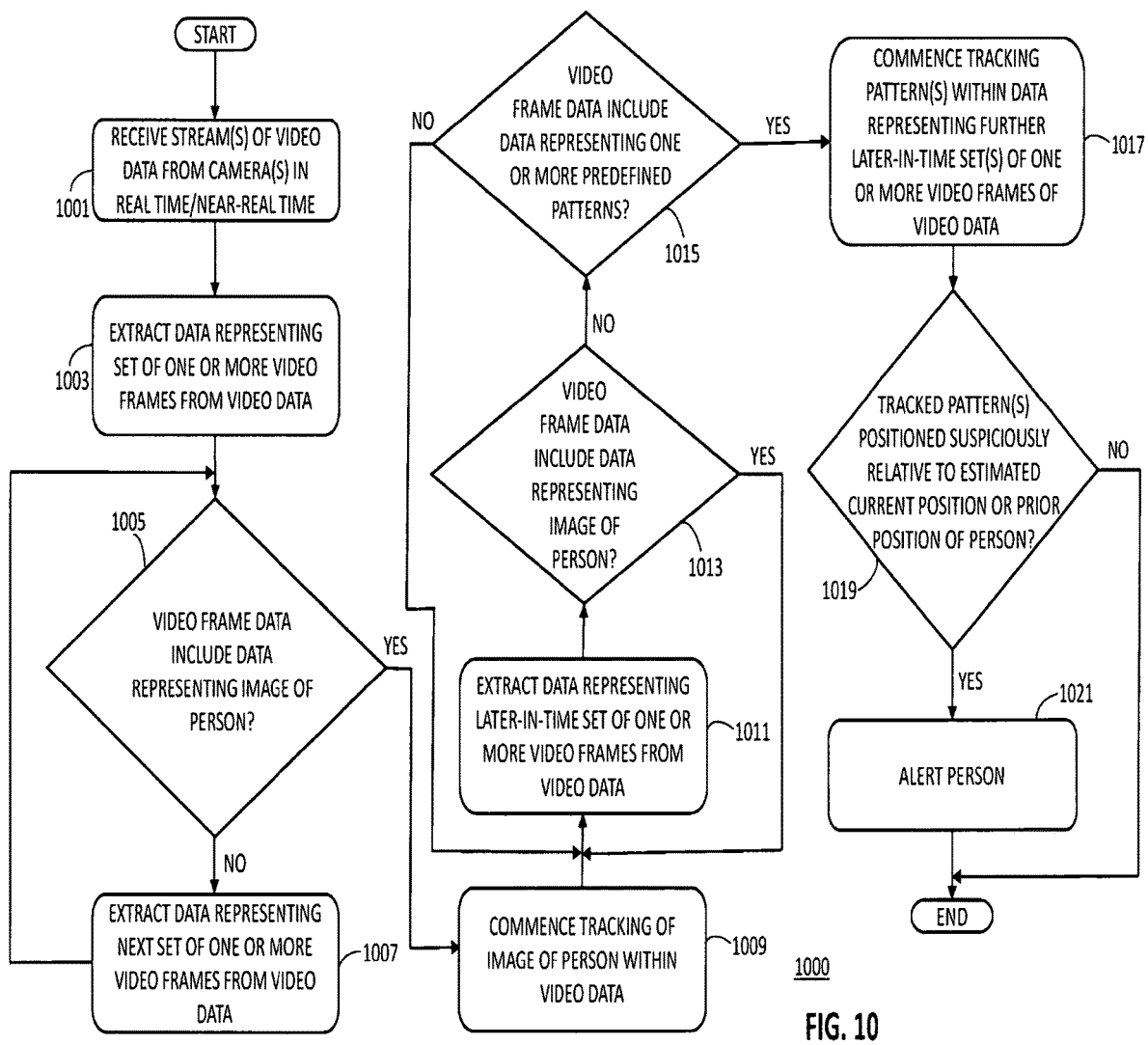
FIG. 10 is a process flow diagram of steps executed by a video processing system to determine whether a tracked pattern is positioned suspiciously relative to an estimated current position or a prior position of a person under video surveillance under circumstances in which the person under surveillance leaves the video coverage area(s) of one or more video cameras, in accordance with yet another exemplary embodiment of the present disclosure.

FIG. 10 is a process flow diagram 1000 of steps executed by a video processing system 100 to detect suspicious activity, including a potential threat, to a person based on real-time or near real-time analysis of video data supplied by one or more cameras in accordance with a further exemplary embodiment of the present disclosure. The process flow depicted in FIG. 10 is similar to the process flow described above with respect to FIG. 9, except that instead of independently tracking one or more predefined patterns and an image of the person under surveillance after detecting data representing both in video frame data received from one or more cameras 101-104 of the video processing system 100, the video processor 110 tracks one or more predefined patterns only after initially detecting an image of the person under surveillance in video frame data received from one or more cameras 101-104 of the video processing system 100 and then later failing to detect an image of the person under surveillance in video frames of later-received video data. Thus, in this embodiment, the video processor 110 withholds assigning resources to detect and track one or more predefined patterns within the received video data until after the video processor 110 determines that the person under surveillance was in, but has now exited, the video capture area(s) of the system's video camera(s) 101-104. Conditioning pattern tracking in this manner enables the video processor 110 to more efficiently manage processing resources, when necessary.

According to the embodiment of FIG. 10, the video processing system 100, through operation of its communication interface 108 and video processor 110, receives (1001) one or more video data streams from one or more respective cameras 101-104 within the video processing system 100. The video processor 110 may be programmed to use a streaming control protocol, such as RTSP, to control the video data streams from the cameras 101-104 when multiple cameras 101-104 are used.

As each video data stream is received at the video processor 110, the video processor 110 extracts (1003) data representing a set of one or more video frames from the video data based on the video streaming protocol and the video codec used by the respective camera 101-104 and the video processor 110. Responsive to extracting the video frame data, the video processor 110 determines (1005) whether the video frame data includes data representing an image of the person under surveillance. As discussed above with respect to FIG. 9, the video processor 110 may compare portions of the video frame data to data representative of a set of human image patterns previously stored in memory 114 to determine whether a video frame or any portion thereof includes data substantially similar to data representing the person under surveillance. The process flow of FIG. 10 contemplates that the video processing system 100 may be used to provide suspicious activity alerts to multiple persons under surveillance either simultaneously or at different times. Thus, the system memory 114 may include one or more databases of human image patterns representing persons who may be subject to surveillance by the video processing system 100 over time.

When the video frame data from a particular camera 101-104, or from multiple cameras 101-104 over a synchronized time period (e.g., ten seconds or 300 video frames), does not include data representing an image of the person under surveillance, the video processor 110 extracts (1007) data representing the next set(s) of one or more video frames from the video data stream(s) and determines (1005) whether that video frame data includes data representing an image of the person under surveillance. When the video frame data from a particular camera or set of cameras includes data representing an image of the person under surveillance, the video processor 110 commences tracking (1009) of the image of the person under surveillance within the video data and extracts (1011) data representing one or more later-in-time sets of video frames from the video data stream or streams. The video processor 110 analyzes the later-in-time video frame data to determine (1013) whether such video frame data continues to include data representing the image of the person under surveillance. So long as analyzed video frame data continues to include data representing an image of the person under surveillance, the video processor 110 continues to track (1009) the image of the person under surveillance. The video processor 110 may also contemporaneously perform the processes described above with respect to FIGS. 2-7 to alert the person under surveillance as to suspicious activity, including potential threats, while the person is being actively tracked.

When the later-in-time video frame data is determined (1013) to exclude data representing an image of the person under surveillance, the video processor 110 determines (1015) whether the video frame data now being received includes data representing one or more predefined patterns. As discussed above with respect to FIGS. 1, 4, and 9, the video processor 110 may compare portions of the video frame data to data representative of a set of predefined patterns previously stored in memory 114 to determine whether the video frame or any portion thereof includes data substantially similar to data representing a predefined pattern. The predefined patterns may include, inter alia, object patterns or features, animal patterns or features, features relating to various locations, and general human image patterns or features.

When the video frame data from a particular camera or set of cameras includes data representing one or more predefined patterns, the video processor 110 commences tracking (1017) of the detected pattern or patterns within video data representing further later-in-time sets of video frames from the video data stream or streams. On the other hand, when the video frame data from a particular camera or set of cameras excludes data representing one or more predefined patterns, the video processor 110 continues analyzing (1011-1015) received later-in-time video data for data representing an image of the person under surveillance (indicating a return of the person to the video capture area(s) of the camera(s) 101-104) and/or data representing one or more predefined patterns.

While an image of the person under surveillance remains absent from the received video data, the video processor 110 continues tracking the tracked pattern or patterns to determine (1019) whether a tracked pattern is positioned suspiciously relative to either a prior position of the person under surveillance within the video capture area(s) of the system's video camera(s) 101-104 or an estimated current position of the person under surveillance (e.g., a position at which the person under surveillance was last determined to be prior to leaving the video capture area(s) of the camera(s) 101-104, or a position of the person as reported to the video processing system 100 via an out-of-system means, such as through use of a third party camera or report). To determine whether a tracked pattern is positioned suspiciously relative to a prior position or an estimated current position of the person under surveillance, the video processor 110 may employ the techniques described above with respect to FIGS. 2-6 and 9. For example, the video processor 110 may determine whether video frame data, as extracted from received video data, includes data indicative of movement of one or more tracked patterns in a potentially threatening manner relative to the person under surveillance. For instance, the video processor 110 may compare data representing one or more tracked patterns in one set of video frames to data representing the same tracked pattern(s) in at least one subsequent or other later-in-time set of video frames to determine a motion vector (e.g., velocity) for each such tracked pattern representing movement of the tracked pattern over time. Responsive to determining the motion vector(s), the video processor 110 may determine whether each motion vector is in a general direction of either a prior position of the person under surveillance or an estimated current position of the person under surveillance. In other words, the video processor 110 uses the motion vector for a tracked pattern to determine whether the tracked pattern is moving generally toward a prior position or an estimated current position of the person under surveillance.

When the one or more motion vectors are determined to be in a general direction of a prior position or an estimated current position of the person under surveillance, the video processor 110 may determine that the video frame data includes data indicative of movement of one or more tracked patterns in a potentially threatening manner relative to the person under surveillance. For example, the video processor 110 may determine whether the motion vector indicates that a tracked pattern is on a track to intercept or pass near a prior position or an estimated current position of the person under surveillance. In such a case, if a tracked pattern is projected to intercept or pass near a prior position or an estimated current position of the person under surveillance within a threshold time period in the future (e.g., within five seconds or 150 video frames), the video processor 110 may determine that the tracked pattern is positioned suspiciously relative to the person under surveillance. Alternatively, when the one or more motion vectors are determined to be in a general direction of a prior position or the estimated current position of the person under surveillance, the video processor 110 may estimate, based upon the one or more motion vectors, one or more distances between the one or more tracked patterns and the estimated current position or a prior position of the person. In this case, when a distance between a tracked pattern and the estimated current position or a prior position of the person is less than a threshold (e.g., fifty feet), the video processor 110 may determine that the tracked pattern is positioned suspiciously relative to the estimated current position or a prior position of the person, and proceed to alert the person.

If a tracked pattern is determined to be positioned suspiciously relative to a prior position or an estimated current position of the person under surveillance, the video processor 110 alerts (1021) the person under surveillance of a potential threat or other suspicious activity. If, on the other hand, the video processor 110 never determines (1019) that a tracked pattern is positioned suspiciously relative to either a prior position of the person under surveillance or an estimated current position of the person under surveillance, the absent person monitoring process ends. According to one exemplary embodiment, tracking of predefined patterns further continues if and when the person under surveillance returns into the video capture area(s) of the system's video camera(s) 101-104 until surveillance is no longer necessary (e.g., the messenger, security guard, or other person under surveillance returns to his or her vehicle and leaves the scene). In other words, the processes described above with respect to FIGS. 2-7 continue to be performed when the person under surveillance returns into the video capture area(s) of the system's video camera(s) 101-104 so as to determine whether any threat may be posed to the person.

The video processor 110 may alert (1021) the person under surveillance using one or more of a variety of methods, including those described above with respect to FIGS. 2-7. For example, the video processor 110 may activate a local alert, such as activate an audible and/or visual alarm or send an audio message to a local sound speaker, to notify the person. Alternatively, the video processor 110 may communicate, via the communication interface 108, an alert message to a mobile application or another application (e.g., operating system application) executing on a wireless communication device carried by the person under surveillance (e.g., smartphone, cellular phone, tablet computer, personal digital assistant). In the latter case, the alert message may cause the application to activate an audible alarm and/or a haptic alarm of the wireless communication device and display textual, graphical, and/or other information to notify the person of the suspicious activity. Further, the video processor 110 may generate a report containing information regarding the one or more tracked patterns and communicate the report, via the communication interface 108, to the application executing on the wireless communication device carried by the person under surveillance. The report may include details regarding the suspicious activity and/or a threat assessment as determined and inserted by the video processor 110, or another locally or remotely connected processor, based on data representing video frames that include the predefined pattern or patterns. The threat assessment may be a number on a scale (e.g., a scale of one to five), a color code (e.g., red, yellow, green), or any other mechanism for generally or specifically quantifying a threat level associated with the detected suspicious activity, if any.

In the event that the wireless communication device carried by the person under surveillance had previously lost communication contact with the video processing system 100 (e.g., because the communication device left the coverage area of the video processing system's Wi-Fi network), the video processor 110 may delay communicating the alert (including any suspicious activity report) to the wireless communication device until after the wireless communication device regains communication contact with the video processing system 100. Alternatively or additionally, the video processor 110 may alert the person under surveillance of detected suspicious activity before the person returns to the video capture area(s) of the video processing system 100 (i.e., before an image of the person under surveillance reappears in data representing a future set of one or more video frames received from the one or more video cameras 101-104) so long as the wireless communication device carried by the person under surveillance continues to remain in communication contact with the video processing system 100.

Still further, the video processor 110 may communicate, via the communication interface 108, at least some of the video data from the analyzed video stream(s) (e.g., the last ten seconds or 300 video frames) to a video processing and display application executing on the wireless communication device carried by the person under surveillance. In this case, the application may be configured to automatically play and display the received video to enable the person under surveillance to assess the suspicious activity and react thereto as necessary. According to an alternative embodiment, the video processor 110 may select sequences of video frames from received video frames to create one or more video clips that include the one or more tracked patterns and insert the video clips into a suspicious activity report communicated to the person under surveillance's wireless communication device. The inserted video clips may then be played by an application installed on or accessible from the person's wireless device. As noted above, such a report may further include details regarding the suspicious activity and/or a threat assessment.

Figure 11:
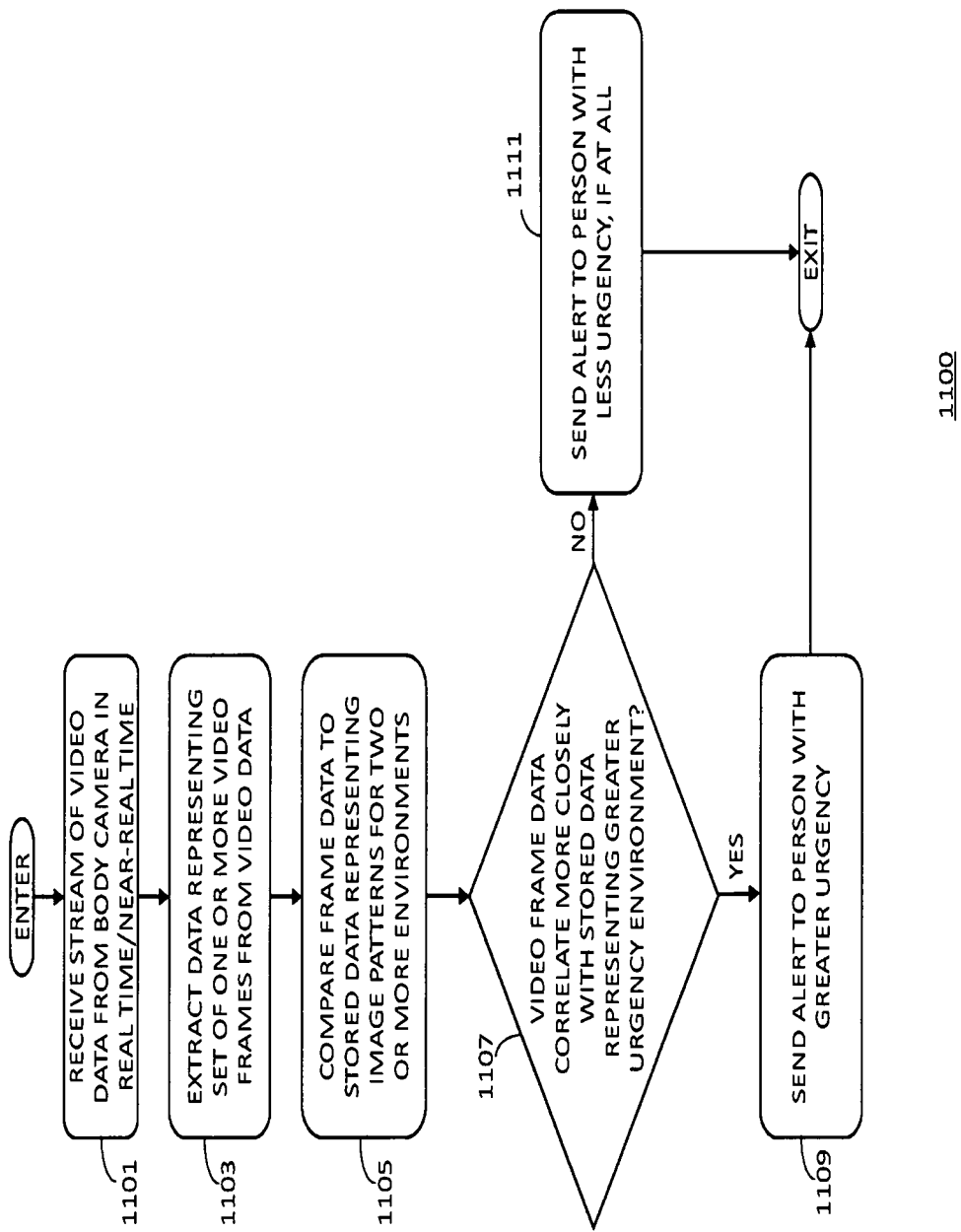
FIG. 11 is a process flow diagram of steps executed by a video processing system to alert a person under video surveillance and wearing a body camera as to suspicious activity based on a current location of the person, in accordance with another exemplary embodiment of the present disclosure.

FIG. 11 is an alternative embodiment of a process flow diagram 1100 of steps executed by a video processing system 100 to alert a person under video surveillance and wearing a body camera as to suspicious activity based on a current location of the person. For this embodiment, the video cameras 101-104 in the system 100 include a body camera secured to the body of the person under surveillance. Additionally, the functions of the video processing system 100 may be performed by one or more video processors 110 or a set of server instances implementing a cloud-based, video processing architecture 800.

According to the process flow 1100 illustrated in FIG. 11, the video processing system 100 receives (1101) a stream of video data in real-time or near real-time from the person's body camera. The video data received from the body camera represents images captured by the body camera. The video processing system 100 extracts (1103) data representing a set of one or more video frames from the received body cam video data and compares (1105) the extracted video frame data to stored data representing image patterns for two or more physical environments. For example, the stored image patterns may include various images that enable the video processing system 100 to determine whether the person under surveillance is in an indoor environment or an outdoor environment. Thus, the predefined image patterns stored in memory 114 may include objects such as cubicle walls, reception desks, shopping carts, steering wheels, dashboards, and so forth to facilitate determination of indoor environments (including the interiors of vehicles) and objects such as bushes, flowers, exterior doors, light poles, and so forth to facilitate determination of outdoor environments.

After comparing the body cam video frame data to the stored pattern data, the video processing system 100 determines (1107) whether the video frame data correlates more closely with a greater urgency environment. The urgency of a particular environment may be established by the video processing system 100 based upon the operational environment of the system 100. For example, where the video processing system 100 is used to monitor a package delivery service employee or a cash transport service employee, the video processing system 100 may set outdoor environments as being greater urgency environments than indoor environments. In other words, where the video processing system 100 is monitoring a package delivery service employee or a cash transport service employee, such an employee typically faces a greater risk of encountering a potential threat outdoors than when the employee is inside a building at which the employee is delivering a package or making a cash pickup. Therefore, for video processing systems 100 monitoring outdoor threats, the video processing system 100 may determine that the person under surveillance is in a lesser urgency environment when the video processing system 100 determines (1107) that the person's body cam video frame data correlates more closely with an indoor environment (i.e., the person's body cam video frame data is determined to include data representing indoor patterns responsive to performing pattern analysis). Conversely, the video processing system 100 may determine that the person under surveillance is in a greater urgency environment when the video processing system 100 determines (1107) that the person's body cam video frame data correlates more closely with an outdoor environment (i.e., the person's body cam video frame data is determined to include data representing outdoor patterns responsive to performing pattern analysis).

On the other hand, where the video processing system 100 is used to monitor persons within a building (e.g., cash office personnel moving cash or casino chips within a casino), the video processing system 100 may set outdoor environments as being lesser urgency environments than indoor environments. In other words, where the video processing system 100 is monitoring a cash office employee, such an employee typically faces a greater risk of encountering a potential threat indoors than when the employee is outside having lunch or a cigarette. Therefore, for video processing systems 100 monitoring indoor threats, the video processing system 100 may determine that the person under surveillance is in a lesser urgency environment when the video processing system 100 determines (1107) that the person's body cam video frame data correlates more closely with an outdoor environment (i.e., the person's body cam video frame data is determined to include data representing outdoor patterns responsive to performing pattern analysis). Conversely, the video processing system 100 may determine that the person under surveillance is in a greater urgency environment when the video processing system 100 determines (1107) that the person's body cam video frame data correlates more closely with an indoor environment (i.e., the person's body cam video frame data is determined to include data representing indoor patterns responsive to performing pattern analysis).

When the video processing system 100 determines that the body cam video frame data correlates more closely with stored pattern data representing a greater urgency environment, the video processing system 100 sends (1109) an alert to the person under surveillance with greater urgency. By contrast, when the video processing system 100 determines that the body cam video frame data does not correlate more closely with stored pattern data representing a greater urgency environment (or determines that the body cam video frame data correlates more closely with stored pattern data representing a lesser urgency environment), the video processing system 100 sends (1111) an alert to the person under surveillance with less urgency, if at all.

Greater urgency alerting may refer to the timing, repetition, and form of alerting. For example, greater urgency alerting may include sending an alert immediately upon the video processing system's determination that (a) a tracked potential threat pattern is positioned suspiciously relative to a prior position or an estimated current position of the person under surveillance and (b) the person under surveillance is presently in a greater urgency environment. Greater urgency alerting may also include sending an alert repeatedly over a short period of time (e.g., once per second or once per five seconds) to increase the likelihood that the person under surveillance notices the alert and its urgency. Greater urgency alerting may further include various forms of alerting, such as haptic, textual, visual, and/or audible alerting, to again increase the likelihood that the person under surveillance notices the alert and its urgency.

Lesser urgency alerting may also refer to the timing, repetition, and form of alerting, albeit in a less urgent manner. For example, lesser urgency alerting may include sending an alert some amount of time after (e.g., 10 seconds or more after) the video processing system's determination that (a) a tracked potential threat pattern is positioned suspiciously relative to a prior position or an estimated current position of the person under surveillance and (b) the person under surveillance is not presently in a greater urgency environment. Lesser urgency alerting may also include sending an alert repeatedly over a longer period of time (e.g., once every 10-30 seconds) to remind the person under surveillance of potential suspicious activity. Lesser urgency alerting may alternatively mean not sending an alert at all. For example, when the video processing system determines, through analysis of body cam video data, that the person under surveillance 512 has returned and is inside his/her vehicle, the video processing system may withhold sending any alert because the person under surveillance is in position to leave the area and any potential suspicious activity.

Lesser urgency alerting may further include various forms of alerting, such as haptic, textual, visual, and/or audible alerting, to again remind the person under surveillance as to the presence of potential suspicious activity, but in a much less overt manner than greater urgency alerting. For instance, lesser urgency alerting may involve haptic and textual alerting only; whereas, greater urgency alerting may involve haptic, textual, and highly audible alerting.

To summarize, according to the logic flow process 1100 of FIG. 11, the video processing system 100 may perform the suspicious activity alerting functions (217, 421, 919, 1021) of FIGS. 2, 4, 9, and 10 with varying degrees of urgency depending upon which physical environment image patterns are present in the monitored person's body cam video frame data. Such urgency-dependent alerting enables the video processing system 100 to efficiently use processing resources while maintaining the overall safety and security of the person under surveillance.

Figure 12:
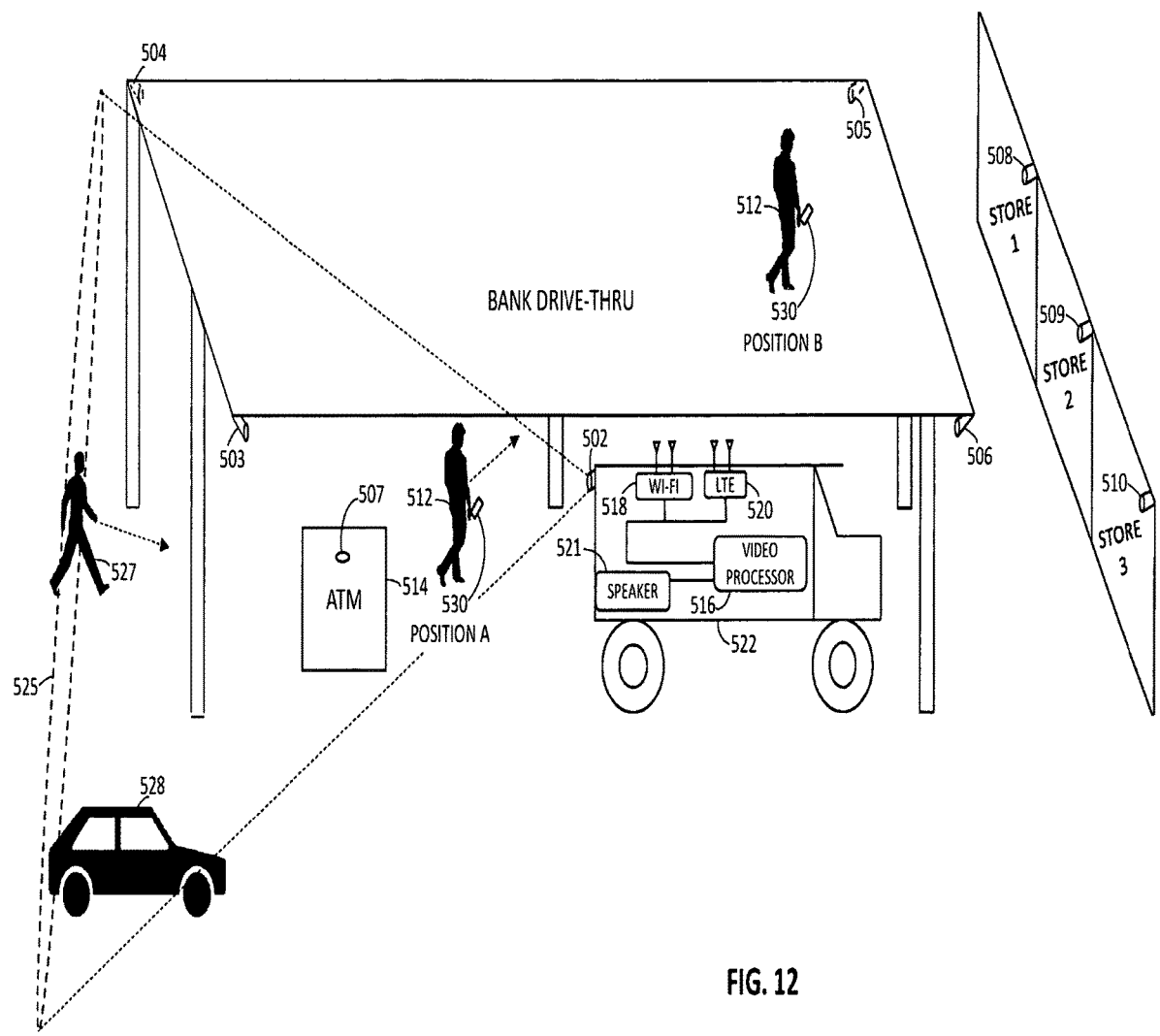
FIG. 12 illustrates an exemplary use case for the processes of FIGS. 9-11.
Figure 13:
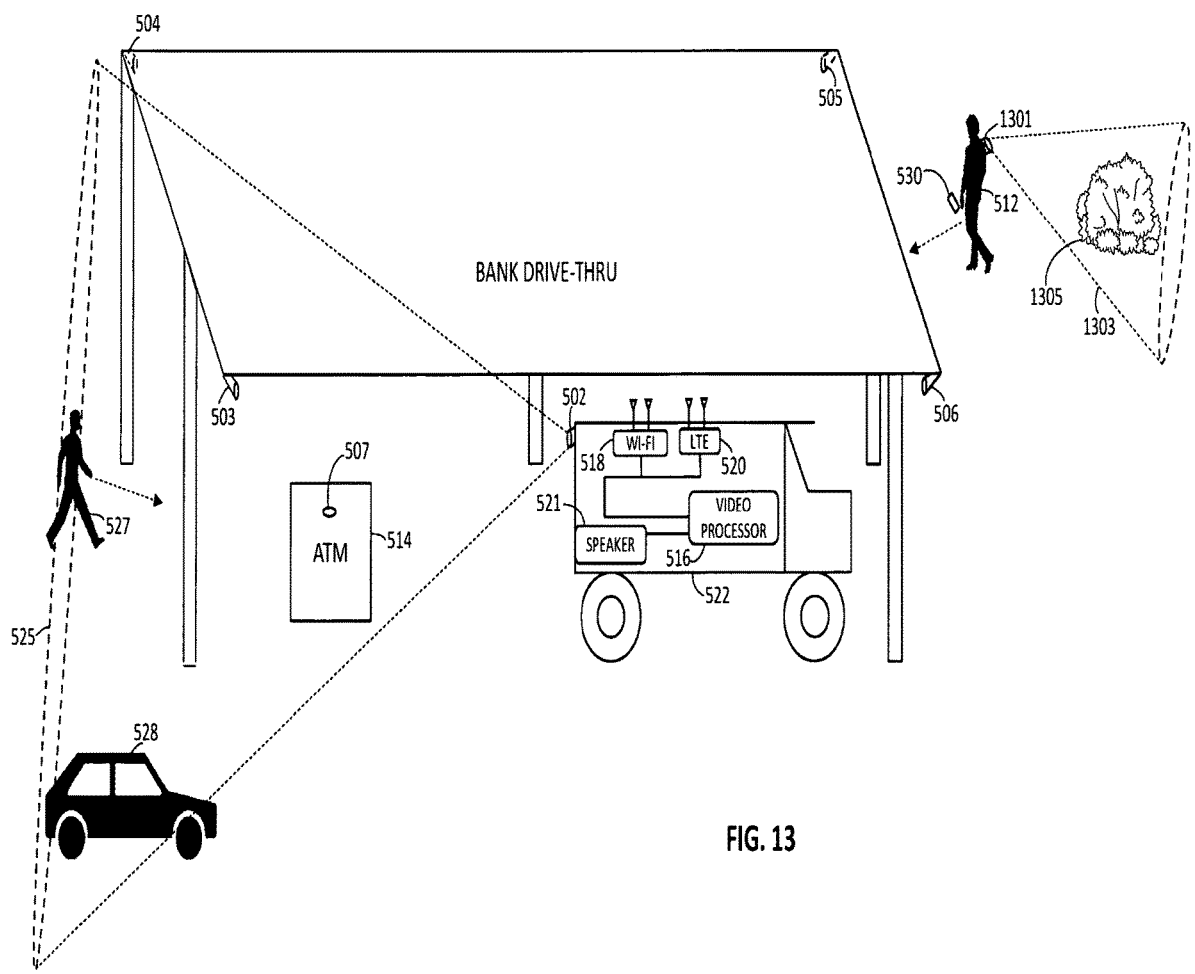
FIG. 13 illustrates another exemplary use case for the processes of FIGS. 9-11.

Two exemplary use cases for applying the processes of FIGS. 9-11 are illustrated in FIGS. 12 and 13. The use case illustrated in FIG. 12 is similar to the use case illustrated in FIG. 5, except the person under surveillance (e.g., a cash transport service employee 512) is shown without an optional body camera 501. According the use case illustrated in FIG. 12, the person under surveillance moves from "Position A" to "Position B" over time (e.g., a few or several seconds) and then potentially further in the general direction of the dashed line projecting from the person under surveillance 512. During his or her travel, the person under surveillance moves out of the video capture area 525 of video camera 502, as well as potentially into and out of the video capture areas of one or more of the other video cameras 503-510 from which the video processor 516 may be receiving video data streams. During the time that the person under surveillance is moving through video capture areas and/or after he or she is gone (i.e., no longer detectable in video streams received from one or more cameras 502-510), the video processor 516 may continue monitoring for potential suspicious activity, including activity that could pose a potential threat to the person under surveillance when, or as, he or she returns. If suspicious activity is detected, the video processor 516 may alert the person under surveillance as to such activity while the person remains out of the cameras' video capture areas, so long as the person's mobile device 530 remains within a coverage range of the video processing system's communication interface (e.g., a Wi-Fi or other short-range interface 518 or an LTE or other wide area network to which the video processing system's wide area interface 520 and the person's mobile device 530 are connected). If the video processor 516 is unable to communicate with the person's mobile device 530 upon determining suspicious activity, the video processor 516 may wait to send an alert until the person's mobile device 530 reconnects with the video processor 516. Alternatively, when circumstances permit and a desire to conserve system resources exists, the video processor 516 may wait to send an alert until the video processor 516 re-detects data representing an image of the person under surveillance within video data received from one or more cameras 502-510 from which the video processor 516 receives video streams. In other words, the video processor 516 may wait to send an alert until the person under surveillance returns into one or more video capture areas of the video processing system.

The use case illustrated in FIG. 12 may be used to assist in further understanding the suspicious activity detection and alerting process described above with respect to FIG. 9. For the sake of brevity and ease of understanding, operation of the video processing system in connection with the exemplary scenario illustrated in FIG. 12 will be limited to considering video images captured by the vehicle-mounted camera 502. However, those of ordinary skill in the art will readily recognize and appreciate that the general principles of operation described below and otherwise herein may be applied to systems in which video and/or still images captured by other cameras 503-510 are considered as part of a suspicious activity determination and alerting process.

In the exemplary scenario depicted in FIG. 12, two potential threats to a person under surveillance (e.g., a cash transport service employee 512) are shown for illustrative purposes. The first potential threat is a person 527 who is moving in the general direction illustrated by the dashed arrow originating from the person 527. The second potential threat is a parked car 528 positioned generally near the ATM 514, which may have been a prior position of the employee 512 before the employee 512 moved to "Position A" (e.g., where the employee 512 was previously removing cash or otherwise accessing the interior of the ATM 514).

After the video processing system has been activated, the vehicle-mounted camera 502 begins capturing images from its respective video capture area 525 and communicating video data representing time-sequenced video frames to the video processor 516. The video data may include metadata, such as time stamps (e.g., where the video camera 502 includes a GPS unit or other accurate time source), or other information based upon which the video frames from the camera 502 can be time-synchronized. The video processor 516 receives the video data from the camera 502 in real time or near real time and may use a streaming control protocol, such as RTSP, to control streams of video data when such data is being received from multiple cameras 502-510. The video processor 516 analyzes the video data in each video frame of the stream received from the camera 502 to determine whether the video frame data includes data representing one or more predefined patterns (e.g., patterns associated with potential threats or other suspicious activity) and data representing the employee 512. A set of predefined patterns may be stored in memory of, or otherwise accessible to, the video processor 516. To determine whether a video frame received from the camera 502 includes a predefined pattern, the video processor 516 may compare the video frame data to the previously stored data representing the set of predefined patterns. The set of predefined patterns may include, for example, the outline or other features of a human body or a portion thereof, the outline or other features of one or more predetermined objects (such as a firearm, knife, bat, club, TASER, or other object that could be used as a weapon), and/or the outline or other features of a vehicle. The video processor 516 may be programmed to update and/or expand the stored predefined pattern data by applying machine learning techniques, such as supervised learning techniques (e.g., classification and/or regression algorithms), unsupervised learning techniques (e.g., association, clustering, and/or dimensionality reduction algorithms), and/or reinforcement learning techniques, to video data received by the video processor 516 from the camera 502 over time.

The video processor 516 also analyzes the video data in each video frame of the stream received from the camera 502 to determine whether the video frame data includes data representing the employee 512. Data representing employees or other persons to be monitored by the video processing system may be stored in the memory of, or a memory otherwise accessible to, the video processor 516. To determine whether a video frame received from the camera 502 includes data representing the employee 512, the video processor 516 may compare the video frame data to previously stored image data representing employees.

When the video processor 516 has determined that at least a portion of the video frame data includes data substantially similar to stored data representing one or more predefined patterns, the video processor 516 may determine that the video frame data includes predefined pattern data. As discussed above with respect to FIG. 2, the video processor 516 may determine video data is substantially similar to data representing a particular predefined pattern where the video data has at least a fifty percent (50%) correspondence or correlation with the data representing the particular predefined pattern within a stored set of predefined patterns. In an alternative embodiment, the video processor 516 may determine whether the video frame data includes data representing a particular predefined pattern by comparing combinations of positions and velocity vectors for multiple simultaneously-tracked patterns to prestored reference combinations of positions and velocity vectors and assigning a threat probability for each tracked pattern based on the degree of correspondence or correlation between the combination of position and velocity vector for each tracked pattern and the combinations of positions and velocity vectors for one or more stored predefined patterns.

When the video processor 516 has determined that at least a portion of the video frame data includes data substantially similar to stored image data representing the employee 512, the video processor 516 may determine that the video frame data includes employee pattern data. The video processor 516 may determine video data is substantially similar to stored image data representing the employee 512 where the video data has at least a fifty percent (50%) correspondence or correlation (and more preferably, at least a seventy-five percent (75%) correspondence or correlation) with stored image data for a particular employee.

When the video processor 516 has determined that at least a portion of the video frame data includes data representing one or more predefined patterns and data representing the employee 512, the video processor 516 commences tracking the predefined pattern and the employee 512 independently within the video data received from the video camera 502. Pattern and employee tracking may be performed on a video frame-by-video frame basis or on any other periodic or aperiodic basis (e.g., every other video frame, every fifth video frame, every third video frame during daylight hours, but every video frame during nighttime hours, and so forth). According to one exemplary embodiment, the video processor 516 may define a bounding area for each tracked pattern and a bounding area for the tracked employee 512. The video processor 516 initiates tracking to monitor for changes to the bounding areas over time, especially within the camera's video capture area 525. For example, once a tracked pattern and the employee pattern are detected in video data representing a video frame, the video processor 516 may position one shape as a boundary around the tracked pattern and the same shape or a different shape as a boundary around the employee pattern to form trackable areas for purposes of reducing the amount of processing resources necessary to track the pattern and the employee 512. In other words, when the employee 512 and a particular predefined pattern have been detected within a video frame, the patterns may be separately "bounded" within respective reference areas to make evaluating the pattern's and employee's positioning over multiple video frames less processing intensive.

After pattern and employee tracking have been commenced, the video processor 516 determines whether data representing one or more subsequent video frames includes data representing the tracked pattern and data representing the employee 512. In other words, after pattern and employee tracking has commenced, the video processor 516 analyzes some or all of the data representing video frames subsequent in time to the video frame that triggered the tracking to determine whether such data includes the tracked pattern and employee 512. Such analysis may include comparing some or all of the video data representative of a subsequent video frame to previously stored data representing the predefined pattern and the employee 512 or comparing some or all of the video data representative of a subsequent video frame to data representing the predefined pattern and the employee 512 as detected in a prior video frame.

According to one exemplary embodiment, the video processor 516 analyzes video frame data on a periodic basis after pattern tracking has commenced. For example, the video processor 516 may analyze data representing ten consecutive video frames where the camera 502 supplying the video data is capturing images at a rate of thirty frames per second (30 fps). In such a case, the video processor 516 analyzes received video data every 333 milliseconds to determine whether such data includes the tracked pattern and the employee 512 after tracking has commenced. As another example, the video processing system may analyze data representing fifteen consecutive video frames where the camera 502 supplying the video data is capturing images at a rate of sixty frames per second (60 fps). In this particular case, the video processor 516 may analyze received video data every 250 milliseconds to determine whether such data includes the tracked pattern and employee 512 after tracking has been commenced. The quantity of video frames analyzed by the video processing system may be selected based on several factors, including camera video quality, location and/or size of video capture area, positioning of the person under surveillance within the video capture area, quantity and type of physical and natural structures in or near the video capture area, and so forth.

When data representing one or more subsequent video frames ceases to include data representing the employee 512 but continues to include data representing the tracked pattern, the video processor 516 continues to track the tracked pattern in subsequent or other later-in-time video frame data to determine whether the tracked pattern is or becomes positioned suspiciously relative to a prior position of the employee 512 or a current estimated position of the employee 512. According to one exemplary embodiment, the video processor 516 may determine whether the analyzed data includes data indicative of positioning of the tracked pattern (or its respective bounding area) near, or movement of the tracked pattern toward, a prior position of the employee 512 (e.g., near the ATM 514 or near the rear of the vehicle 522) or a current estimated position of the employee 512. For example, the video processor 516 may determine a motion vector for the tracked pattern over several received video frames to determine whether the tracked pattern's path of travel will pass near a prior position or a current estimated position of the employee 512. The video processor 516 may also determine a motion vector for the employee 512 prior to the employee 512 leaving the video capture area 525 of the camera 502. The video processor 516 may then analyze the paths of travel of the tracked pattern and the employee 512 based on the motion vectors to determine whether the tracked pattern's path will intersect the employee's path and, if so, where such intersection will take place (which could be at an interpolated position outside the video capture area 525 of the video camera 502). Alternatively, where a tracked pattern is determined to be following the general path of movement of the employee 512 and the tracked pattern exits the video capture area 525 of the video camera 502 near where the employee 512 previously exited such area 525, the video processor 516 may determine that the tracked pattern is positioned suspiciously relative to the estimated current position of the employee 512. For the purpose of estimating the employee's current position, the video processor 516 may select a position in a general region of the camera's video capture area 525 where the employee 512 was last detected in a video frame or where the employee's motion vector would have placed the employee when he/she left the camera's video capture area 525. With respect to a tracked pattern that remains stationary, such as the pattern of the parked car 528, the video processor 516 may continue tracking the pattern for movement and/or analyzing video frame data extracted from the camera's video stream to assess whether one or more additional predefined patterns may be present near the stationary pattern, all while the employee 512 remains outside the video capture area 525 of the camera 502.

If the video processor 516 determines that a tracked pattern is or becomes positioned suspiciously relative to a prior position of the employee 512 or a current estimated position of the employee 512, the video processor 516 sends an alert to the mobile device 530 carried by the employee 512 to inform the employee 512 of such suspicious activity. The alert enables the employee 512 to take necessary precautions to prepare for and/or avert a potential threat either where the employee 512 is currently located or prior to returning to or near any position or location previously occupied by the employee 512 while in the video capture area 525 of the camera 502 supplying real-time or near real-time video data to the video processor 516.

The use case illustrated in FIG. 12 may also be used to facilitate a better understanding of the suspicious activity detection and alerting process described above with respect to FIG. 10. More particularly, the situation illustrated in FIG. 12 provides an exemplary backdrop with which to describe how a video processing system may automatically monitor for suspicious activity after a person under surveillance (e.g., a cash transport service employee 512) exits one or more video capture areas of cameras supplying video streams to the system's video processor 516 and alert the person under surveillance when such suspicious activity is detected. For the sake of brevity and ease of understanding, operation of the video processing system in connection with the exemplary scenario illustrated in FIG. 12 will again be limited to considering video images captured by the vehicle-mounted camera 502. However, those of ordinary skill in the art will readily recognize and appreciate that the general principles of operation described below and otherwise herein may be applied to systems in which video and/or still images captured by other cameras 503-510 are considered as part of a suspicious activity determination and alerting process.

As noted above, two potential threats to the cash transport service employee 512 are shown for illustrative purposes. The first potential threat is a person 527 who is moving in the general direction illustrated by the dashed arrow originating from the person 527. The second potential threat is a parked car 528 positioned generally near the ATM 514, which have been a prior position of the employee 512 before the employee 512 moved to "Position A" (e.g., where the employee 512 was previously removing cash or otherwise accessing the interior of the ATM 514).

After the video processing system has been activated, the vehicle-mounted camera 502 begins capturing images from its respective video capture area 525 and communicating video data representing time-sequenced video frames to the video processor 516. The video data may include metadata, such as time stamps (e.g., where the video camera 502 includes a GPS unit or other accurate time source), or other information based upon which the video frames from the camera 502 can be time-synchronized. The video processor 516 receives the video data from the camera 502 in real time or near real time and may use a streaming control protocol, such as RTSP, to control streams of video data when such data is being received from multiple cameras 502-510. The video processor 516 analyzes the video data in each video frame of the stream received from the camera 502 to determine whether the video frame data includes data representing the employee 512. Data representing employees or other persons to be monitored by the video processing system may be stored in the memory of, or memory otherwise accessible to, the video processor 516. To determine whether a video frame received from the camera 502 includes data representing the employee 512, the video processor 516 may compare the video frame data to previously stored image data representing company employees.

When the video processor 516 has determined that at least a portion of the video frame data includes data substantially similar to stored image data representing the employee 512, the video processor 516 may determine that the video frame data includes employee pattern data. The video processor 516 may determine video data is substantially similar to stored image data representing the employee 512 where the video data has at least a fifty percent (50%) correspondence or correlation (and more preferably, at least a seventy-five percent (75%) correspondence or correlation) with stored image data for a particular employee.

When the video processor 516 has determined that at least a portion of the video frame data includes employee pattern data, the video processor 516 commences tracking the employee 512 within the video data received from the video camera 502. Employee tracking may be performed on a video frame-by-video frame basis or on any other periodic or aperiodic basis (e.g., every other video frame, every fifth video frame, every third video frame during daylight hours, but every video frame during nighttime hours, and so forth). According to one exemplary embodiment, the video processor 516 may define a bounding area for the tracked employee image pattern. In such a case, the video processor 516 initiates tracking to monitor for changes to the bounding area over time, especially within the camera's video capture area 525. For example, once employee pattern data is detected in video data representing a video frame, the video processor 516 may position one shape as a boundary around the employee image pattern to form a trackable area for purposes of reducing the amount of processing resources necessary to track the employee 512. In other words, when an image of the employee 512 has been detected within a video frame, the employee image pattern may be "bounded" within a reference area to make evaluating the employee's positioning over multiple video frames less processing intensive.

After employee tracking have been commenced, the video processor 516 determines whether data representing one or more subsequent video frames includes employee pattern data. In other words, after employee tracking has commenced, the video processor 516 analyzes some or all of the data representing video frames subsequent in time to the video frame that triggered the tracking to determine whether such data includes the employee image pattern. Such analysis may include comparing some or all of the video data representative of a subsequent video frame to previously stored image data for the employee 512 or comparing some or all of the video data representative of a subsequent video frame to data representing the image of the employee 512 as detected in a prior video frame.

According to one exemplary embodiment, the video processor 516 analyzes video frame data on a periodic basis after employee image pattern tracking has commenced. For example, the video processor 516 may analyze data representing ten consecutive video frames where the camera 502 supplying the video data is capturing images at a rate of thirty frames per second (30 fps). In such a case, the video processor 516 analyzes received video data every 333 milliseconds to determine whether such data includes data representing an image of the employee 512. As another example, the video processing system may analyze data representing fifteen consecutive video frames where the camera 502 supplying the video data is capturing images at a rate of sixty frames per second (60 fps). In this particular case, the video processor 516 may analyze received video data every 250 milliseconds to determine whether such data includes data representing an image of the employee 512. The quantity of video frames analyzed by the video processing system may be selected based on several factors, including camera video quality, location and/or size of video capture area, positioning of the employee 512 within the video capture area 525, quantity and type of physical and natural structures in or near the video capture area 525, and so forth.

When data representing one or more subsequent video frames is determined to exclude data representing an image of the employee 512, the video processor 516 begins analyzing subsequent video frames for data representing one or more predefined patterns (e.g., patterns associated with potential threats or other suspicious activity). As discussed above, a set of predefined patterns may be stored in memory of, or otherwise accessible to, the video processor 516. To determine whether a video frame received from the camera 502 includes a predefined pattern, the video processor 516 may compare the video frame data to the previously stored data representing the set of predefined patterns. The video processor 516 may be programmed to update and/or expand the stored predefined pattern data by applying machine learning techniques, such as supervised learning techniques (e.g., classification and/or regression algorithms), unsupervised learning techniques (e.g., association, clustering, and/or dimensionality reduction algorithms), and/or reinforcement learning techniques, to video data received by the video processor 516 from the camera 502 over time.

When the video processor 516 has determined that data representing the employee 512 is absent from received video frame data and at least a portion of the received video frame data includes data substantially similar to stored data representing one or more predefined patterns, the video processor 516 may determine that the video frame data includes predefined pattern data. In other words, the video processor 516 tracks one or more predefined patterns in video data received from the video camera 502 after the employee 512 leaves the video capture area 525 of the camera 502 and for the time period that the employee 512 remains absent from the video capture area 525 of the camera 502. As discussed above, the video processor 516 may determine video data is substantially similar to predefined pattern data where the video data has at least a fifty percent (50%) correspondence or correlation with data for a particular predefined pattern within the stored set of predefined patterns. In an alternative embodiment, the video processor 516 may determine whether the video frame data includes predefined pattern data by comparing combinations of position and velocity vectors for multiple simultaneously-tracked patterns to prestored reference combinations of position and velocity vectors and assigning a threat probability for each tracked pattern based on the degree of correspondence or correlation between the combination of position and velocity vector for the tracked pattern and one or more prestored reference combinations of positions and velocity vectors.

The video processor 516 continues to track the tracked pattern in subsequent or other later-in-time video frame data to determine whether the tracked pattern is or becomes positioned suspiciously relative to a prior position of the employee 512 or a current estimated position of the employee 512. According to one exemplary embodiment, the video processor 516 may determine whether the analyzed data includes data indicative of positioning of the tracked pattern (or its respective bounding area) near, or movement of the tracked pattern toward, a prior position of the employee 512 (e.g., near the ATM 514 or near the rear of the vehicle 522) or a current estimated position of the employee 512. For example, the video processor 516 may determine a motion vector for the tracked pattern over several received video frames to determine whether the tracked pattern's path of travel will pass near a prior position or a current estimated position of the employee 512. The video processor 516 may also determine a motion vector for the employee 512 prior to the employee 512 leaving the video capture area 525 of the camera 502. The video processor 516 may then analyze the paths of travel of the tracked pattern and the employee 512 based on the motion vectors to determine whether the tracked pattern's path will intersect the employee's path and, if so, where such intersection will take place (which could be at an interpolated position outside the video capture area 525 of the video camera 502). Alternatively, where a tracked pattern is determined to be following the general path of movement of the employee 512 and the tracked pattern exits the video capture area 525 of the video camera 502 near where the employee 512 previously exited such area 525, the video processor 516 may determine that the tracked pattern is positioned suspiciously relative to the estimated current position of the employee 512.

For the purpose of estimating the employee's current position, the video processor 516 may select a position in a general region of the camera's video capture area 525 where the employee 512 was last detected in a video frame or where the employee's motion vector would have placed the employee when he/she left the camera's video capture area 525. With respect to a tracked pattern that remains stationary, such as the pattern of the parked car 528, the video processor 516 may continue tracking the pattern for movement and/or analyzing video frame data extracted from the camera's video stream to assess whether one or more additional predefined patterns may be present near the stationary pattern, all while the employee 512 remains outside the video capture area 525 of the camera 502.

If the video processor 516 determines that a tracked pattern is or becomes positioned suspiciously relative to a prior position of the employee 512 or a current estimated position of the employee 512, the video processor 516 sends an alert to the mobile device 530 carried by the employee 512 to inform the employee 512 of such suspicious activity. The alert enables the employee 512 to take necessary precautions to prepare for and/or avert a potential threat either where the employee 512 is currently located or prior to returning to or near any position or location previously occupied by the employee 512 while in the video capture area 525 of the camera 502 supplying real-time or near real-time video data to the video processor 516.

FIG. 13 illustrates an exemplary use case to assist in further understanding the suspicious activity alerting process described above with respect to FIG. 11, where the person under surveillance (in this case, employee 512) is wearing a body camera 1301. The use case illustrated in FIG. 13 is similar to the use case illustrated in FIG. 5, except that the employee 512 has repositioned outside the video capture areas of the cameras 502-507 supplying streaming video to the video processor 516. Additionally, in this use case, the employee's body camera 1301 captures video data from its associated video capture area 1305 and communicates a video stream of the captured video data to the video processor 516 via its own communication interface (e.g., Wi-Fi or LTE) or via a communication interface of the person's mobile device 530 (e.g., via Wi-Fi or other short-range communication from the body cam 501 to the mobile device 530 and then via Wi-Fi, LTE or another communication protocol from the mobile device 530 to the video processor 516).

Applying the alerting process of FIG. 11 to the exemplary use case illustrated FIG. 13, the video processor 516 receives video data streams from one or more cameras 502-507 monitoring the general area in which the employee 512 was previously located, as well as a video data stream from the employee's body cam 1301. The video processor 516 extracts data representing sets of one or more video frames from the video data received from the area cameras (e.g., camera 502) and the video data received from the employee's body cam 1301. For each extracted video frame of video data received from an area camera 502, the video processor 516 compares the extracted data to stored data representing suspicious activity image patterns. For each extracted video frame of video data received from the employee's bodycam 1301, the video processor 516 compares the extracted data to stored data representing two or more physical environments. For example, the environment-related stored image patterns may include various images that enable the video processor 516 to determine whether the employee 512 is in an indoor environment or an outdoor environment. Thus, the prestored environment-related image patterns may include objects such as cubicle walls, reception desks, shopping carts, steering wheels, vehicle dashboards, and so forth to facilitate determination of indoor environments (including the interiors of vehicles) and objects such as bushes, flowers, trees, shrubs, exterior doors, light poles, and so forth to facilitate determination of outdoor environments.

In the use case illustrated in FIG. 13, the employee's body cam 1301 captures an image of a bush 1305 and sends the image to the video processor 516 within one or more frames of video data. Upon receiving such video data from the employee's body cam 1301, the video processor 516 may determine that the employee 512 is currently in an outdoor environment responsive to comparing the received video frame data to stored data representing outdoor environment image patterns, including image patterns for various forms of bushes, trees, plants, shrubs, and/or other forms of greenery. The video processor 516 may determine that the employee 512 is currently in an outdoor environment when the received video frame data correlates or corresponds closely with (e.g., to within a correlation of at least 50% of) a prestored outdoor image pattern, such as a bush. The video processor 516 may also determine that an outdoor environment is a greater urgency environment where, as in the illustrated use case, the area camera 502 is monitoring an outdoor environment for suspicious activity.

Where an outdoor environment is considered to be a greater urgency environment, the video processor 516 determines that the employee 512 is currently in an outdoor environment, and the video processor 516 determines that video data received from an area camera 502 includes data representing a predefined pattern positioned suspiciously relative to a prior position of the employee 512 (e.g., a position at which the employee 512 was located while previously within the video capture area 525 of the area camera 502) or a current estimated position of the employee 512 (e.g., a position at which the employee 512 was approximately located when leaving the video capture area 525 of the area camera 502), the video processor 516 sends an alert to the mobile device 530 of the employee 512 (e.g., to an application executing on the mobile device 530). As discussed above, the alert may be a textual or graphical message (including, for example, a map image showing where suspicious activity has been detected), an audible sound or recorded message, a haptic alert, or any combination thereof. Also, because the employee 512 has been determined to be in a greater urgency environment in the use case of FIG. 13, the video processor 516 sends the alert according to a greater urgency protocol, which may include repeated transmissions of the alert at a much faster rate, on average, than under a lesser urgency protocol. The transmission rate of the alert may increase over time under the greater urgency protocol and may be accompanied by increasing strengths or emphasis in the audible and/or haptic nature of the alert. In other words, when the employee 512 is determined to be in a greater urgency environment when suspicious activity is detected, the video processor 516 executes a greater urgency protocol in an attempt to expeditiously alert the employee 512 as to suspicious activity possibly occurring in the geographic area previously exited by the employee 512 and to which the employee 512 is likely intending to return. The alerts are preferably sent to the employee 512 at the employee's current location (which may require wide area communications where the employee 512 has left the coverage area of the system's short-range wireless communications subsystem (e.g., Wi-Fi, Bluetooth, or otherwise)). Where transmission of an alert to the employee's current location is not possible (e.g., because the employee's mobile device 530 is out of range), the video processor 516 may delay transmission of the alert until the employee's wireless device 530 re-enters the coverage area of the system's short-range wireless communications subsystem.

Therefore, the video processor 516 may, upon detecting suspicious activity in a monitored area, alert a person under surveillance who is currently absent from the monitored area as to such suspicious activity by using different urgency protocols depending upon the physical environment in which the person under surveillance is currently located. To assess the surveilled person's current physical environment, the video processor 516 analyzes video data received from the monitored person's body camera 1301 and compares image patterns represented by such data to stored image patterns of different physical environments (e.g., indoor and outdoor environments). Depending upon, among other things, the relationship between the monitored area and the type of environment in which the person under surveillance is currently located, the video processor 516 selects an urgency protocol with which to send an alert, if any, to the person under surveillance informing the person as to potential suspicious activity in the monitored area.

Figure 14:
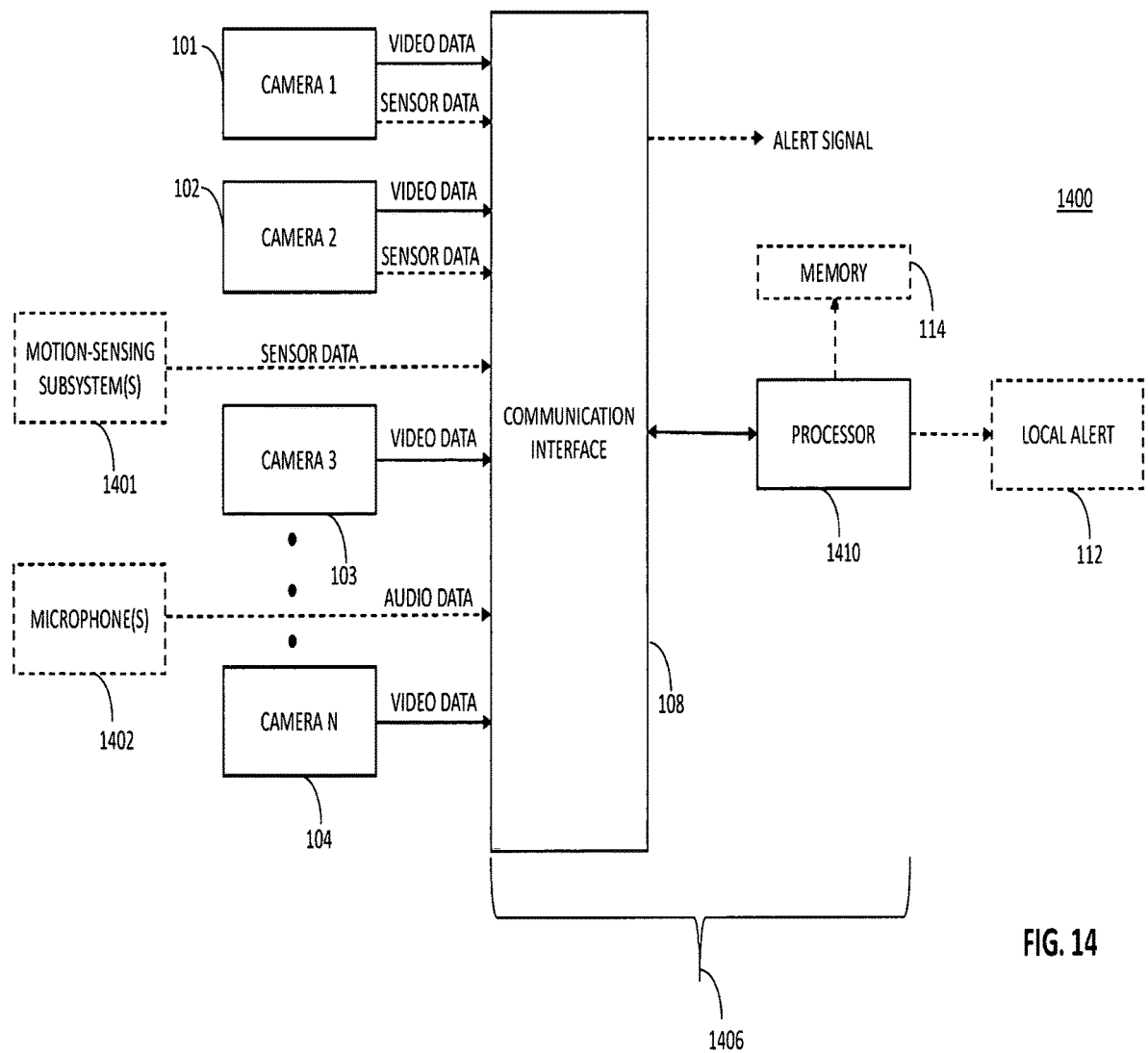
FIG. 14 is an electrical block diagram of a video processing system in accordance with another exemplary embodiment of the present disclosure.

Referring now to FIG. 14, there is depicted an electrical block diagram of a video processing system 1400 in accordance with an exemplary alternative embodiment of the present disclosure. This embodiment of the video processing system 1400 is similar to the embodiment of the video processing system 100 illustrated in FIG. 1, except that this embodiment further includes one or more optional motion-sensing subsystems 1401 and one or more optional microphones 1402 or other audio-receiving devices (e.g., transducers). Thus, according to this embodiment, the video processing system 1400 includes, inter alia, the one or more cameras 101-104 (four shown for illustration), a video processing apparatus 1406, one or more optional motion-sensing subsystems 1401, and one or more optional microphones 1402. The video processing apparatus 1406 may include, inter alia, the communication interface 108, one or more processors 1410 (one shown for illustration), and optional memory 114. The motion-sensing subsystem 1401 may include one or more types of motion sensors, such as two-axis or three-axis accelerometers, gyroscopes, magnetometers, GPS units, and/or composite inertial measurement units. The processor 1410 may include one or more video processors 110 as described above with respect to FIG. 1. Alternatively, when the video processing apparatus 1406 is configured to receive and process audio data from one or more system microphones 1402, the processor 1410 may include one or more video processors configured to analyze and process such audio data or may further include separate audio and video processors. The video processing system 1400 may be contained within a single enclosure, such as within a body camera 501 or a vehicle camera 502, or may be distributed, such illustrated above with regard to FIG. 5 and below with regard to FIG. 18.

Where the video processing apparatus 1406 is collocated with a local alerting mechanism 112, such mechanism 112 may include an audio speaker, a horn, a haptic or tactile alerting device, one or more lights or lighting units, and/or a video display. The local alerting mechanism 112 is intended to quickly alert the person under surveillance as to the presence of a possible threat when the video processing apparatus 110, as part of the overall video processing system 1400, determines from received video data (and optionally motion data) that such a potential threat is present. Where a local alerting mechanism is not present or desired, the processor 1410 may communicate an alert signal to a remote alerting device, such as a wireless communication device carried by the person under surveillance, by way of the communication interface 108.

Operation of the alternative video processing system 1400 of FIG. 14 will be generally described below with respect to FIG. 15. Further alternative operations of the video processing system 1400 will be described more particularly below with respect to FIGS. 16 and 17, as well as in connection with some exemplary use cases as illustrated in FIGS. 18 and 23-26. An optional cloud-based implementation/architecture, such as the architecture described above with respect to FIG. 8, may also be used to implement the video processing apparatus 1406 of the video processing system 1400 depicted in FIG. 14, provided that the cloud-based architecture includes appropriate software and hardware modifications to perform the functions of the video processing system 1400 as described below.

Figure 15:
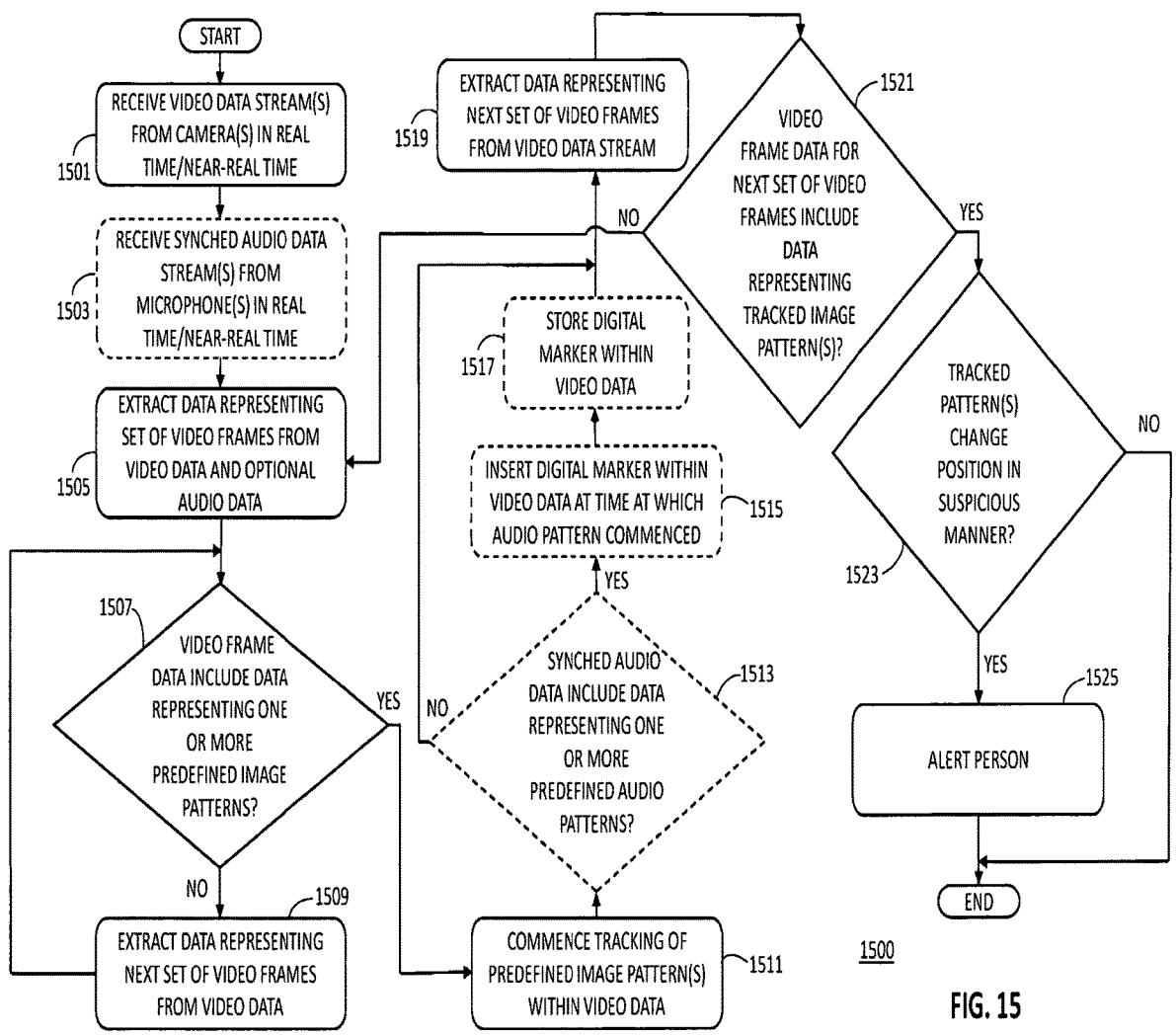
FIG. 15 is a process flow diagram of steps executed by a video processing system to determine whether a tracked pattern in one or more received video streams has changed position in a suspicious manner and to optionally mark the received video stream(s) to indicate detection of an audio pattern, in accordance with another exemplary embodiment of the present disclosure.

Referring now to FIG. 15, there is shown a process flow diagram 1500 of steps executed by a video processing system to detect suspicious activity in a general vicinity of a person or object, such as a motor vehicle, based on real-time or near real-time video analysis in accordance with another exemplary embodiment of the present disclosure. The steps of the process flow diagram 1500 may be performed by the video processing system (and primarily by its video processor) through execution of stored operating instructions (firmware and/or software). By way of example, but not limitation, the suspicious activity detection process flow of FIG. 15 is described below with reference to the video processing system 1400 of FIG. 14.

The process flow begins when one or more cameras 101-104 capture images within video capture areas defined by the cameras' respective fields of view. The cameras 101-104 generate encoded video data streams from the images and divide the video streams into a series of time-sequenced or time-stamped video frames according to the video streaming protocol being used. In one exemplary embodiment, the camera or cameras 101-104 are configured to capture images and encode video data at a rate of at least 30 frames per second. The video streams are communicated to the video processing apparatus 1406 for video analysis processing.

When the system includes one or more microphones 1402, such microphones 1402 may form part of or be collocated with the cameras 101-104. The microphones capture audio in the video capture areas of the video cameras 101-104 and potentially outside such areas as well. The audio from any particular microphone 1402 may be sampled, digitized, and time-synchronized with video data captured by the microphone's associated camera 101-104. A processor may be included in the camera 101-104 and perform such functions, as well as divide and map the digitized audio with respective video frames.

The cameras' fields of view are such that the cameras 101-104 capture video from video capture areas proximate (generally near) a person under surveillance while the suspicious activity process is being executed. For example, one camera 101 may be a low profile or other styled body camera secured to the chest, arm, helmet, back, shoulder, neck, or other area of the person under surveillance, such as through use of a strap or belt, vest, holster, or other device. The camera 101 may be forward-facing or rearward-facing, as determined to be necessary by the wearer (person under surveillance). Such a camera 101 may, depending on its capabilities, capture images extending out several feet or meters (e.g., 150 feet or 50 meters or more) as referenced from the person's current position.

Another one or more cameras 102-104 may be mounted at predetermined locations on a vehicle (e.g., truck, car, boat, bus, motorcycle, and so forth) that transported the person to his or her current location or that is otherwise positioned near the person under surveillance. The positioning of the cameras 102-104 on the vehicle may be such that the cameras 102-104 captures images of the person and his surroundings at locations where the person is and/or is expected to be after stopping the vehicle. For example, where the person under surveillance is a police officer, the vehicle-mounted cameras 102-104 may be mounted to or included with the vehicle at one or more positions, such as on the driver's side of the vehicle (e.g., adjacent the driver's side door or on the driver's side of the hood), on the passenger's side of the vehicle, on a rear-view mirror assembly of the vehicle, on the windshield or rear window of the vehicle (e.g., with one or more suction cups or hook-and-loop fasteners) and/or on the back of the vehicle (e.g., above and/or adjacent to the rear doors or on the trunk). Depending on the types of cameras 102-104 utilized, the cameras 102-104 may capture images extending out several feet or meters (e.g., 150 feet or 50 meters or more) from the vehicle.

Other cameras may be mounted at fixed locations near the location of the person. For example, cameras may be mounted to buildings, canopies, trees, light poles, or other objects near the general location of the person under surveillance. Due to their positioning, such cameras may capture images within a much wider video capture area than the video capture areas of body-mounted or vehicle-mounted cameras.

The video processing apparatus 1406 receives (1501) a video data stream from each camera 101-104 in real time or near real time via the apparatus' communication interface 108. In other words, each camera 101-104 captures images, encodes the images into video data containing time-sequenced video frames, and communicates the video data to the video processing apparatus 1406 as a stream of video frames in accordance with a video streaming protocol, without intentionally delaying the flow of video data any more than is necessary. That is, neither the video processing apparatus 1406 nor the video processing system 1400 as a whole introduces any delays other than normal processing and communication delays. Use of the terms "real time," "real-time," "near real-time," and "near real time" take into account such inherent delays. The processor 1410 may use one or more video streaming control protocols, such as RTSP 2.0 or any successor thereof, to control the delivery of video data from the cameras 101-104. According to one exemplary embodiment, the cameras 101-104 and the processor 1410 use video transport and streaming protocols, such as RTMP and RTP or any successors thereof, to transmit and receive video data in real time or near real time.

In addition to receiving the video data streams, the video processing apparatus 1406 may optionally receive (1503) synchronized audio data streams from the camera or other system microphones 1402 in real time or near real time. As discussed above, the raw audio data may be pre-processed by the camera processor (or another processor) to convert the raw audio to digital audio data processable by the video processing apparatus 1406. Where the processor 1410 uses RTMP and RTP for controlling video streaming from multiple cameras 101-104, the processor 1410 may also use such protocols to control audio streaming from multiple microphones 1402.

As the video data from a particular camera 101-104 is received at the video processing apparatus 1406, the apparatus' processor 1410 extracts (1505) data representing a video frame from the video data based on the video streaming protocol and the video codec (e.g., H.264 or H.265) used by the camera 101-104 and the processor 1410, and determines (1507) whether the video frame data includes data representing one or more predefined image patterns. For example, the processor 1410 may compare portions of the video frame data to data representing a set of predefined patterns (e.g., potential threat patterns) previously stored in memory 114 to determine whether the video frame data or any portion thereof includes data substantially similar to data representing a stored image pattern. Video data may be considered substantially similar to stored image pattern data where the video data has at least a fifty percent (50%) correspondence or correlation with the stored image pattern data. Additionally or alternatively, the processor 1410 may execute machine learning and computer vision algorithms to perform object detection, face detection, face recognition, summarization, threat detection, natural language processing, sentiment analysis, traffic monitoring, intention detection and so on to evaluate whether the video frame data includes data representing one or more of the predefined and stored image patterns.

The set of predefined image patterns may include, for example, the outline or other features of a human body or a portion thereof, the outline or other features of one or more predetermined objects (such as a firearm, knife, bat, club, TASER, or other object that could be used as a weapon), the outline or other features of a vehicle (e.g., vehicle door in opened position, vehicle door in closed position, windshield, rear window, rear-view mirror, etc.), and/or the features of one or more types of locations. The processor 1410 may be programmed to update and/or expand the stored image pattern data by applying machine learning techniques, such as supervised learning techniques (e.g., pattern recognition, object classification, and/or regression algorithms), unsupervised learning techniques (e.g., association, clustering, and/or dimensionality reduction algorithms), and/or reinforcement learning techniques, to video data received by the processor 1410 over time.

Where the video processing apparatus 1406 receives video data streams from multiple sources (e.g., cameras 101-104), the processor 1410 analyzes each video stream separately and may use metadata within the video streams to time-synchronize the streams. The metadata for each video data stream may include a time-and-date stamp, which permits the processor 1410 to align the video frames of the video data streams even though such streams may be received at different times by the video processing apparatus 1406.

When the video frame data from a particular camera 101-104 does not include data representing a predefined image pattern, the processor 1410 extracts (1509) data representing the next video frame from the video data stream and determines (1507) whether that video frame data includes data representing one or more of the predefined image patterns. When the video frame data from a particular camera includes data representing at least one predefined image pattern (e.g., a pattern match or correlation occurs), the processor 1410 commences (1511) tracking of the detected image pattern or patterns within the video data.

According to one exemplary embodiment, image pattern tracking continues for a predetermined period of time over a predetermined set of subsequent or other later-in-time video frames, which period may be extended by the processor 1410 based on pre-established extension criteria. The set of later-in-time video frames may include contiguous video frames, periodically positioned video frames (e.g., every other video frame in the set, every third video frame in the set, and so forth), or randomly selected video frames within the image tracking time period. For example, where the video data was captured by the camera 101-104 at 30 frames per second, image pattern tracking may continue for a fraction of a second (e.g., 333 milliseconds or 500 milliseconds) or for multiple seconds as may be selected by the system operator. As a further example, where image pattern tracking is to be performed on contiguous video frames for a period of 500 milliseconds after a predefined image pattern has been detected and the video data includes 30 frames per second, image pattern tracking may be programmed to occur for data representing fifteen consecutive video frames.

As synched audio data is received at the processor 1410 from a particular source (e.g., microphone 1402), the processor 1410 extracts (1505) data representing a video frame's worth of audio data based on the audio streaming protocol and the audio codec (e.g., Advanced Audio Coding (AAC)) used by the microphone 1402 (or the camera 101-104 that includes the microphone 1402) and the processor 1410. The processor 1410 then determines (1513) whether the synched audio data includes data representing one or more predefined audio patterns. For example, the processor 1410 may compare portions of the received audio data to data representing a set of predefined audio patterns previously stored in memory 114 to determine whether the received audio data includes data substantially similar to data representing a stored audio pattern. Received audio data may be considered substantially similar to stored audio data where the received audio data has at least a fifty percent (50%) correspondence or correlation with a stored audio data pattern. Additionally or alternatively, the processor 1410 may execute machine learning and audio analysis algorithms to perform speech detection and analysis, background noise detection, and so on to evaluate whether the received audio data includes data representing one or more predefined audio patterns.

The set of predefined audio patterns may include, for example, gunshot sound patterns, breaking glass sound patterns, squealing tire sound patterns, aggressive speech patterns, and so forth. The processor 1410 may be programmed to update and/or expand the stored audio pattern data by applying machine learning techniques, such as supervised learning techniques, unsupervised learning techniques, and/or reinforcement learning techniques, to audio data received by the processor 1410 over time.

When the processor 1410 determines that received audio data includes data representing one or more of the predefined audio patterns, the processor 1410 may insert (1515) a digital marker within the corresponding video data at the time at which the detected audio pattern commenced. The processor 1410 may then store (1517) the marker within the video data so that the marker is detectable by viewers of the associated video or detection software at a later time. The marker may provide an indicator to those viewing the video to focus attention, such as when viewing the video as part of a criminal investigation. The marker may also function as a searching aid to enable persons viewing the associated video or marker detection software to quickly skip to the time at which a detected audio pattern commenced.

After image pattern tracking has commenced, the processor 1410 extracts (1519) data representing a next set of one or more video frames from the video data stream (e.g., a set of video frames occurring later in time than the set of video frames that caused commencement of image pattern tracking) and determines (1521) whether the video frame data includes data representing one or more of the tracked image patterns. For example, the processor 1410 may compare portions of the video frame data to data representing the tracked pattern or patterns to determine whether the video frame or any portion thereof includes data substantially similar to data representing a tracked pattern. Video data may be considered substantially similar to tracked pattern data where the video data has at least a fifty percent (50%) correlation with the tracked pattern data. Additionally or alternatively, the processor 1410 may execute machine learning and computer vision algorithms to perform object detection, face detection, face recognition, summarization, threat detection, natural language processing, sentiment analysis, traffic monitoring, intention detection and so on to evaluate whether the video frame data includes data representative of a tracked pattern.

If data representing a tracked pattern is found in the data representing one or more subsequent video frames, the processor 1410 determines (1523) whether the tracked pattern has changed position in a suspicious manner. Otherwise, the processor 1410 extracts (1505) the next set of one or more video frames from the video data and the process repeats from decision block 1507.

To determine whether the tracked pattern has changed position in a suspicious manner, the processor 1410 analyzes movement of the tracked pattern over multiple video frames. For example, the processor 1410 may determine, based on the tracking, whether the tracked pattern is moving toward the person under surveillance, moving away from the person under surveillance, falling down, getting up, moving left, moving right, and so forth. According to one exemplary embodiment, the video processor 1410 may utilize a process similar to the one described above with respect to FIG. 6 to analyze video data from a camera (e.g., camera 101) positioned in or on the motor vehicle that transported the person under surveillance to the current location. The processor 1410 may determine from the video data analysis that the tracked pattern is approaching or moving away from the person under surveillance and/or the stopped motor vehicle, either of which may be deemed a suspicious change of position of the tracked pattern depending on other factors, such as the position and rate of approach or departure, and/or the presence of another predefined pattern in the video data (e.g., the pattern for a weapon). The video processor 1410 may alternatively or additionally determine from the video data analysis that a tracked pattern, such as a door or window, has opened or closed, which may be considered suspicious depending on the context as determined by the processor 1410 based on other image patterns detected in the video data and/or audio patterns detected in received audio data.

Exemplary processes for determining whether a tracked image pattern has changed position in a suspicious manner are described below with respect to FIGS. 16 and 17. Such processes relate generally to determining whether an approaching object (FIG. 16) or a departing object (FIG. 17) may be considered suspicious. A further exemplary process for determining whether a tracked image pattern has changed position in a suspicious manner is described below with respect to FIG. 24. The process described with respect to FIG. 24 relates generally to determining whether a man-down condition has occurred or is occurring.

When the processor 1410 determines that one or more tracked patterns have changed position in a suspicious manner, the processor 1410 alerts (1525) the person under surveillance and/or a third party (e.g., an emergency management system) as to the suspicious activity. For example, the processor 1410 may activate a local alert, such as activate an audible and/or visual alarm or send an audio message to a local sound speaker, to notify the person under surveillance (e.g., the police officer or officers on scene). Alternatively, the processor 1410 may communicate, via the communication interface 108, an alert message to a mobile application executing on a wireless communication device carried by the person under surveillance (e.g., smartphone, cellular phone, tablet computer, personal digital assistant). In the latter case, the alert message may cause the mobile application to activate an audible alarm and/or a haptic alarm of the wireless communication device to notify the person of the potential threat. Still further, the processor 1410 may communicate, via the communication interface 108, at least some of the video data from the analyzed video stream (e.g., the last ten seconds or 300 video frames) to a mobile video processing and display application executing on a wireless communication device carried by the person under surveillance. In this case, the mobile application may be configured to automatically play and display the received video to enable the person under surveillance to assess the potential threat and react thereto as necessary. Still further, the processor 1410 may communicate, via the communication interface 108, an emergency message to a remote emergency management system to inform an operator of the system (e.g., a police office or 911 emergency operator) as to potential suspicious activity at the location of the person under surveillance, including, without limitation, the possibility of a man-down, injured officer, or other urgent situation. The emergency alert message may include the video data that served as the basis for the processor 1410 to issue the emergency alert message.

Figure 16:
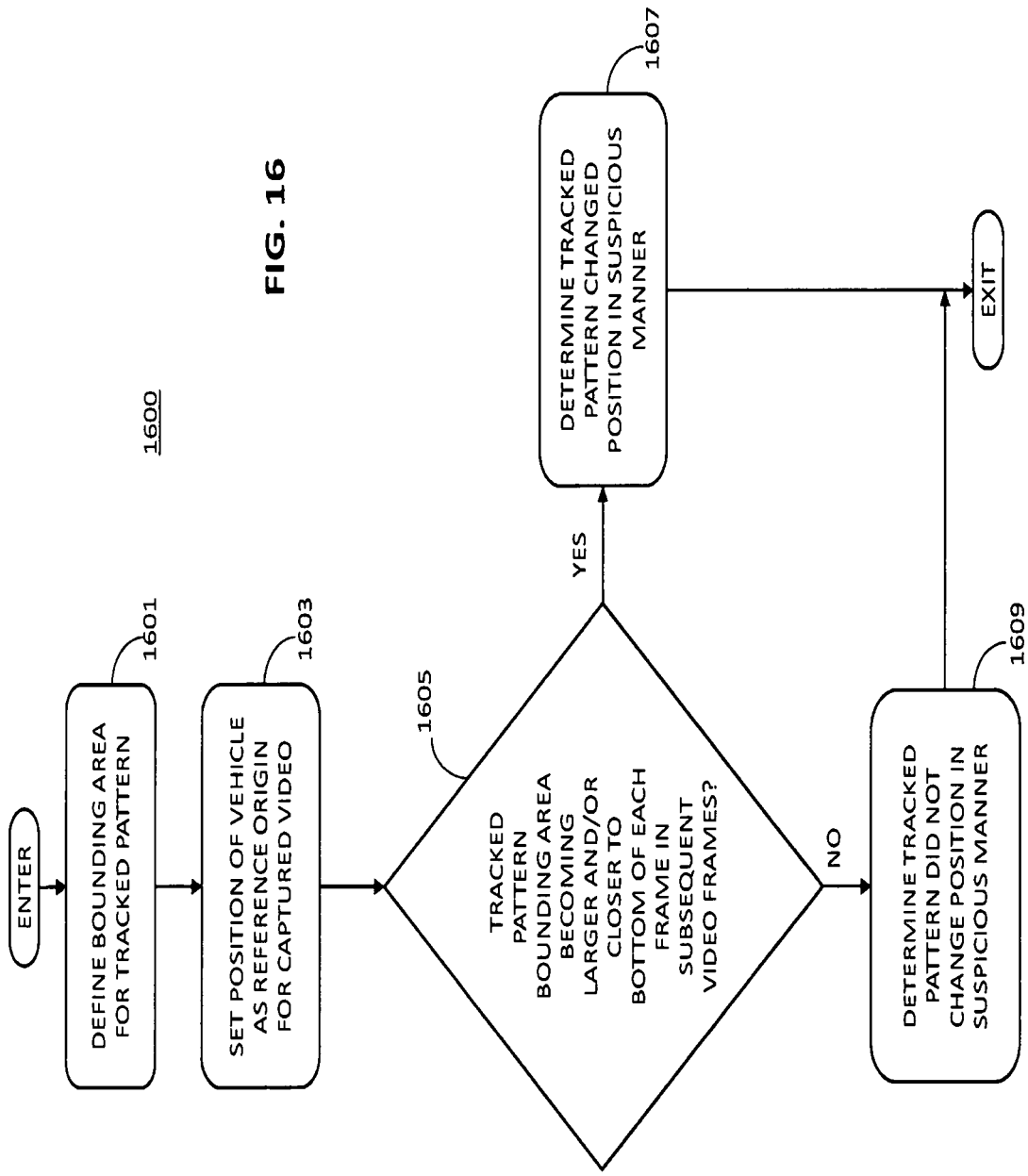
FIG. 16 is a process flow diagram of steps executed by a video processing system to determine whether a tracked pattern in one or more received video streams has changed positioned in a suspicious manner, in accordance with another exemplary embodiment of the present disclosure.

FIG. 16 is a process flow diagram 1600 of steps executed by a video processing system 1400 (e.g., through operation of its processor 1410) to determine whether a tracked pattern has changed position in a suspicious manner, in accordance with another exemplary embodiment of the present disclosure. Thus, the process flow of FIG. 16 is one exemplary process that may be executed as part of decision block 1523 of FIG. 15. The process flow of FIG. 16 is very similar to the process flow of FIG. 3, except that the process flow of FIG. 16 is primarily focused on detecting when an object, such as a vehicle or person, may be approaching a person under surveillance or a vehicle that transported the person under surveillance to the current location. The process flow illustrated in FIG. 16 may have particular applicability for analyzing video data supplied by a camera secured to a rear window, trunk, or roof of a public safety vehicle, such as a police car, fire truck, ambulance, and so forth.

According to the logic flow of FIG. 16, the processor 1410 defines (1601) a bounding area for the tracked image pattern. As discussed above with respect to FIG. 3, the bounding area may be defined by a square, rectangle, oval, triangle, or other geometric shape positioned around the tracked image pattern to form a trackable area for purposes of reducing the amount of processing resources necessary to track the image pattern and its positioning over multiple video frames. In other words, each tracked image pattern may be "bounded" within a predefined or adaptive virtual area to make image pattern tracking less processing intensive.

After the processor 1410 defines a tracked image pattern's bounding area, the processor 1410 monitors for changes to the tracked pattern bounding area over time (e.g., over a predetermined number of video frames) to determine whether the tracked image pattern changes position in a suspicious manner. The bounding area for a tracked image pattern may shrink, enlarge, move side-to-side and/or angularly, and/or disappear as a tracked image pattern changes position within the camera's video capture area over multiple video frames. Such changes in size and location provide the processor 1410 with a basis for determining how the tracked image pattern may be changing position over time. For example, the processor 1410 may determine whether the tracked pattern is moving closer to the camera, moving farther away from the camera, passing through the video capture area, and so forth. From such changes in position, the processor 1410 may determine whether the tracked image pattern is or has changed position suspiciously so as to warrant alerting the person under surveillance (i.e., the person being protected by the video processing system 1400) and/or an emergency management system.

According to the exemplary embodiment of FIG. 16, monitoring for changes to a tracked image pattern by monitoring for changes to the tracked pattern's bounding area may occur as follows. The processor 1410 sets (1603) the position of a vehicle containing the camera 101 or to which the camera 101 is secured as the reference origin for the video data stream being processed. Thus, the vehicle is the reference point for all calculations and other determinations relevant to evaluating changes of position of a tracked image pattern according to this exemplary embodiment.

Once a reference origin has been set, the processor 1410 determines (1605) whether the tracked pattern bounding area is becoming progressively larger and/or progressively closer to a bottom of each video frame in the set of subsequent video frames that is subject to image pattern tracking analysis. To determine whether the tracked pattern bounding area is becoming progressively larger in the set of subsequent or otherwise later-in-time video frames, the processor 1410 may, according to an exemplary embodiment, determine a size of the tracked pattern bounding area in each video frame of the set of subsequent video frames. Based on such bounding area size data, the processor 1410 may determine a linear regression to model how the size of the tracked pattern bounding area (e.g., size of the pixel area) changes across the set of subsequent video frames. Thereafter, the processor 1410 may determine a gradient for the linear regression and compare the gradient to a threshold. When the gradient exceeds the threshold, the processor 1410 may determine that the tracked pattern bounding area is becoming larger over the subsequent video frames. Therefore, according to this exemplary embodiment, the processor 1410 may be programmed to use a simple or Bayesian linear technique to interpret the bounding area data captured over the set of subsequent video frames for the purpose of evaluating whether the tracked pattern bounding area is becoming progressively larger over time. Those of ordinary skill in the art will readily recognize and appreciate that the processor 1410 may be programmed to use other known regression or statistical analysis techniques to evaluate how the size of the tracked pattern bounding area is changing over the set of subsequent video frames.

To determine whether the tracked pattern bounding area is becoming progressively closer to a bottom of each video frame in the set of subsequent video frames, the processor 1410 may, according to an exemplary embodiment, determine a position of a coordinate along a bottom edge of the tracked pattern bounding area in each video frame of the set of subsequent video frames. The determined position may be a pixel position or an estimated physical position of the edge of the boundary area under an assumption that the boundary area actually existed in the real world. For example, the processor 1410 may determine a position of the center coordinate along the bottom edge of the tracked pattern bounding area, although the position of any coordinate along the bottom edge of the tracked pattern bounding area may suffice with appropriate angular correction applied, if necessary.

The processor 1410 may then use the bottom coordinate position data to determine a relationship (e.g., an estimated distance) between the position of the coordinate along the bottom edge of the tracked pattern bounding area and the reference origin for each video frame of the set of subsequent video frames. Based on such relationship, the video processing system may determine a linear regression to represent how the relationship between the position of the coordinate along the bottom edge of the tracked pattern bounding area and the reference origin changes across the set of subsequent video frames. For example, the processor 1410 may determine a distance (e.g., an estimated actual distance or pixel distance) between the position of the coordinate along the bottom edge of the tracked pattern bounding area and the reference origin for each video frame of the set of subsequent video frames and then determine a linear regression to model how the distance changes over time across the set of subsequent video frames.

The processor 1410 may further determine a gradient for the linear regression and compare the gradient, which may be negative, to a threshold. When the gradient is less than the threshold, the processor 110 may determine that the tracked pattern bounding area is becoming progressively closer to a bottom of each video frame in the set of subsequent video frames. Those of ordinary skill in the art will readily recognize and appreciate that the processor 1410 may be programmed to use other known regression or statistical analysis techniques to evaluate how the position of the tracked pattern bounding area is changing over the set of subsequent video frames. Additionally, those of ordinary skill in the art will readily recognize and appreciate that the processor 1410 may be programmed to use other position coordinates along another edge or edges of the tracked pattern bounding area in order assess whether the tracked pattern bounding area is becoming progressively closer to a bottom of each video frame in the set of subsequent video frames. More detailed exemplary embodiments for using tracked pattern bounding area changes (or lack thereof) over multiple video frames to assist in the determination of whether a tracked pattern has changed position in a suspicious manner are described below with respect to FIGS. 22-25.

When the processor 1410 determines that the tracked pattern bounding area is becoming progressively larger and/or progressively closer to the bottom of each video frame in the set of subsequent video frames that is subject to pattern tracking analysis, the processor 1410 determines (1607) that the tracked image pattern has changed position on a suspicious manner. On the other hand, when the processor 1410 determines that the tracked pattern bounding area is not becoming progressively larger and/or progressively closer to the bottom of each video frame in the set of subsequent video frames that is subject to pattern tracking analysis, the processor 1410 determines (1609) that the tracked pattern did not change position on a suspicious manner. Thus, according to this embodiment, the processor 1410 may determine that the tracked image pattern has changed position in a suspicious manner if the tracked pattern bounding area is becoming progressively larger over the set of subsequent video frames, the tracked pattern is becoming progressively closer to the bottom of each frame over the set of subsequent video frames, or both. For example, if the tracked pattern is a pattern of a person, the bounding area is the area of a rectangle positioned around the tracked pattern, and the person is running toward the reference origin (e.g., the vehicle on which the camera 101 is mounted), the size of the tracked pattern bounding area will progressively increase and a coordinate along the bottom edge of the tracked pattern bounding area will become progressively closer to a bottom of each video frame over the set of subsequent video frames indicating suspicious changes of position of the tracked image pattern. As another example, if the tracked pattern is the pattern of a drone, the bounding area is the area of a rectangle positioned around the tracked pattern, and the drone is flying toward reference origin while also increasing in altitude, the size of the tracked pattern bounding area may not increase over the set of subsequent video frames, but a coordinate along the bottom edge of the tracked pattern bounding area will become progressively closer to a bottom of each video frame over the set of subsequent video frames. In this case, movement of the drone toward the reference origin results in the tracked pattern bounding area becoming progressively closer to a bottom of each frame in the subsequent video frames, thereby indicating a suspicious change of position of the tracked pattern.

Figure 17:
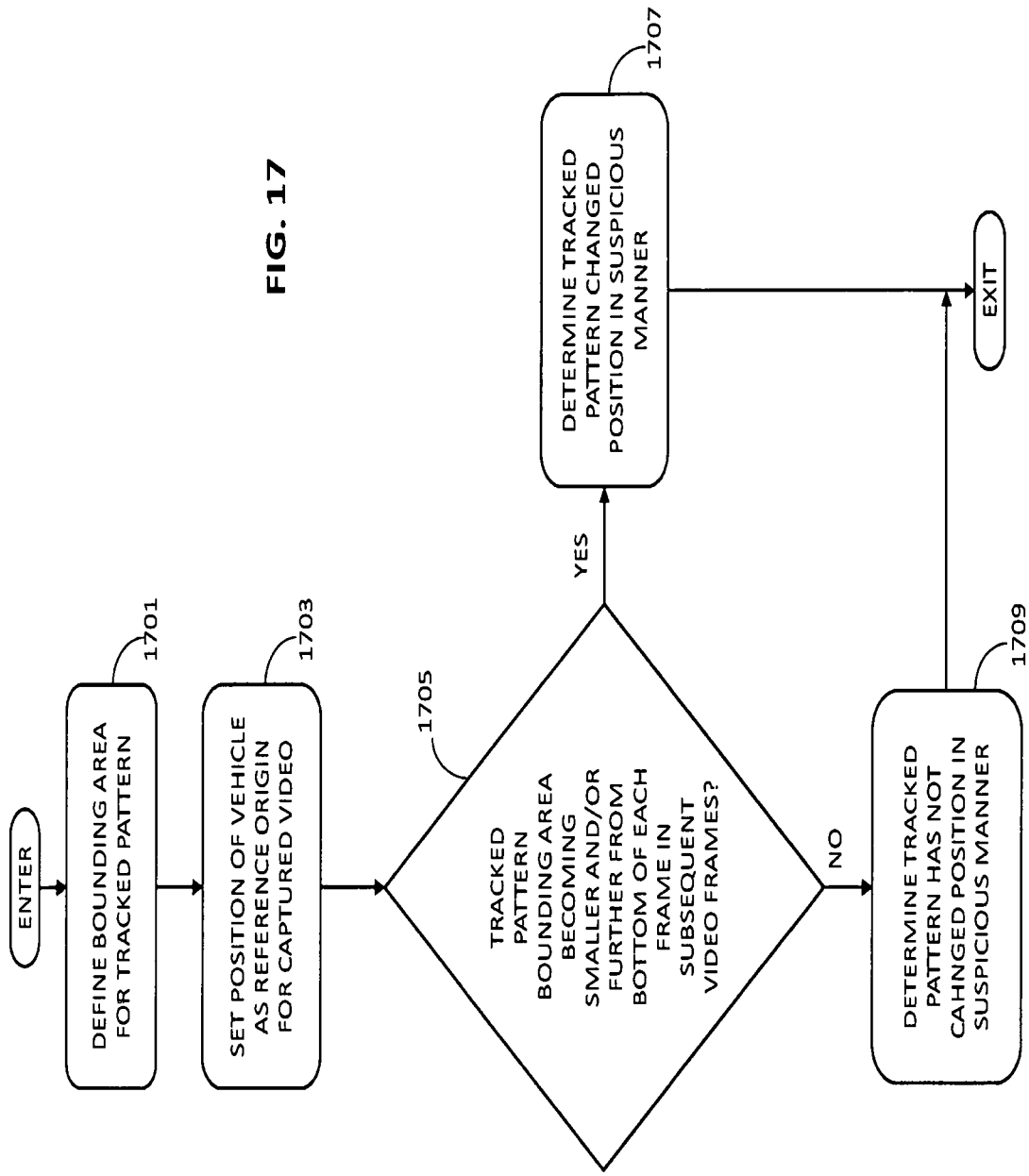
FIG. 17 is a process flow diagram of steps executed by a video processing system to determine whether a tracked pattern in one or more received video streams has changed positioned in a suspicious manner, in accordance with yet another exemplary embodiment of the present disclosure.

FIG. 17 is a process flow diagram 1700 of steps executed by a video processing system 1400 (e.g., through operation of its processor 1410) to determine whether a tracked pattern has changed position in a suspicious manner, in accordance with yet another exemplary embodiment of the present disclosure. The process flow illustrated in FIG. 17 is very similar to the process flow illustrated in FIG. 16, except for the primary parameter used for concluding that a tracked image pattern's change in position is suspicious in nature. Thus, the process flow of FIG. 17 is an alternative or additional exemplary process that may be executed as part of decision block 1523 of FIG. 15. In contrast to the process flow of FIG. 16, the process flow of FIG. 17 is primarily focused on detecting when an object, such as a vehicle or person, may be departing an area occupied by a person under surveillance or a vehicle that transported the person under surveillance to the current location. The process flow illustrated in FIG. 17 may have particular applicability for analyzing video data supplied by a camera secured to a windshield, rear-view mirror, hood, or roof of a public safety vehicle, such as a police car, fire truck, ambulance, and so forth.

According to the logic flow of FIG. 17, the processor 1410 defines (1701) a bounding area for the tracked image pattern. As discussed above with respect to FIGS. 3 and 16, the bounding area may be defined by a square, rectangle, oval, triangle, or other geometric shape positioned around the tracked image pattern to form a trackable area for purposes of reducing the amount of processing resources necessary to track the image pattern and its positioning over multiple video frames.

After the processor 1410 defines a tracked image pattern's bounding area, the processor 1410 monitors for changes to the tracked pattern bounding area over time (e.g., over a predetermined number of video frames) to determine whether the tracked image pattern changes position in a suspicious manner. As noted above, the bounding area for a tracked image pattern may shrink, enlarge, move side-to-side and/or angularly, and/or disappear as a tracked image pattern changes position within the camera's video capture area over multiple video frames. Such changes in size and location provide the processor 1410 with a basis for determining how the tracked image pattern may be changing position over time. For example, the processor 1410 may determine whether the tracked pattern is getting closer to the camera, moving farther away from the camera, passing through the video capture area, and so forth. From such changes in position, the processor 1410 may determine whether the tracked image pattern is or has changed position suspiciously so as to warrant alerting the person under surveillance (i.e., the person being protected by the video processing system 1400) and/or an emergency management system.

According to the exemplary embodiment of FIG. 17, monitoring for changes to a tracked image pattern by monitoring for changes to the tracked pattern's bounding area may occur as follows. The processor 1410 sets (1703) the position of a vehicle containing the camera 101 or to which the camera 101 is secured as the reference origin for the video data stream being processed. Thus, the vehicle is the reference point for all calculations and other determinations relevant to evaluating changes of position of a tracked image pattern according to this exemplary embodiment.

Once a reference origin has been set, the processor 1410 determines (1705) whether the tracked pattern bounding area is becoming progressively smaller and/or progressively further from a bottom of each video frame in the set of subsequent video frames that is subject to image pattern tracking analysis. To determine whether the tracked pattern bounding area is becoming smaller in the set of subsequent or otherwise later-in-time video frames, the processor 1410 may, according to an exemplary embodiment, determine a size of the tracked pattern bounding area in each video frame of the set of subsequent video frames. Based on such bounding area size data, the processor 1410 may determine a linear regression to model how the size of the tracked pattern bounding area (e.g., size of the pixel area) changes across the set of subsequent video frames. Thereafter, the processor 1410 may determine a gradient for the linear regression and compare the gradient to a threshold. When the gradient is less than the threshold, the processor 1410 may determine that the tracked pattern bounding area is becoming progressively smaller over the subsequent video frames. Therefore, according to this exemplary embodiment, the processor 1410 may be programmed to use a simple or Bayesian linear technique to interpret the bounding area data captured over the set of subsequent video frames for the purpose of evaluating whether the tracked pattern bounding area is becoming smaller over time. Those of ordinary skill in the art will readily recognize and appreciate that the processor 1410 may be programmed to use other known regression or statistical analysis techniques to evaluate how the size of the tracked pattern bounding area is changing over the set of subsequent video frames.

To determine whether the tracked pattern bounding area is becoming farther from a bottom of each video frame in the set of subsequent video frames, the processor 1410 may, according to an exemplary embodiment, determine a position of a coordinate along a bottom edge of the tracked pattern bounding area in each video frame of the set of subsequent video frames. The determined position may be a pixel position or an estimated physical position of the edge of the boundary area under an assumption that the boundary area actually existed in the real world. For example, the processor 1410 may determine a position of the center coordinate along the bottom edge of the tracked pattern bounding area, although the position of any coordinate along the bottom edge of the tracked pattern bounding area may suffice with appropriate angular correction applied, if necessary.

The processor 1410 may then use the bottom coordinate position data to determine a relationship (e.g., an estimated distance) between the position of the coordinate along the bottom edge of the tracked pattern bounding area and the reference origin for each video frame of the set of subsequent video frames. Based on such relationship, the video processing system may determine a linear regression to represent how the relationship between the position of the coordinate along the bottom edge of the tracked pattern bounding area and the reference origin changes across the set of subsequent video frames. For example, the processor 1410 may determine a distance (e.g., an estimated actual distance or pixel distance) between the position of the coordinate along the bottom edge of the tracked pattern bounding area and the reference origin for each video frame of the set of subsequent video frames and then determine a linear regression to model how the distance changes over time across the set of subsequent video frames.

The processor 1410 may further determine a gradient for the linear regression and compare the gradient, which may be negative, to a threshold. When the gradient is greater than the threshold, the processor 110 may determine that the tracked pattern bounding area is becoming progressively further from a bottom of each video frame in the set of subsequent video frames. Those of ordinary skill in the art will readily recognize and appreciate that the processor 1410 may be programmed to use other known regression or statistical analysis techniques to evaluate how the position of the tracked pattern bounding area is changing over the set of subsequent video frames. Additionally, those of ordinary skill in the art will readily recognize and appreciate that the processor 1410 may be programmed to use other position coordinates along another edge or edges of the tracked pattern bounding area in order assess whether the tracked pattern bounding area is becoming further from a bottom of each video frame in the set of subsequent video frames. More detailed exemplary embodiments for using tracked pattern bounding area changes (or lack thereof) over multiple video frames to assist in the determination of whether a tracked pattern has changed position in a suspicious manner are described below with respect to FIGS. 22-25.

When the processor 1410 determines that the tracked pattern bounding area is becoming progressively smaller and/or progressively further from the bottom of each video frame in the set of subsequent video frames that is subject to pattern tracking analysis, the processor 1410 determines (1707) that the tracked image pattern has changed position on a suspicious manner. On the other hand, when the processor 1410 determines that the tracked pattern bounding area is not becoming progressively smaller and/or progressively further or farther from the bottom of each video frame in the set of subsequent video frames that is subject to pattern tracking analysis, the processor 1410 determines (1709) that the tracked pattern has not changed position in a suspicious manner. Thus, according to this embodiment, the processor 1410 may determine that the tracked image pattern has changed position in a suspicious manner if the tracked pattern bounding area is becoming progressively smaller over the set of subsequent video frames, the tracked pattern is becoming progressively further from the bottom of each frame over the set of subsequent video frames, or both. For example, if the tracked pattern is a pattern of a person, the bounding area is the area of a rectangle positioned around the tracked pattern, and the person is running away from the reference origin (e.g., the vehicle on which the camera 101 is mounted), the size of the tracked pattern bounding area will decrease and a coordinate along the bottom edge of the tracked pattern bounding area will become further from a bottom of each video frame over the set of subsequent video frames indicating suspicious changes of position of the tracked image pattern (e.g., indicate that the person is running away from a police car to which the camera 101 is mounted).

Figure 18:
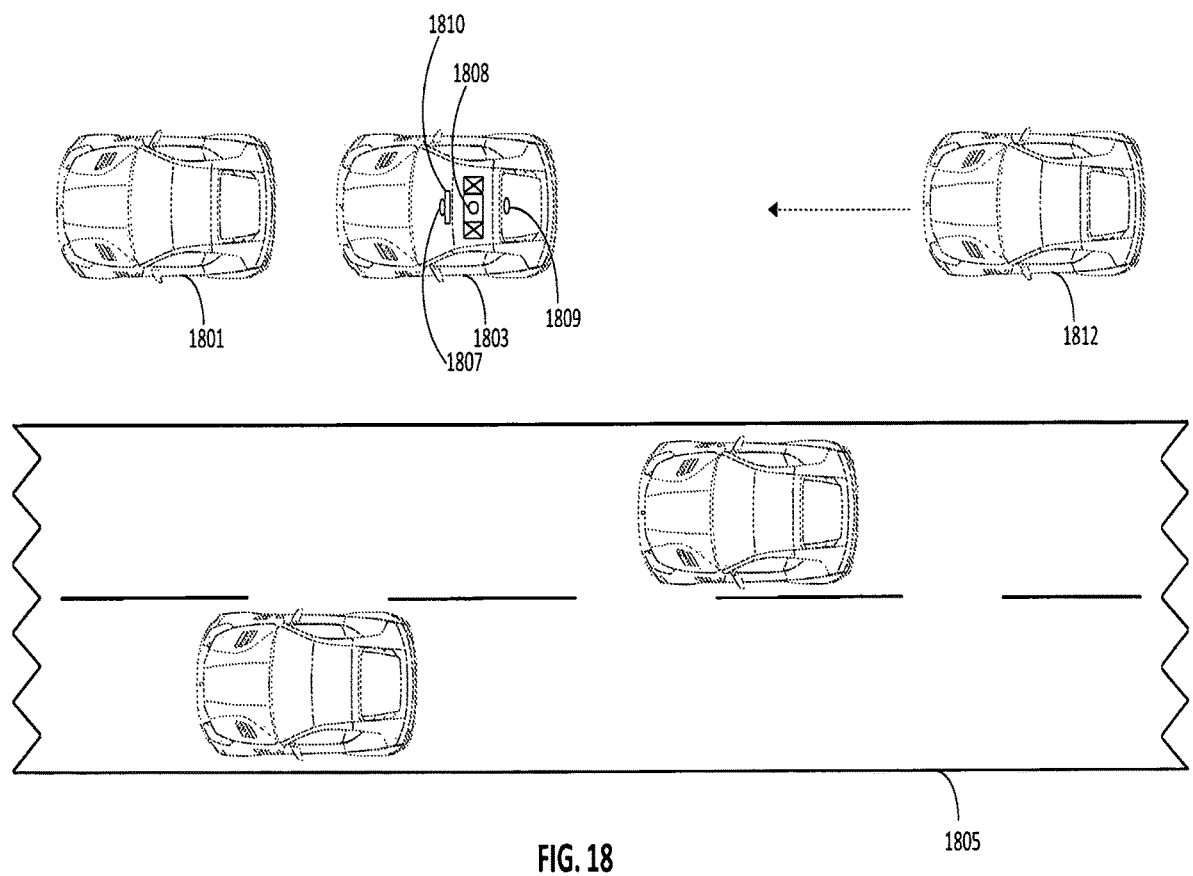
FIG. 18 illustrates an exemplary use case for the processes and system of FIGS. 14-17.

FIG. 18 illustrates an exemplary use case for the processes and system of FIGS. 14-17. The illustrated use case depicts a car 1801 pulled over to the side of a roadway 1805 with a police car 1803 parked or running idle directly behind the car 1801. For example, the police car 1803 may have pulled the car 1801 over to the side of the roadway 1805 for a traffic violation or for some other reason. The depicted use case shows other cars passing by the pulled-over car 1801 and the police car 1803 as the other cars traverse the roadway 1805. The depicted use case further shows another car 1812 approaching the police car 1803 from the rear. The approaching car 1812 and its occupants may pose a threat to the officer driving the police car 1803.

The police car 1803 may include one or more video cameras 1807-1809 integrated with or mounted to parts of the police car 1803. For example, the police car 1803 may include a forward-directed camera 1807, a multi-directional camera 1808, and/or a rearward-directed camera 1809. The forward-directed camera 1807 may be mounted to the windshield or the hood of the car 1803, or may be mounted to or incorporated into a camera system that incorporates the car's rear-view mirror 1810. An exemplary, uniquely-constructed camera system that includes a rear-view mirror assembly and a video camera, as well as an exemplary software process for processing video data captured by the camera, are described in more detail below with respect to FIGS. 19-22. The multi-directional camera 1808 may be mounted to a roof of the car 1803 and provide video capture in the forward and rearward directions. For example, the multi-directional camera system 1808 may include a panoramic video camera having an optical axis perpendicular to the roof of the car 1803 such that the camera captures video in a field of view of 360° horizontal by at least 180° vertical. The rearward-directed camera 1809 may be mounted to the rear window or trunk of the car 1803. One of skill in the art will readily recognize and appreciate that the police car 1803 may include one more cameras mounted at other locations thereof in addition to or instead of the cameras 1807-1809 depicted in FIG. 18.

According to one exemplary embodiment, each camera 1807-1809 includes a lens or lens system, at least one image sensor positioned in light-sensing relation to the lens/lens system, a video processor, a central processor (which may incorporate the video processor), appropriate operational software, and other conventional components necessary to capture video in the applicable direction for the particular camera 1807-1809. Each camera 1807-1809 may also include wireless communication capability to enable the camera's central or video processor to send raw or processed video data to a remote video processing system, communicate alerts to mobile devices executing a complementary application, and/or communicate alerts and/or video data to a remote emergency management system. Each camera 1807-1809 may further include a variety of sensors (e.g., an accelerometer, gyroscope, inertial measurement unit, magnetometer, GPS, etc.) providing outputs to the central or video processor to enable the processor to detect various inertial and locational changes affecting the camera 1807-1809 and/or the police car 1803 incorporating it. Where the camera 1807-1809 performs video analysis locally, the camera's software and hardware may be configured to perform any of the processes described above with respect to FIGS. 2-4, 6, 7, 9-11, and 15-17. The camera's software and hardware may also be configured to perform any of the processes described below with respect to FIGS. 21-26.

Figure 19:
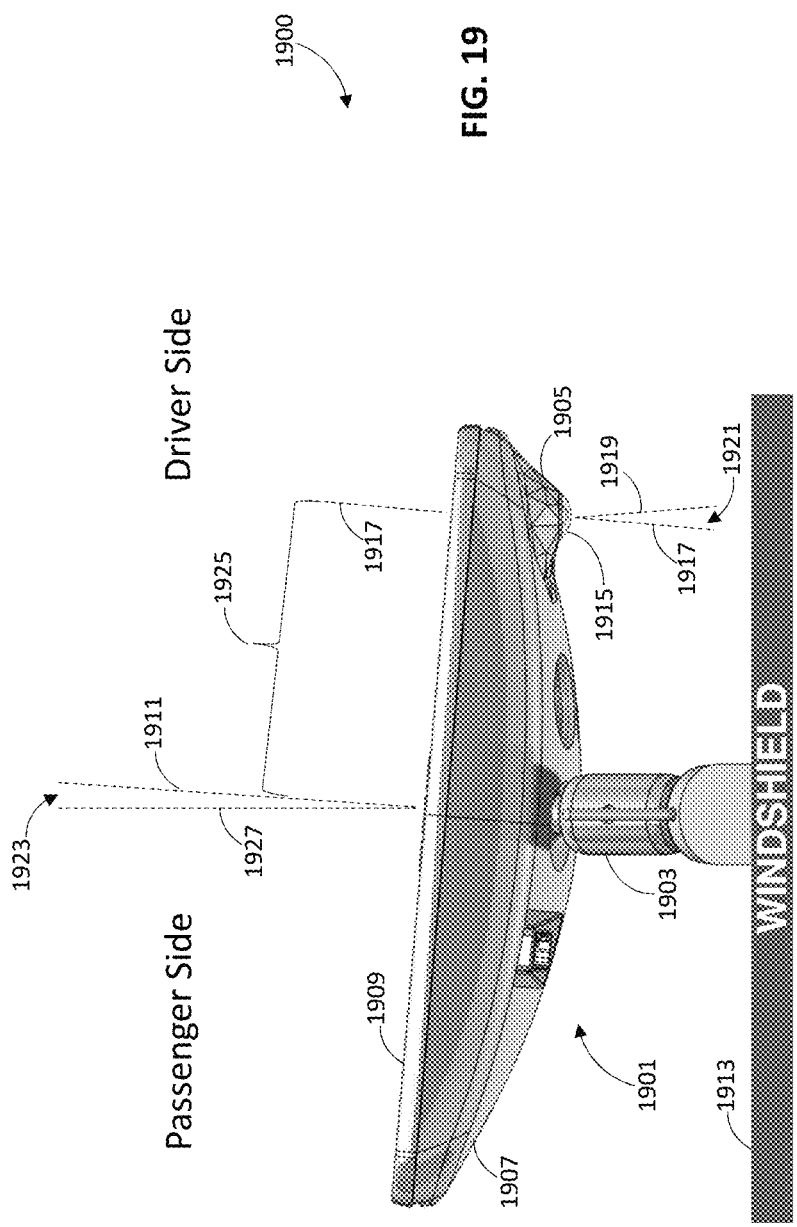
FIG. 19 illustrates a top view of a rear-view mirror assembly with an integrated digital video camera for a use in a vehicle in accordance with another exemplary embodiment of the present disclosure.

FIG. 19 illustrates a top view of a video camera system 1900 in accordance with one exemplary embodiment of the present disclosure. The video camera system 1900 may be used to implement a windshield-attachable camera, such as the forward-directed camera 1807 in the stopped-vehicle use case of FIG. 18. The camera system 1900 includes a rear-view mirror assembly and a video camera 1905. The rear-view mirror assembly includes an adjustable mirror subassembly 1901 pivotally connected to a rigid arm 1903. The mirror subassembly 1901 includes a rear surface 1907 and a front-facing, generally oblong mirror 1909. The mirror subassembly 1901 defines a longitudinal axis 1911 that passes perpendicularly through a center of the mirror 1909. The rigid arm 1903 is attachable to a windshield 1913 of a motor vehicle (e.g., police car 1803).

The video camera 1905 includes, inter alia, a lens 1915, which may be a multi-lens system as well understood in the art. The lens 1915 defines horizontal and vertical fields of view in which images are capturable by the video camera 1905. Each of the horizontal field of view and the vertical field of view may be 150° or greater depending upon the configuration of the selected lens 1915.

The video camera 1905 may be secured to or form part of the rear surface 1907 of the mirror subassembly 1901. In the embodiment depicted in FIG. 19, the video camera 1905 is integrated into the mirror subassembly 1901 with the camera's lens 1915 projecting outward from the rear surface 1907 of the mirror subassembly 1901 at a position closer to an expected location or position of an operator of the motor vehicle into which the video camera system 1900 will be installed. The lens 1915 of the video camera 1905 is positioned such that an optical axis 1919 of the lens 1915 is fixedly oriented at an angle 1921 in a range of about 5° to about 11° toward the expected position of the operator of the motor vehicle (e.g., toward the driver side of the vehicle) relative to an axis 1917 parallel to the longitudinal axis 1911 of the mirror subassembly 1901. The optical axis 1919 of the lens 1915 may be further fixedly oriented at an angle in a range of about 9° to about 21° toward an expected position of a roof of the motor vehicle relative to the axis 1917 parallel to the longitudinal axis 1911 of the mirror subassembly 1901 (see, for example, angle 2033 in FIG. 20). Thus, the optical axis 1919 of the video camera 1905 is pre-oriented during fabrication of the mirror subassembly 1901 or during attachment of the video camera 1905 to the mirror subassembly 1901 so as to be offset toward what would be the driver side of the vehicle (left or right depending upon the country) and/or toward what would be the roof of the vehicle (e.g., upward) to account for the positioning of the video camera 1905 along the rear surface 1907 of the mirror subassembly 1901 and optionally to account for a typical orientation of the mirror subassembly 1901 by an average-size vehicle operator.

In an alternative embodiment, the optical axis 1919 of the lens 1915 may be electronically oriented or steered such that a target capture area within the horizontal and vertical fields of view of the lens 1915 is centered at an angle in the range of about 5° to about 11° toward the expected position of the operator of the motor vehicle relative to an axis 1917 parallel to the longitudinal axis 1911 of the mirror subassembly 1901. Similarly, the optical axis 1919 of the lens 1915 may be further electronically oriented or steered such that a target capture area within the horizontal and vertical fields of view of the lens 1915 is also centered at an angle in a range of about 9° to about 21° toward an expected position of a roof of the motor vehicle relative to the axis 1917 parallel to the longitudinal axis 1911 of the mirror subassembly 1901. The process for performing electronic steering of the lens' optical axis 1917 may be similar to the process described below with respect to FIGS. 21 and 22, where the angular differences (angles) used in such process are fixed in the angular ranges set forth above and the reference longitudinal axis used in such process is the axis 1917 parallel to the longitudinal axis 1911 of the mirror subassembly 1901.

According to one embodiment, the video camera 1905 may be positioned on or along the rear surface 1907 of the mirror subassembly 1901 closer to the expected position of an operator of the motor vehicle than to an expected position of a passenger of the motor vehicle. Alternatively, the video camera 1905 may be positioned on the rear surface 1907 of the mirror subassembly 1901 closer to the expected position of a passenger of the motor vehicle than to an expected position of an operator of the motor vehicle. The angle 1921 of optical axis pre-orientation takes into account the position of the video camera 1905 on the rear surface 1907 of the mirror subassembly 1901, which may include any curvature of the rear surface 1907 of the mirror subassembly 1901 affecting such position. By pre-orienting the optical axis 1919 of the video camera's lens 1915 during manufacture of the video camera system 1900, the video camera 1905 is more likely to capture images directly in front of the windshield 1913 during use of the mirror subassembly 1901 by the vehicle's operator.

The exemplary video camera system 1900 illustrated in FIG. 19 may be considered to form all or part of a single camera version of the video processing system 1400 as generally described above with respect to FIGS. 14-17. Thus, the video camera system 1900 may include, inter alia, video capture, audio capture, motion-sensing, video and/or audio processing, communications, and alerting functionality as was described above with respect to the video processing system 1400 of FIG. 14. Therefore, for purposes of describing the exemplary use case of FIG. 18 and the exemplary video camera systems 1900 and 2000 of FIGS. 19 and 20, reference will be made to the electrical blocks depicted in FIG. 14 as though such blocks form parts of the video cameras 1807-1809 of FIG. 18 and/or the video camera systems 1900, 2000 of FIGS. 19 and 20. The electrical and other components of the video processing system 1400 may be incorporated into the video cameras 1807-1809 of FIG. 18 and/or the camera 1905 or the mirror subassembly 1901 of the video camera system 1900 of FIG. 19.

Figure 20:
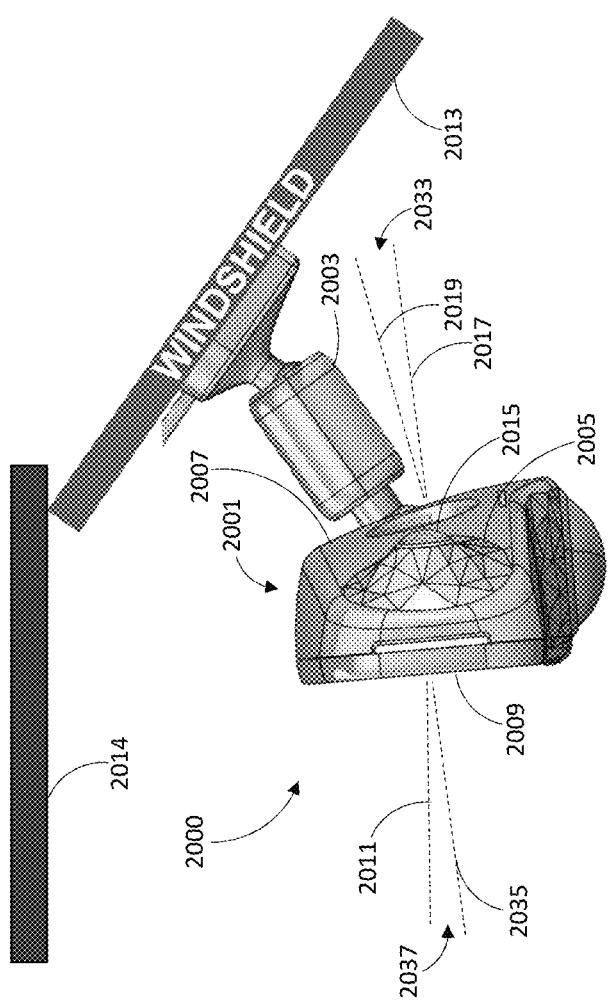
FIG. 20 illustrates a side view of an alternative rear-view mirror assembly with an integrated digital video camera for a use in a vehicle in accordance with another exemplary embodiment of the present disclosure.

FIG. 20 illustrates a side view of an alternative video camera system 2000 in accordance with another exemplary embodiment of the present disclosure. The video camera system 2000 illustrated in FIG. 20 is substantially identical to the video camera system 1900 illustrated in FIG. 19, except that the video camera 2005 is positioned on or along the rear surface 2007 of the mirror subassembly 2001 closer to the expected position of a passenger of the motor vehicle than to an expected position of an operator of the motor vehicle.

Similar to video camera system 1900, video camera system 2000 may be used to implement a windshield-attachable camera, such as the forward-directed camera 1807 in the stopped-vehicle use case of FIG. 18. The camera system 2000 includes a rear-view mirror assembly and a video camera 2005. The rear-view mirror assembly includes an adjustable mirror subassembly 2001 pivotally connected to a rigid arm 2003. The mirror subassembly 2001 includes a rear surface 2007 and a front-facing, generally oblong mirror 2009. The mirror subassembly 2001 defines a longitudinal axis 2011 that passes perpendicularly through a center of the mirror 2009. The rigid arm 2003 is attachable to a windshield 2013 of a motor vehicle (e.g., police car 1803).

The video camera 2005 includes, inter alia, a lens 2015, which may be a multi-lens system as well understood in the art. The lens 2015 defines horizontal and vertical fields of view in which images are capturable by the video camera 2005. Each of the horizontal field of view and the vertical field of view may be 150° or greater depending upon the configuration of the selected lens 2015.

The video camera 2005 may be secured to or form part of the rear surface 2007 of the mirror subassembly 2001. In the embodiment depicted in FIG. 20, the video camera 1905 is integrated into the mirror subassembly 2001 with the camera's lens 2015 projecting outward from the rear surface 2007 of the mirror subassembly 2001 at a position closer to an expected location or position of a passenger of the motor vehicle into which the video camera system 1900 will be installed. The lens 2015 of the video camera 2005 is positioned such that an optical axis 2019 of the lens 2015 is fixedly oriented at an angle in a range of about 5° to about 11° toward the expected position of the operator of the motor vehicle relative to an axis parallel to the longitudinal axis of the mirror subassembly 2001 (e.g., such as illustrated in FIG. 19 and described above with regard to optical axis 1919, angle 1921, and axis 1917). The optical axis 2019 of the lens 2015 may be further fixedly oriented at an angle 2033 in a range of about 9° to about 21° toward an expected position of a roof 2014 of the motor vehicle relative to an axis 2017 parallel to the longitudinal axis 2011 of the mirror subassembly 2001. Thus, the optical axis 2019 of the video camera 2005 is pre-oriented during fabrication of the mirror subassembly 2001 or during attachment of the video camera 2005 to the mirror subassembly 2001 so as to be offset toward what would be the driver side of the vehicle (left or right depending upon the country) and/or toward what would be the roof 2014 of the vehicle (e.g., upward) to account for the positioning of the video camera 2005 along the rear surface 2007 of the mirror subassembly 2001 and optionally to account for a typical orientation of the mirror subassembly 2001 by an average-size vehicle operator. The angle 2033 of optical axis pre-orientation takes into account the position of the video camera 2005 on the rear surface 2007 of the mirror subassembly 2001, which may include a distance 1925 between the longitudinal axis 1911 of the mirror subassembly 1901 and a parallel axis 1917 passing through a center of the camera lens 1915, as well as any curvature of the rear surface 2007 of the mirror subassembly 1901 affecting the camera's position. By pre-orienting the optical axis 2019 of the video camera's lens 2015 during manufacture of the video camera system 2000, the video camera 2005 is more likely to capture images directly in front of the windshield 2013 during use of the mirror subassembly 2001 by the vehicle's operator.

In an alternative embodiment, the optical axis 2019 of the lens 2015 may be electronically oriented or steered such that a target capture area within the horizontal and vertical fields of view of the lens 2015 is centered at an angle in the range of about 5° to about 11° toward the expected position of the operator of the motor vehicle relative to an axis parallel to the longitudinal axis of the mirror subassembly 2001 (e.g., such as illustrated in FIG. 19 and described above with regard to optical axis 1919, angle 1921, and axis 1917). Similarly, the optical axis 2019 of the lens 2015 may be further electronically oriented or steered such that a target capture area within the horizontal and vertical fields of view of the lens 2015 is also centered at an angle in a range of about 9° to about 21° toward an expected position of a roof 2014 of the motor vehicle relative to an axis 2017 parallel to the longitudinal axis 2011 of the mirror subassembly 2001. The process for performing electronic steering of the lens' optical axis 2019 may be similar to the process described below with respect to FIGS. 21 and 22, where the angular differences (angles) used in such process are fixed in the angular ranges set forth above and the reference longitudinal axis used in such process is the axis 2017 parallel to the longitudinal axis 2011 of the mirror subassembly 2001.

Similar to exemplary video camera system 1900, exemplary video camera system 2000 may also be considered to form all or part of a single camera version of the video processing system 1400 as generally described above with respect to FIGS. 14-17. Thus, the video camera system 2000 may include, inter alia, video capture, audio capture, motion-sensing, video and/or audio processing, communications, and alerting functionality as was described above with respect to the video processing system 1400 of FIG. 14. The video camera systems 1900, 2000 of FIGS. 19 and 20 are sufficiently similar that considering them and their respective views together permits a more comprehensive understanding of how either video camera system 1900, 2000 may operate to capture images in front of the vehicle through the windshield 1913, 2013. Thus, both systems 1900, 2000 will be referenced in connection with describing the exemplary video data extraction process flow diagram 2100 of FIG. 21. The process illustrated in FIG. 21 may be executed by a processor 1410 of either system 1900, 2000.

Because the mirror subassembly 1901, 2001 may be pivotally or rotatably moved by an operator of the vehicle in which it is used, the video capture area of the camera 1905, 2005 may likewise move and ultimately capture unwanted images, such as an image of the sky or an image of the hood of the vehicle, instead of or in addition to desired images in front of the vehicle. Thus, in order to increase the likelihood that processed video data includes the most relevant video data (e.g., video data that could include image patterns worthy of tracking), the processor 1410 may execute the logic flow process of FIG. 21 to select a subset of the video data captured by the camera 1905, 2005 for further processing. The selected subset of video data corresponds to a target capture area within the horizontal and vertical fields of view of the video camera's lens 1915, 2015, which corresponds to an area of the windshield 1913, 2013 from which image pattern monitoring is desired. According to one embodiment, the horizontal and vertical fields of view of the video camera's lens 1915, 2015 are at least 10° greater than horizontal and vertical angular dimensions of the target capture area.

Figure 21:
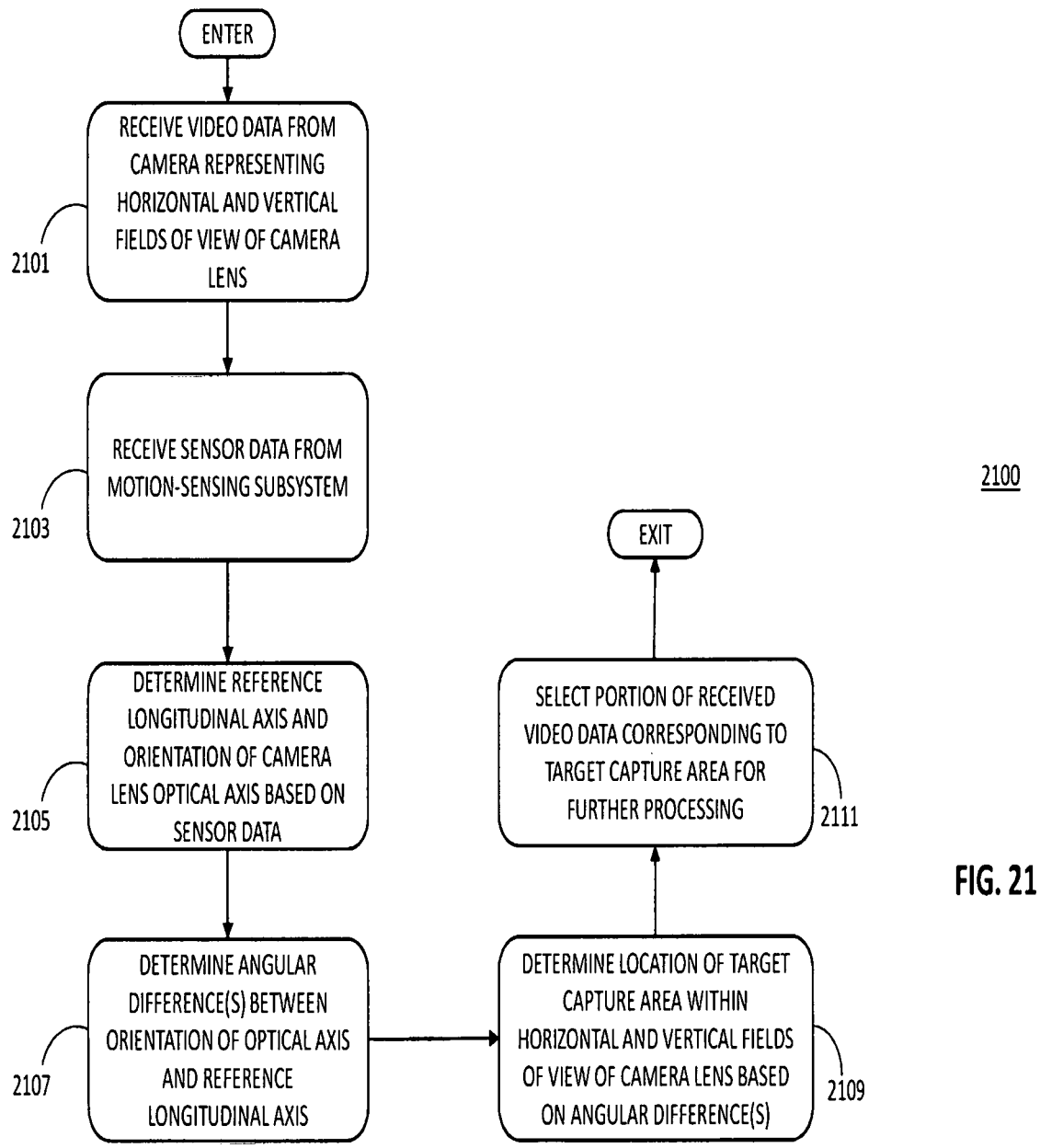
FIG. 21 is a process flow diagram of steps executed by a video processing system to maintain a target capture area within horizontal and vertical fields of view of an in-vehicle or on-vehicle camera responsive to detecting motion of the camera, a rear-view mirror subassembly containing the camera, or the vehicle in or on which the camera is mounted, in accordance with another exemplary embodiment of the present disclosure.

According to the logic flow of FIG. 21, the processor 1410 receives (2101) video data from the video camera 1905, 2005. The video data represents images captured in the horizontal and vertical fields of view of the camera lens 1915, 2015, as may be limited by the capabilities of the selected image sensor(s). The processor 1410 also receives (2103) sensor data from a motion-sensing subsystem 1401 of the video camera system 1901, 2001. The motion-sensing subsystem 1401 may be integrated into the mirror subassembly 1901, 2001 or elsewhere within or on the vehicle and communicates its sensor data to the processor 1410. The motion-sensing subsystem 1401 may include multiple sensors that supply varying types of sensor data to the processor 1410. The types of sensor data that may be supplied include velocity (speed and direction), roll, pitch, yaw, and location. The sensor data may be supplied periodically, upon request from the processor 1410, or otherwise.

After receiving the sensor data, the processor 1410 determines (2105) a reference longitudinal axis and an orientation of the camera lens' optical axis based on such data. For example, the processor 1410 may determine the reference longitudinal axis as the direction in which the vehicle (and the video camera system 1901, 2001) is currently traveling based on the output of an inertial measurement unit (IMU) or other motion sensors within the motion-sensing subsystem 1401. The processor 1410 may also determine a current orientation of the camera lens' optical axis by adjusting a factory present orientation by a change in orientation as detected by the IMU or other motion sensors within the motion-sensing subsystem 1401. As described above, the camera 1905, 2005 and its lens 1915, 2015 may be configured during manufacture of the rear-view mirror assembly such that the lens' optical axis is angled in two or more planes relative to an expected position of the vehicle operator and optionally the expected position of vehicle's roof 2014 to account for, inter alia, the camera's position on or along the rear surface 1907, 2007 of the mirror subassembly 1901, 2001. Therefore, absent sensor data indicating a change in orientation of the mirror subassembly 1901, 2001, the processor 1410 is programmed to determine video data for a target capture area within the video data received from the video camera 1905, 2005, where the target capture area is, for example, in front of the vehicle, centered on the reference longitudinal axis, and substantially parallel to the horizon.

When the mirror subassembly is moved by an operator of the vehicle, the location of the target capture area within the horizontal and vertical fields of view of the video camera lens 1915, 2015 will change if not appropriately compensated. Thus, the processor 1410 must determine how the target capture area has moved within the video data received from the camera 1905, 2005 so as to maintain the target capture area for which video data is utilized as being centered on the reference longitudinal axis and substantially parallel to the horizon. The processor 1410 will then use the new video data from the target capture area to perform image pattern analysis and various other processes as described throughout this specification.

Where the motion-sensing subsystem 1401 has communicated sensor data to the processor indicating that the mirror subassembly 1901, 2001 has been moved from its factory pre-set position, the processor 1410 determines (2107) angular differences or changes between the orientation of the camera lens' optical axis after the movement and the reference longitudinal axis. Depending how the mirror subassembly 1901, 2001 has been moved, the angular differences may be in two or more planes. For example, as illustrated in FIGS. 19 and 20, movement of the mirror subassembly 1901, 2001 may result in changes in the position of the camera lens' optical axis by angles 1923, 2037 in one or more planes relative to the reference longitudinal axis, which may be the same as the longitudinal axis 2011 of the mirror subassembly 2001 under certain circumstances. Such movement of the mirror subassembly 1901, 2001 may cause the longitudinal axis 1911, 2011 of the mirror subassembly 1901, 2001 to move angularly to new positions 1927, 2035 as detected by the motion-sensing subsystem 1401.

After the processor 1410 determines the angular changes made to the camera lens' optical axis as a result of movement of the mirror subassembly 1901, 2001, the processor 1410 determines (2109) a location of the target capture area within the horizontal and vertical fields of view of the camera lens 1915, 2015 based on such angular differences/changes. For example, the processor 1410 may determine the post-movement target capture area as the moved target capture area rotated by angles equal and opposite to the angular differences caused by the movement of the mirror subassembly 1901, 2001. After the target capture area has been determined, the processor 1410 selects (2111) a portion of the received video data corresponding to the video data in the post-movement target capture area and then uses the selected video data for all further processing, including image pattern tracking and suspicious activity detection. In other words, upon electronically returning the target capture area post-movement to its pre-movement location, the video data corresponding to the post-movement target capture area will correspond to a different set of pixels of the camera's image sensor than the video data corresponding to the pre-movement target capture area. While the process of FIG. 21 was described above with respect to movement of the mirror subassembly 1901, 2001, the describe process is equally applicable to account for movement of the camera 1905, 2005 alone, where the camera 1905, 2005 may be movable without necessarily moving the mirror subassembly 1901, 2001.

Figure 22:
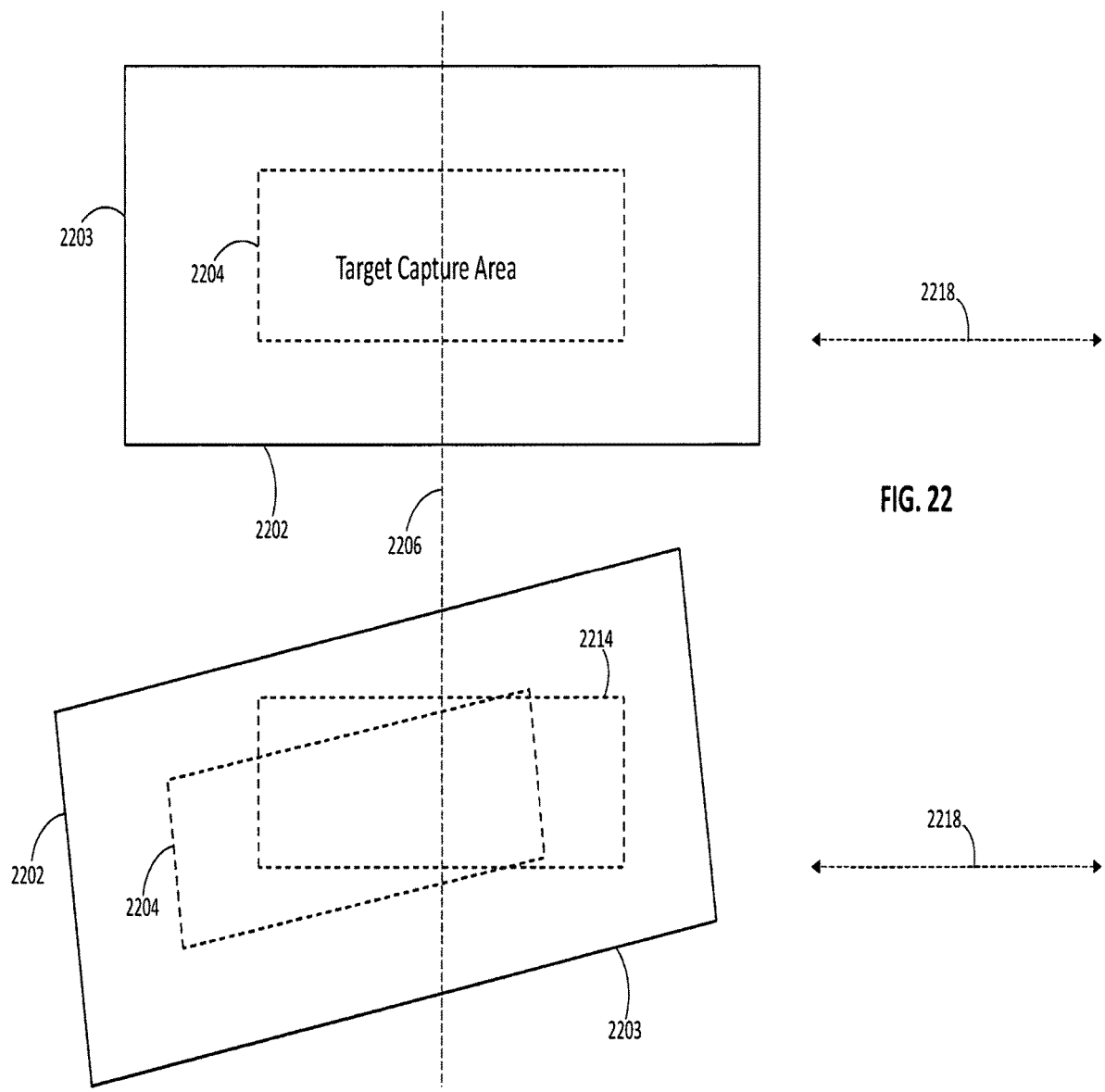
FIG. 22 illustrates maintenance of a target capture area within horizontal and vertical fields of view of an in-vehicle or on-vehicle camera in accordance with the process flow of FIG. 21.

To provide an example of how the process flow of FIG. 21 may be used to electronically maintain the target capture area as being generally centered on a reference longitudinal axis (e.g., as may be determined by the direction of movement of the video camera system and/or vehicle) and substantially parallel to the horizon, reference is made to FIG. 22. As shown in the top illustration of the figure, a target capture area 2204 is approximately centered on a reference longitudinal axis 2206 (which, in this case, also corresponds to the camera lens' optical axis 1919, 2019) and within the horizontal and vertical fields of view 2202, 2203 of the camera's lens 1915, 2015. The top illustration represents the general location of the target capture area 2204 when the video camera system 1900, 2000 is initially installed in the vehicle. As discussed above, the camera's lens 1915, 2015 may be physically constructed such that the lens' optical axis 1919, 2019 is angled within a particular range of angles toward a driver position of the vehicle and/or toward a roof of the vehicle so as to generally center the target capture area 2204 about the reference longitudinal axis 2206 and position the target capture area 2204 substantially parallel to the horizon 2218 (e.g., within +/−10 degrees of the horizon 2218). According to one embodiment, the target capture area 2204 may initially reside within the horizontal and vertical fields of view 2202, 2203 of the video camera's lens 1915, 2015 such that the horizontal and vertical fields of view 2202, 2203 are at least 10° greater than the horizontal and vertical angular dimensions of the target capture area 2204.

From a more technical standpoint, the horizontal and vertical fields of view 2202, 2203 of the camera lens 1915, 2015 generally define the area through which light will pass onto an image sensor positioned in light-receiving relation to the lens 1915, 2015. Thus, the image sensor of the video camera 1905, 2005 detects images present at pixel positions within the entire field of view of the camera 1905, 2005 (i.e., the area defined by the horizontal and vertical fields of view 2202, 2203). However, for purposes of the process shown in FIG. 21, a target capture area 2204 is limited to a subset of the overall field of view of the camera lens 1915, 2015 to enable the processor 1410 to maintain the target capture area substantially in its original position (albeit with a different set of pixel positions on the image sensor) when the optical axis 1919, 2019 of the camera lens 1915, 2015 moves together with movement of either the mirror subassembly 1901, 2001 of the rear-view mirror assembly or the video camera 1905, 2005 alone.

When the operator of the vehicle moves the mirror subassembly 1901, 2001 of the rear-view mirror assembly so as to position the mirror 1909, 2009 in a desired position for viewing traffic behind the vehicle (or alternatively moves the video camera 1905, 2005 alone (when so movable)), the target capture area 2204 moves together with the optical axis 1919, 2019 and the horizontal and vertical fields of view 2202, 2203 of the camera's lens 1915, 2015 as illustrated in an exemplary manner in the bottom illustration of FIG. 22. In such a case and absent processor correction, the target capture area 2204 moves so as to remain centered about the camera lens' optical axis 1919, 2019, but is no longer centered about the reference longitudinal axis 2206 and may no longer be parallel to the horizon 2218. Thus, if the target capture area remains uncorrected, the target capture area may not include a desired view of traffic in front of the vehicle and may include images of the vehicle's hood or other undesirable objects.

In accordance with the process of FIG. 21, movement of the mirror subassembly 1901, 2001 and/or the camera 1905, 2005 is detected by the motion-sensing subsystem 1401, and sensor data supplied by the motion-sensing subsystem 1401 is used by the processor 1410 to reset the target capture area to its original orientation substantially centered about the reference longitudinal axis 2206 and substantially parallel to the horizon 2218. Thus, after execution of the process of FIG. 21, the corrected/maintained target capture area 2214 has the same orientation and position as the original, pre-movement target capture area 2204 shown in the top illustration of FIG. 22. However, due to the movement of the camera lens' optical axis 1919, 2019, the location of target capture area 2214 on the camera's image sensor encompasses a different set of pixel positions than did the original, pre-movement target capture area 2204. To determine which area of pixels on the image sensor represent target capture area 2204 subsequent to movement of the mirror subassembly 1901, 2001 or the video camera 1905, 2005, the processor 1410 uses the sensor data received from the motion-sensing subsystem 1401 to determine angular differences or changes between the orientation of the camera lens' optical axis after the movement and the reference longitudinal axis 2206. In other words, the processor 1410 uses the sensor data to determine how the optical axis of the camera lens 1915, 2015 has moved relative to the reference longitudinal axis 2206. By knowing how the optical axis of the lens 1915, 2015 has repositioned, the processor 1410 can determine how the target capture area 2204, which is centered about the optical axis, has also repositioned due to the movement of the mirror subassembly 1901, 2001 or the video camera 1905, 2005. Having made such a determination, the processor 1410 electronically undoes the repositioning of the target capture area 2204 by selecting the portion of the received video data corresponding to a pixel area representing the target capture area 2214 at its original position.

As shown in the bottom illustration of FIG. 22 and assuming that the image sensor of the camera 1905, 2005 captures images within the area defined by the horizontal and vertical fields of view 2202, 2203 of the lens 1915, 2015, the maintained target capture area 2214 substantially replicates the area size and orientation of the pre-movement target capture area 2204 shown in the top illustration of FIG. 22. However, the maintained target capture area 2214 encompasses a different set of image sensor pixels than does the pre-movement target capture area 2204, although there would likely be some overlap as illustrated in exemplary fashion in the bottom illustration of FIG. 22. The video data from the maintained target capture area 2214 is then used by the processor 1410 to perform other functions, such as image pattern tracking and suspicious activity detection.

Figure 23:
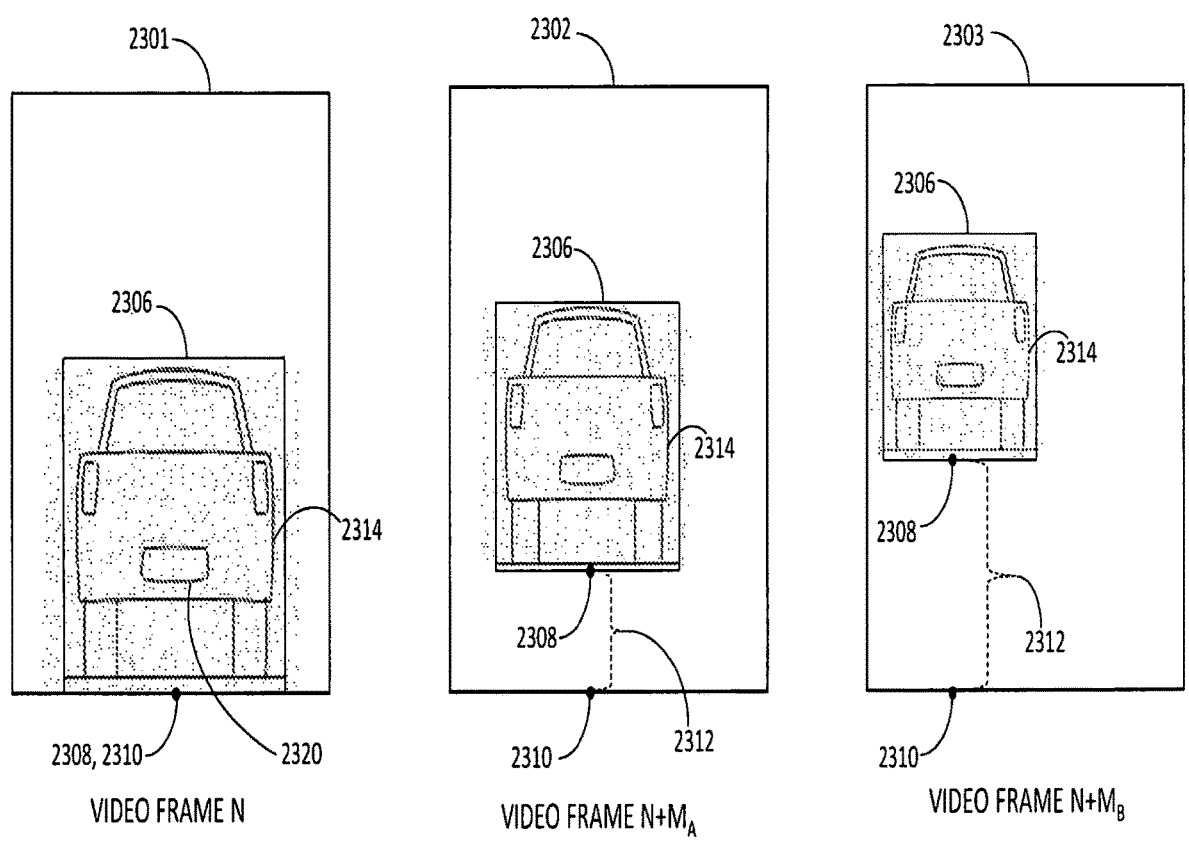
FIG. 23 illustrates an exemplary set of video frames received and analyzed by a video processing system while performing forward suspicious activity detection for the use case of FIG. 18 and incorporating the target capture area maintenance process of FIG. 21.

Referring back to the motor vehicle use case of FIG. 18, suspicious activity detection may be performed by the video processing system 1400 through receipt and analysis of video data from one or more of the exemplary video cameras 1807-1809. For example, FIG. 23 provides one exemplary illustration for how the system processor 1410 may analyze a set of received video frames to perform suspicious activity detection and tracking. According to this embodiment, the processor 1410 receives streaming video data from a camera (e.g., forward-directed camera 1807) and extracts therefrom data representing a video frame 2301 (e.g., Video Frame N in FIG. 23). The processor 1410 compares the video frame data to data representing a set of one or more predefined patterns stored in memory 114 (which may be local memory or remote memory). In the illustrated case, the set of predefined patterns includes one or more patterns for an automobile or other vehicle. Automobile patterns may include patterns for various portions or components of the automobile such as, for example, the roof, windshield, rear window, side window, side door, hood, trunk, front bumper, rear bumper, license plate(s), tires, headlights, rear lights, and so forth, as well as composite patterns that may include one of more individual automobile components (e.g., an automobile composite rear pattern that combines patterns for the roof, rear window, trunk, rear bumper, tail lights (and other rear lights), license plate, side view mirrors, rear tires, and other identifiable components from the perspective of standing behind the automobile and looking toward it). In the example illustrated in FIG. 23, the processor 1410 determines that the outline of the rear of a car 2314 (which could be car 1801 from FIG. 18) is substantially similar to a stored predefined pattern, such as a stored automobile composite rear pattern. In response to such determination, the processor 1410 may define a bounding area 2306 for the detected pattern 2314 by bounding the pattern 2314 with a simpler geometric shape (e.g., a rectangle in this particular case). According to one exemplary embodiment, the processor 1410 may commence pattern tracking upon detecting the predefined pattern 2314 within the video frame 2301 and then defining a tracked pattern bounding area 2306 for the pattern 2314. According to an alternative embodiment having substantially greater processing resources, the automobile composite rear pattern 2314 may be tracked directly without using the easier-to-process bounding area 2306.

According to the embodiment illustrated in FIG. 23, the processor 1410 may set the position of the vehicle (e.g., police car 1803) as the reference origin for images captured by the forward-directed camera 1807 (or the multi-directional camera 1808), if the processor 1410 hasn't already done so when determining whether to commence pattern tracking. Setting the position of the police car 1803 as the reference origin provides a point of view for the processor 1410 to assess suspicious activity that could affect the police officer operating the car 1803, who is the person under surveillance for this example. To evaluate potential suspicious activity, the processor 1410 may monitor the size of the tracked pattern bounding area 2306 over a set of video frames 2302, 2303 that are subsequent to or otherwise later in time than the video frame 2301 that resulted in commencement of pattern tracking in the first place (two video frames 2302, 2303 are shown in the set of subsequent video frames for illustration, but the set may include ten or more video frames as described above). The set of subsequent/later-in-time video frames 2302, 2303 over which a tracked pattern 2314 or its bounding area 2306 is analyzed may be sequential in nature (e.g., using the nomenclature from FIG. 23, $M_A$ may equal "1," $M_B$ may equal "2," and so forth) or may be otherwise selected over the tracking time period (e.g., $M_A$ may equal "5", $M_B$ may equal "10," and so forth based on how the video frames to be analyzed are selected). The video frames 2301-2303 may include video data representing the entire field of view of the applicable camera 1807 (i.e., within the area defined by the camera lens' horizontal and vertical fields of view) or may only include video data representing a target capture area 2204 within the overall field of view of the camera 1807. Use of a target capture area 2204 may be applicable when the camera 1807 is part of a video camera system 1900, 2000, such as those described above with respect to FIGS. 19-22.

When the size of the tracked pattern bounding area 2306 becomes progressively smaller over the set of subsequent video frames 2302, 2303 (e.g., as illustrated in FIG. 23), the processor 1410 may determine that the tracked pattern 2314 is fleeing the scene and, therefore, has changed position in a suspicious manner. To determine whether the tracked pattern bounding area 2306 is becoming smaller over several video frames, the processor 1410 may use statistical processing to analyze the measured bounding area sizes. For example, the processor 1410 may determine a linear regression from the bounding area size data to represent how the size of the tracked pattern bounding area 2306 changes across the set of subsequent video frames 2302, 2303. The processor 1410 may then determine a gradient for the linear regression and compare the gradient to a threshold. For example, in the context of a car 1801 leaving the scene of a traffic stop, the gradient threshold may be set in the range of −0.10 and −0.20, which equates to a 10.0% to 20.0% decrease in bounding area size per second. When the gradient is less than its threshold (a negative number in this case), the processor 1410 determines that the tracked pattern bounding area 2306 is becoming smaller over the set of subsequent video frames 2302, 2303.

Additionally or alternatively, the processor 1410 may be programmed to determine whether the tracked pattern bounding area 2306 is becoming progressively farther from a bottom of each frame 2302, 2303 in the subsequent set of video frames 2302, 2303. For example, where the police car 1803 is set as the reference origin for images captured by the forward-directed camera 1807 (i.e., where the camera 1807 provides a point of view from the front of the police car 1803), movement of the tracked pattern 2314 toward the top of each video frame over multiple video frames indicates that the tracked pattern 2314 may be fleeing the scene and, therefore, has changed position in a suspicious manner. According to this embodiment, the processor 1410 determines a position of a coordinate 2308 along a bottom edge of the tracked pattern bounding area 2306 and a relationship between the position of the coordinate 2308 along the bottom edge of the tracked pattern bounding area 2306 and the reference origin for each video frame 2301-2303 being analyzed. In the example illustrated in FIG. 23, the relationship between the position of the coordinate 2308 along the bottom edge of the tracked pattern bounding area 2306 and the reference origin is a distance 2312 (e.g., pixel distance) between the coordinate 2308 along the bottom edge of the tracked pattern bounding area 2306 and a coordinate 2310 along a bottom edge of the video frame 2301-2303 (or some other defined area within the frame 2301-2303) as defined by the dimensions of the video frame 2301-2303. The coordinate 2308 on the bottom edge of the tracked pattern bounding area 2306 may be approximately centered along the bottom edge of the tracked pattern bounding area 2306 and the coordinate 2310 on the bottom edge of the frame 2301 may be likewise centered along the bottom edge of the frame 2301 as illustrated in frame 2301. However, as illustrated in the other two frames 2302, 2303, the coordinates 2308, 2310 along the bottom edges of the tracked pattern bounding area 2306 and the frame 2302, 2303 may be off-center. In the exemplary scenario depicted in FIG. 23, the coordinate 2308 on the bottom edge of the tracked pattern bounding area 2306 remains centered along the bottom edge of the tracked pattern bounding area 2306, but the coordinate 2310 on the bottom edge of the frame 2302, 2303 moves to the left over time to permit a simple determination of the distance 2312 between the two coordinates 2308, 2310, such as may be the case if the stopped car 1801 fled the scene and attempted to merge back onto the roadway 1805.

To determine whether the tracked pattern bounding area 2306 is becoming progressively farther from the bottom of the frames over the analyzed, later-in-time video frames 2302, 2303, the processor 1410 may use statistical processing to analyze the change in relationship (e.g., distance) between the tracked pattern bounding area 2306 and the bottom of each frame 2302, 2303. For example, the processor 1410 may determine a linear regression from the bounding area edge-to-frame edge distance data to represent how the relationship between the position of the coordinate 2308 along the bottom edge of the tracked pattern bounding area 2306 and the position of the coordinate 2310 along the bottom edge of the frame 2302, 2303 changes across the set of subsequent video frames 2302, 2303. The processor 1410 may then determine a gradient for the linear regression and compare the gradient to a threshold. For example, in the context of a stopped car leaving a traffic stop prematurely, the gradient threshold may be set in the range of 0.10 and 0.15, which equates to a 10% to 15% increase in distance per second. When the gradient is greater than its threshold, the processor 1410 may determine that the tracked pattern bounding area 2306 is becoming farther from the bottom of each frame 2302, 2303 (and, therefore, farther from the reference origin, such as the front of the police car 1803)

over the set of subsequent video frames 2302, 2303. The processor 1410 may analyze bounding area size changes, bounding area positioning relative to a reference origin or other reference point, both bounding area size changes and bounding area positioning, and/or any other video data-based characteristics to make its final determination as to whether a tracked pattern has changed position in a suspicious manner.

In addition to detecting and analyzing an automobile composite rear pattern 2314 for purposes of determining whether a stopped car 1801 is attempting to flee the scene of a traffic stop, the processor 1410 may detect and analyze individual component patterns within the composite pattern 2314. For example, the processor 1410 may compare video frame data to data representing a license plate pattern stored in memory 114. For example, the processor 1410 may compare the various components of the automobile composite rear pattern 2314 to isolate a license plate 2320. Where such a license plate pattern is detected, the processor 1410 may communicate an image of the license plate to a motor vehicle department computer system for further analysis.

Figure 24:
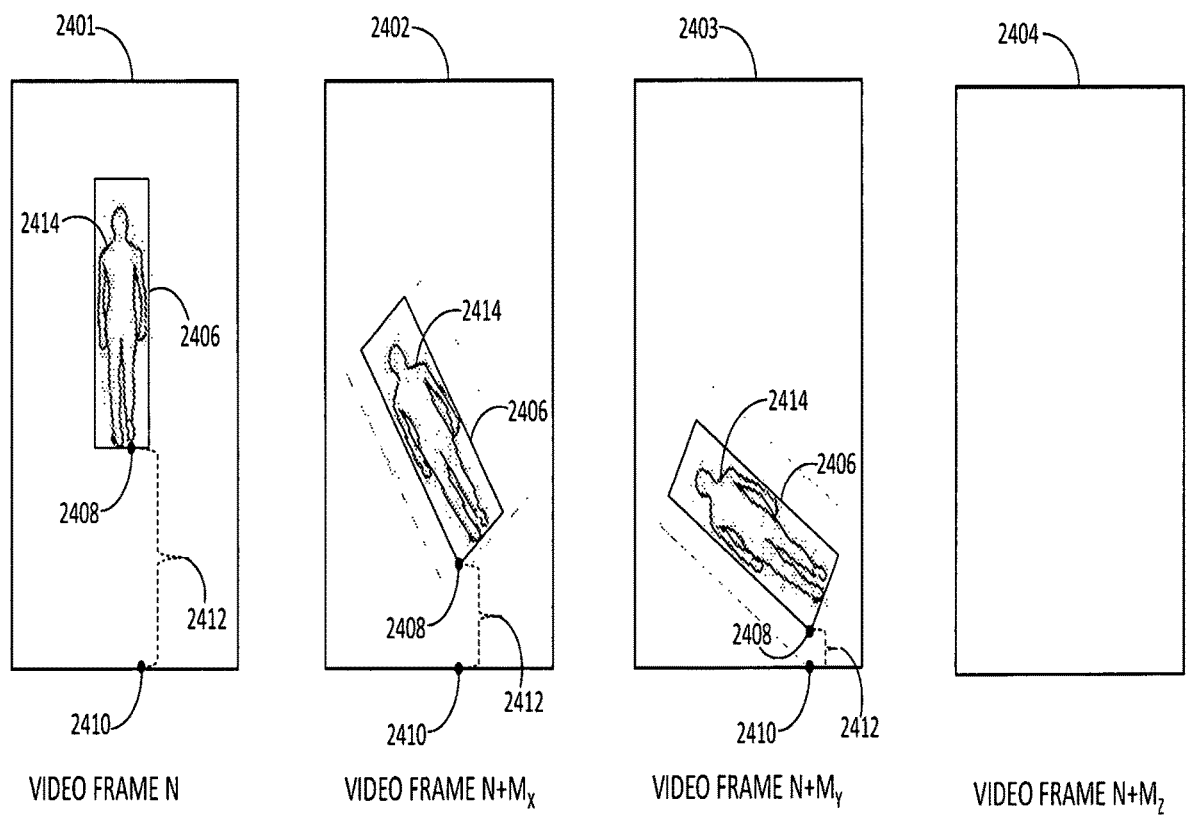
FIG. 24 illustrates an alternative exemplary set of video frames received and analyzed by a video processing system while performing forward suspicious activity detection (man down detection) and incorporating the target capture area maintenance process of FIG. 21.

FIG. 24 provides another exemplary illustration for how the system processor 1410 may analyze a set of received video frames to perform suspicious activity detection and tracking in connection with the traffic stop use case of FIG. 18. More particularly, the embodiment shown in FIG. 24 illustrates how the processor 1410 may utilize pattern tracking to detect a man-down (or officer-down) situation during a traffic stop or otherwise. According to this embodiment, the processor 1410 receives streaming video data from a camera 1807-1809 and extracts therefrom data representing a video frame 2401 (e.g., Video Frame N in FIG. 24). The processor 1410 compares the video frame data to data representing a set of one or more predefined patterns stored in memory 114 (which may be local memory or remote memory). In the illustrated case, the set of predefined patterns may include one or more patterns for features of a police officer in general, for features of a person in general, and/or for features of the actual person under surveillance (i.e., the police officer at the scene). In the example illustrated in FIG. 24, the processor 1410 determines that the outline of a person 2414 resembling the officer under surveillance is substantially similar to a stored predefined pattern. In response to such determination, the processor 1410 may define a bounding area 2406 for the detected pattern 2414 by bounding the pattern 2414 with a simpler geometric shape (e.g., a rectangle in this particular case). According to one exemplary embodiment, the processor 1410 may commence pattern tracking upon detecting the predefined pattern 2414 within the video frame 2401 and then defining a tracked pattern bounding area 2406 for the pattern 2414. According to an alternative embodiment having substantially greater processing resources, the officer pattern 2414 may be tracked directly without using the easier-to-process bounding area 2406.

To evaluate potential suspicious activity (e.g., a man down), the processor 1410 may monitor a variety of parameters or features of the tracked pattern bounding area 2406 over a set of video frames 2402-2404 that are subsequent to or otherwise later in time than the video frame 2401 that resulted in commencement of pattern tracking in the first place (three video frames 2402-2404 are shown in the set of subsequent video frames for illustration, but the set may include ten or more video frames as described above). The set of subsequent/later-in-time video frames 2402-2404 over which a tracked pattern 2414 or its bounding area 2406 is analyzed may be sequential in nature (e.g., using the nomenclature from FIG. 24, $M_x$ may equal "1," $M_y$ may equal "2," $M_z$ may equal "3," and so forth) or may be otherwise selected over the tracking time period (e.g., $M_x$ may equal "5", $M_y$ may equal "10," $M_z$ may equal "15," and so forth based on how the video frames to be analyzed are selected). The video frames 2401-2404 may include video data representing the entire field of view of the applicable camera 1807-1809 (i.e., within the area defined by the camera lens' horizontal and vertical fields of view) or may only include video data representing a target capture area 2204 within the overall field of view of the camera 1807-1809. Use of a target capture area 2204 may be applicable when the camera 1807 is part of a video camera system 1900, 2000, such as those described above with respect to FIGS. 19-22.

According to this exemplary embodiment, one feature of the tracked pattern bounding area 2406 that may be monitored during the later-in-time video frames 2402-2404 is movement of the tracked pattern bounding area 2406, and the speed thereof, over time relative to the ground or a bottom of the frame 2402-2404. The monitoring of such movement and speed may enable the processor 1410 to determine whether a man-down condition exists. For example, the processor 1410 may be programmed to determine whether the tracked pattern bounding area 2406 has moved downward rapidly over a sequence of video frames representing a predetermined time period (e.g., five seconds or less). If the processor 1410 detects such a rapid downward movement, the processor 1410 may determine that the tracked pattern 2414 has changed position in a suspicious manner and may communicate an emergency message relating to a man-down condition to an emergency management system operated by law enforcement, for example.

According to one embodiment, the processor 1410 may estimate downward movement of the of the tracked pattern bounding area 2406 by determining whether the tracked pattern bounding area 2406 is becoming rapidly closer to a bottom of each video frame 2402, 2403 of a set of video frames 2402, 2403 analyzed over the predetermined time period and/or whether the tracked pattern bounding area 2406 has moved so far downward that it is no longer in the video frame, such as shown in frame 2404. For example, movement of the tracked pattern 2414 toward and/or past the bottom of each video frame over multiple video frames indicates that the tracked pattern 2414 may be approaching or has hit the ground and, therefore, has changed position in a suspicious manner. According to this embodiment, the processor 1410 may determine a position of a coordinate 2408 along a bottom edge of the tracked pattern bounding area 2406 and a relationship between the position of the coordinate 2408 along the bottom edge of the tracked pattern bounding area 2406 and the reference origin for each video frame 2401-2403 being analyzed. In the example illustrated in FIG. 24, the relationship between the position of the coordinate 2408 along the bottom edge of the tracked pattern bounding area 2406 and the reference origin is a distance 2412 (e.g., pixel distance) between the coordinate 2408 along the bottom edge of the tracked pattern bounding area 2406 and a coordinate 2410 along a bottom edge of the video frame 2401-2403 (or some other defined area within the frame 2401-2403) as defined by the dimensions of the video frame 2401-2403. The coordinate 2408 on the bottom edge of the tracked pattern bounding area 2406 may be approximately centered along the bottom edge of the tracked pattern bounding area 2406. The coordinate 2410 on the bottom edge of each frame 2401-2403 may be likewise centered along the bottom edge of the frame 2401-2403. Alternatively, the coordinates 2408, 2410 along the bottom edges of the tracked pattern bounding area 2406 and the frame 2401-2403 may be off-center. For example, processor 1410 may select three points along the bottom edge of the tracked pattern bounding area 2406 (e.g., two corners and the center) and measure distances (e.g., pixel distances) between the selected points and the bottom edge of the frame 2401-2403. The processor 1410 may then select the bounding area bottom edge point that produces the shortest distance as the coordinate on the bottom edge of the tracked pattern bounding area 2406 for the particular frame 2401-2403. In the exemplary scenario depicted in FIG. 24, the coordinate 2408 on the bottom edge of the tracked pattern bounding area 2406 may be determined to be centered in frame 2401 and at a corner in frames 2402, 2403. By contrast, the coordinate 2410 on the bottom edge of each frame 2401-2403 may remain centered in the frame 2401-2403. In frame 2404, the tracked pattern 2414 has dropped out of the camera's field of view and, therefore, is not present in the frame 2404.

To determine whether the tracked pattern bounding area 2406 is rapidly approaching the bottom of frames 2402, 2403 over the analyzed, later-in-time video frames 2402-2404, the processor 1410 may use statistical processing to analyze the change in relationship (e.g., distance) between the tracked pattern bounding area 2406 and the bottom of each frame 2402, 2403. For example, the processor 1410 may determine a linear regression from the bounding area edge-to-frame edge distance data to represent how the relationship between the position of the coordinate 2408 along the bottom edge of the tracked pattern bounding area 2406 and the position of the coordinate 2410 along the bottom edge of the frame 2402, 2403 changes across the set of subsequent video frames 2402, 2403. The processor 1410 may then determine a gradient for the linear regression and compare the gradient to a threshold. For example, in the context of a person falling to the ground from a standing position, the gradient threshold may be set in the range of −0.50 and −0.75, which equates to a 50% to 75% decrease in distance per second. When the gradient is less than its threshold, the processor 1410 may determine that the tracked pattern bounding area 2406 is moving downward rapidly over the predetermined time period. Alternatively, the processor 1410 may, upon detecting that the gradient is below its threshold, analyze video data for additional video frames (e.g., video frame 2404) to further assist in determining whether the tracked pattern 2414 is no longer detectable or whether the tracked pattern 2414 or its bounding area 2404 is at or near the bottom of the video frames and not changing/moving. The combination of rapid downward motion of the tracked pattern 2414 over the predetermined period of time and subsequent loss of detection or non-movement of the tracked pattern 2414 may be used as a trigger to communicate an emergency message to an emergency management system for a potential man-down situation.

Figure 25:
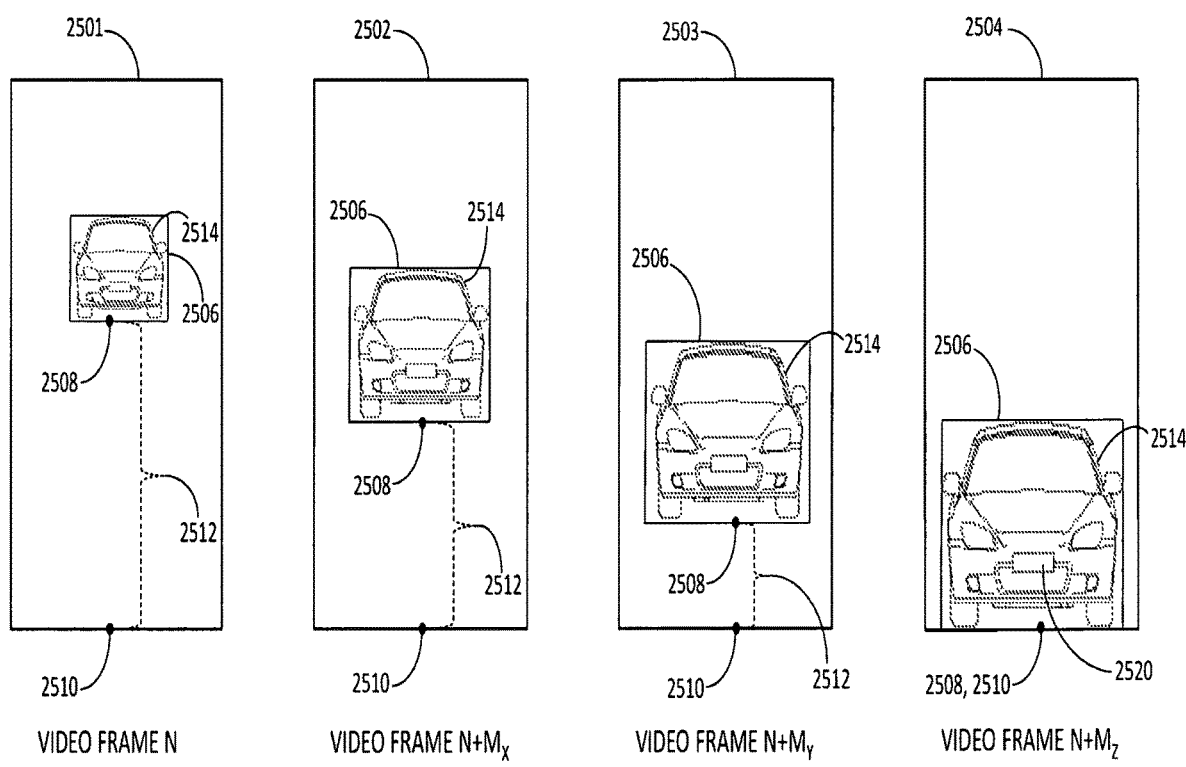
FIG. 25 illustrates an alternative exemplary set of video frames received and analyzed by a video processing system while performing rearward suspicious activity detection for the use case of FIG. 18.

FIG. 25 provides yet another exemplary illustration for how the system processor 1410 may analyze a set of received video frames to perform suspicious activity detection and pattern tracking in connection with the traffic stop use case of FIG. 18. According to this embodiment, the processor 1410 receives streaming video data from a camera (e.g., the rearward-directed camera 1809 or the multi-directional camera 1808) arranged to capture images from behind the police car 1803 and extracts therefrom data representing a video frame 2501 (e.g., Video Frame N in FIG. 25). The processor 1410 compares the video frame data to data representing a set of one or more predefined patterns stored in memory 114 (which may be local memory or remote memory). In the illustrated case, the set of predefined patterns includes one or more patterns for an automobile or other vehicle. As discussed above with respect to FIG. 23, automobile patterns may include patterns for various portions or components of the automobile, as well as composite patterns that may include one or more individual automobile components (e.g., an automobile composite front pattern that combines patterns for the roof, windshield, hood, front bumper, headlights (and other front lights), license plate, side view mirrors, front tires, and other identifiable components from the perspective of standing in front of an automobile and looking back toward it). In the example illustrated in FIG. 25, the processor 1410 determines that the outline of the front of a car 2514 (which could be car 1812 from FIG. 18) is substantially similar to a stored predefined pattern, such as a stored automobile composite front pattern. In response to such determination, the processor 1410 may define a bounding area 2506 for the detected pattern 2514 by bounding the pattern 2514 with a simpler geometric shape (e.g., a rectangle in this particular case). According to one exemplary embodiment, the processor 1410 may commence pattern tracking upon detecting the predefined pattern 2514 within the video frame 2501 and then defining a tracked pattern bounding area 2506 for the pattern 2514. According to an alternative embodiment having substantially greater processing resources, the automobile composite front pattern 2514 may be tracked directly without using the easier-to-process bounding area 2506.

According to the embodiment illustrated in FIG. 25, the processor 1410 may set the position of the vehicle (e.g., police car 1803) as the reference origin for images captured by the rearward-directed camera 1809 (or the multi-directional camera 1808), if the processor 1410 hasn't already done so when determining whether to commence pattern tracking. Setting the position of the police car 1803 as the reference origin provides a point of view for the processor 1410 to assess suspicious activity from the rear of the vehicle that could affect the police officer operating the car 1803, who is the person under surveillance again for this example. To evaluate potential suspicious activity, the processor 1410 may monitor the size of the tracked pattern bounding area 2506 over a set of video frames 2502-2504 that are subsequent to or otherwise later in time than the video frame 2501 that resulted in commencement of pattern tracking in the first place (three video frames 2502-2504 are shown in the set of subsequent video frames for illustration, but the set may include ten or more video frames as described above). The set of subsequent/later-in-time video frames 2502-2504 over which a tracked pattern 2514 or its bounding area 2506 is analyzed may be sequential in nature (e.g., using the nomenclature from FIG. 25, $M_x$ may equal "1," $M_y$ may equal "2," $M_z$ may equal "3," and so forth) or may be otherwise selected over the tracking time period (e.g., $M_x$ may equal "5", $M_y$ may equal "10," $M_z$ may equal "15," and so forth based on how the video frames to be analyzed are selected). The video frames 2501-2504 may include video data representing the entire field of view of the applicable camera 1809 (i.e., within the area defined by the camera lens' horizontal and vertical fields of view) or may only include video data representing a target capture area 2204 within the overall field of view of the camera 1809. Use of a target capture area 2204 may be applicable when the camera 1809 is part of a video camera system 1900, 2000, such as those described above with respect to FIGS. 19-22.

When the size of the tracked pattern bounding area 2506 becomes progressively larger over the set of subsequent video frames 2502-2504 (e.g., as illustrated in FIG. 25), the processor 1410 may determine that the tracked pattern 2514 is approaching the police car 1803 and, therefore, has changed position in a suspicious manner. To determine whether the tracked pattern bounding area 2306 is becoming larger over several video frames, the processor 1410 may use statistical processing to analyze the measured bounding area sizes. For example, the processor 1410 may determine a linear regression from the bounding area size data to represent how the size of the tracked pattern bounding area 2506 changes across the set of subsequent video frames 2502-2504. The processor 1410 may then determine a gradient for the linear regression and compare the gradient to a threshold. For example, in the context of a car 1812 approaching the police car 1803 from the rear, the gradient threshold may be set in the range of 0.05 and 0.10, which equates to a 5.0% to 10.0% increase in bounding area size per second. When the gradient is greater than its threshold, the processor 1410 determines that the tracked pattern bounding area 2506 is becoming larger over the set of subsequent video frames 2502-2504.

Additionally or alternatively, the processor 1410 may be programmed to determine whether the tracked pattern bounding area 2506 is becoming progressively closer to a bottom of each frame 2502-2504 in the subsequent set of video frames 2502-2504. For example, where the police car 1803 is set as the reference origin for images captured by the rearward-directed camera 1809 (i.e., where the camera 1809 provides a point of view from the rear of the police car 1803), movement of the tracked pattern 2514 toward the bottom of each video frame over multiple video frames indicates that the tracked pattern 2514 may be drawing nearer to the police car 1803 and, therefore, has changed position in a suspicious manner. According to this embodiment, the processor 1410 determines a position of a coordinate 2508 along a bottom edge of the tracked pattern bounding area 2506 and a relationship between the position of the coordinate 2508 along the bottom edge of the tracked pattern bounding area 2506 and the reference origin for each video frame 2501-2504 being analyzed. In the example illustrated in FIG. 25, the relationship between the position of the coordinate 2508 along the bottom edge of the tracked pattern bounding area 2506 and the reference origin is a distance 2512 (e.g., pixel distance) between the coordinate 2508 along the bottom edge of the tracked pattern bounding area 2506 and a coordinate 2510 along a bottom edge of the video frame 2501-2504 (or some other defined area within the frame 2501-2504) as defined by the dimensions of the video frame 2501-2504. The coordinate 2508 on the bottom edge of the tracked pattern bounding area 2506 may be approximately centered along the bottom edge of the tracked pattern bounding area 2506 and the coordinate 2510 on the bottom edge of each frame 2501-2504 may be likewise centered along the bottom edge of the frame 2501-2504. Alternatively, the coordinates 2508, 2510 along the bottom edges of the tracked pattern bounding area 2506 and the frame 2501-2504 may be off-center. In the exemplary scenario depicted in FIG. 25, the coordinate 2508 on the bottom edge of the tracked pattern bounding area 2506 and the coordinate 2510 on the bottom edge of each frame 2501-2504 remain centered in the frame 2501-2504. In frame 2504, the bottom edge of the tracked pattern bounding area 2506 is shown to have reached the bottom edge of the frame 2504; thus, the coordinate 2508 on the bottom edge of the tracked pattern bounding area 2506 and the coordinate 2510 on the bottom edge of the frame 2504 are collocated.

To determine whether the tracked pattern bounding area 2506 is becoming progressively closer to the bottom of frames over the analyzed, later-in-time video frames 2502-2504, the processor 1410 may use statistical processing to analyze the change in relationship (e.g., distance) between the tracked pattern bounding area 2306 and the bottom of each frame 2502-2504. For example, the processor 1410 may determine a linear regression from the bounding area edge-to-frame edge distance data to represent how the relationship between the position of the coordinate 2508 along the bottom edge of the tracked pattern bounding area 2506 and the position of the coordinate 2510 along the bottom edge of the frame 2502-2504 changes across the set of subsequent video frames 2502-2504. The processor 1410 may then determine a gradient for the linear regression and compare the gradient to a threshold. For example, in the context of a car 1812 approaching the stopped police car 1803, the gradient threshold may be set in the range of −0.10 and −0.20, which equates to a 10% to 20% decrease in distance per second. When the gradient is less than its threshold, the processor 1410 may determine that the tracked pattern bounding area 2506 is becoming closer to the bottom of each frame 2502-2504 (and, therefore, closer to the reference origin, such as the rear of the police car 1803) over the set of subsequent video frames 2502-2504. The processor 1410 may analyze bounding area size changes, bounding area positioning relative to a reference origin or other reference point, both bounding area size changes and bounding area positioning, and/or any other video data-based characteristics to make its final determination as to whether a tracked pattern has changed position in a suspicious manner.

In addition to detecting and analyzing an automobile composite front pattern 2514 for purposes of determining whether an approaching car 1812 may pose a threat to a police officer executing a traffic stop, the processor 1410 may detect and analyze individual component patterns within the composite pattern 2514. For example, the processor 1410 may compare video frame data to data representing a license plate pattern stored in memory 114. For example, the processor 1410 may compare the various components of the automobile composite front pattern 2514 to isolate a license plate 2520. Where such a license plate pattern is detected, the processor 1410 may communicate an image of the license plate 2520 to a motor vehicle department computer system for further analysis.

The suspicious activity detection and pattern tracking process described above with respect to FIG. 25 may also or alternatively be performed by the processor 1410 or another processor (such as a processor of the camera capturing the video), where the video data analyzed in the process is captured by a camera secured to the body of the person under surveillance. In other words, the process of FIG. 25 may be similarly applied to video data supplied by the officer's, or another wearer's, body camera (e.g., camera 501) from the scene of an incident, such as a traffic stop. The application of such a process to body cam-supplied video data was described above in an exemplary manner with respect to FIG. 6. In this case, the predefined patterns may include component patterns (e.g., vehicle components, human body components, etc.) and composite patterns (e.g., vehicle composite patterns, human body composite patterns, etc.) as generally described above.

Figure 26:
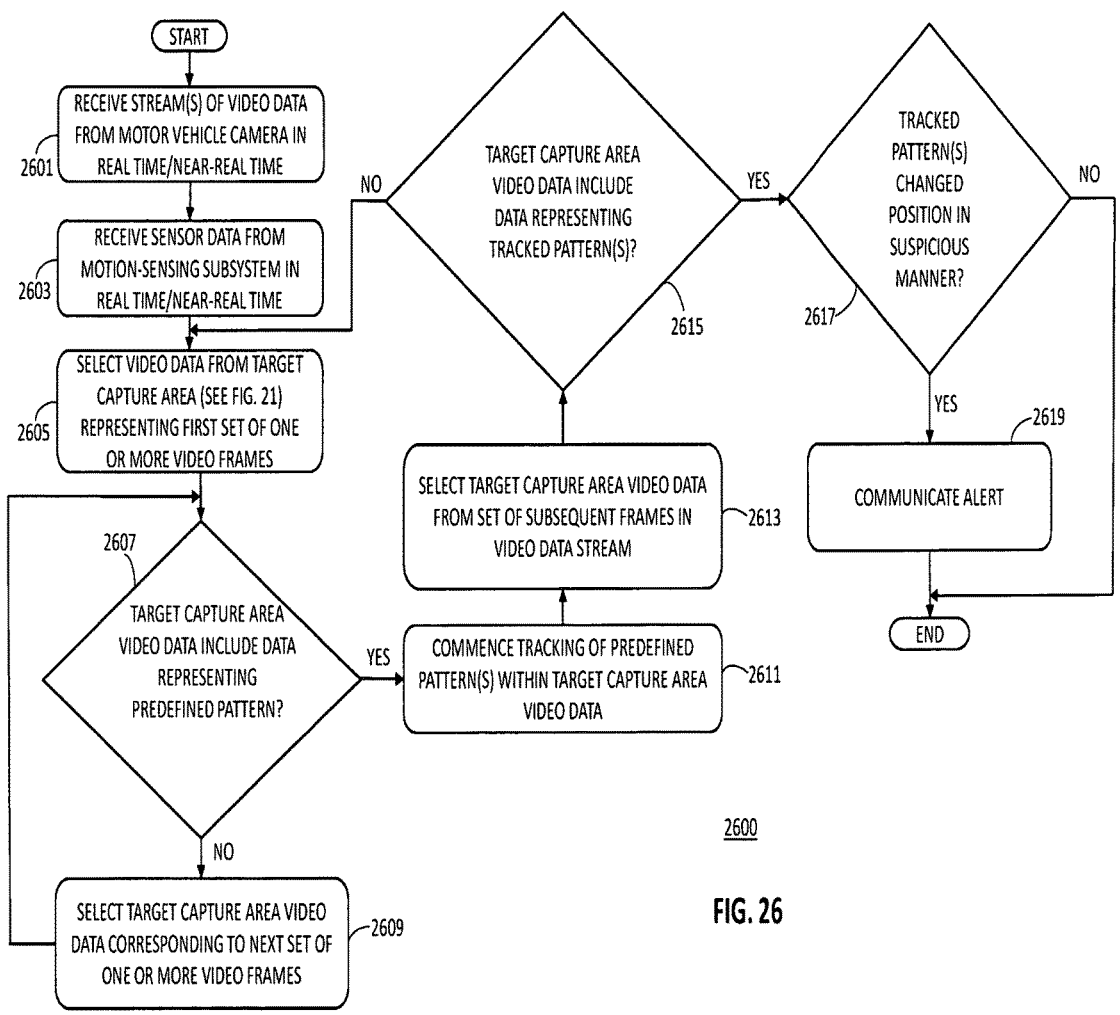
FIG. 26 is a process flow diagram of steps executed by a processor of a video processing system, which is performing the target capture area maintenance process of FIG. 21, to determine whether a tracked pattern in one or more received video streams has changed positioned in a suspicious manner, in accordance with yet another exemplary embodiment of the present disclosure.

FIG. 26 illustrates a process flow diagram 2600 of steps executed by a processor 1410 of a video processing system

1400, which is performing the target capture area maintenance/correction process of FIG. 21, to determine whether a tracked pattern in one or more received video streams has changed positioned in a suspicious manner, in accordance with yet another exemplary embodiment of the present disclosure. According to this embodiment, the processor 1410 receives (2601) one or more video data streams from one or more motor vehicle video cameras 101-104, such as the police car cameras 1807-1809 shown in FIG. 18. For example, the processor 1410 may receive video data from a rear-view mirror video camera system 1900, 2000 serving as the forward-directed camera 1807 of the police car 1803, which in turn is a camera 101 of the video processing system 1400.

In addition to receiving a video data stream from the motor vehicle camera 1807, the processor 1410 receives (2603) sensor data from a motion-sensing subsystem 1401 of the video processing system 1400. The processor 1410 uses the sensor data in the process discussed above with respect to FIG. 21 to determine a target capture area 2214 within the video data. Where the video processing system 1400 further includes audio detection capability (e.g., one or more microphones 1402), the processor 1410 may receive an audio data stream that is time-synchronized with the video data stream. The audio data may be analyzed and used to insert markers into the video data as discussed above with regard to FIG. 15.

Having identified the target capture area 2214, the processor 1410 selects (2605) data from the target capture area 2214 representing a set of one or more video frames based on the video streaming protocol and the video codec used by the camera 1807 and the video processor 1410. Responsive to selecting target capture area video data for a first set of video frames, the processor 1410 determines (2607) whether the video frame data includes data representing one or more predefined patterns. As discussed above with respect to FIGS. 1, 4, 9, and 15, the processor 1410 may compare portions of the video frame data to data representative of a set of predefined patterns previously stored in memory 114 to determine whether a video frame or any portion thereof includes data substantially similar to data representing a predefined pattern. The predefined patterns may include, inter alia, object patterns, animal patterns, general human image patterns, and specific human image patterns. For example, the system memory 114 may include one or more databases of human image patterns representing images of persons who may be subject to surveillance by the video processing system 1400 over time.

When the video frame data does not include data representing one or more predefined patterns, the processor 1410 selects (2609) data from the target capture area 2214 representing a next set of one or more video frames and determines (2607) whether that video frame data includes data representing one or more predefined patterns. When the target capture area video data for the first set of video frames includes data representing one or more predefined patterns (or when the target capture area video data for a later set of video frames includes predefined pattern data where the target capture area video data for an earlier set of video frames did not), the processor 1410 commences tracking (2611) of the detected pattern or patterns within the target capture area video data and selects (2613) data from the target capture area 2214 representing one or more subsequent or otherwise later-in-time sets of video frames from the video data stream.

The processor 1410 analyzes the later-in-time video frame data to determine (2615) whether such video frame data continues to include the tracked pattern or patterns. Pattern tracking may be performed using bounding areas, such as those described above with respect to FIGS. 3, 6, 7, 16, 17, and 23-25. For example, a bounding area may be defined by the processor 1410 for each predefined pattern that is detected. The bounding areas may then be monitored for changes over time to determine whether a tracked pattern changes position in a suspicious manner. The process of defining bounding areas and using them for identification and tracking purposes substantially reduces the processing resources necessary to reliably track patterns over large quantities of video frames.

If target capture area video data for the subsequent set of video frames includes the tracked pattern or patterns, the processor 1410 determines (2617) whether the tracked pattern(s) has changed position in a suspicious manner. Otherwise, the processor 1410 selects (2605) video data from the target capture area 2214 representing the next subsequent set of one or more video frames and the process repeats from decision block 2607.

To determine whether a tracked pattern has changed position in a suspicious manner, the processor 1410 analyzes movement of the tracked pattern over multiple video frames. For example, the processor 1410 may determine, based on the tracking, whether the tracked pattern is moving toward the person under surveillance, moving away from the person under surveillance, falling down, getting up, moving left, moving right, and so forth. According to one exemplary embodiment, the video processor 1410 may utilize a process similar to the one described above with respect to FIG. 6 to analyze video data from a camera (e.g., camera 101) positioned in or on the motor vehicle (e.g., vehicle 1803) that transported the person under surveillance to the current location. The processor 1410 may determine from the video data analysis that the tracked pattern is approaching or moving away from the person under surveillance and/or the stopped motor vehicle, either of which may be deemed a suspicious change of position of the tracked pattern depending on other factors, such as the position and rate of approach or departure, and/or the presence of another predefined pattern in the video data (e.g., the pattern for a weapon). The processor 1410 may alternatively or additionally determine from the video data analysis that a tracked pattern, such as a door or window, has opened or closed, which may be considered suspicious depending on the context as determined by the processor 1410 based on other image patterns detected in the video data and/or audio patterns detected in received audio data.

A variety of exemplary processes for determining whether a tracked image pattern has changed position in a suspicious manner are described above. Such processes may be applied in connection with decision block 2617 of FIG. 26 where the video data used in such processes is from a target capture area 2214 that is less than the area defined by the horizontal and vertical fields of view 2202, 2203 of the camera's lens 1915, 2015.

When the processor 1410 determines that one or more tracked patterns have changed position in a suspicious manner, the processor 1410 communicates (2619) an alert to the person under surveillance and/or a third party (e.g., an emergency management system) as to the suspicious activity. For example, the processor 1410 may activate a local alert, such as activate an audible and/or visual alarm or send an audio message to a local sound speaker, to notify the person under surveillance (e.g., the police officer or officers on scene). Alternatively, the processor 1410 may communicate, via the communication interface 108, an alert message to a mobile application executing on a wireless communication device carried by the person under surveillance (e.g., smartphone, cellular phone, tablet computer, personal digital assistant). In the latter case, the alert message may cause the mobile application to activate an audible alarm and/or a haptic alarm of the wireless communication device to notify the person of the potential threat. Still further, the processor 1410 may communicate, via the communication interface 108, at least some of the video data from the analyzed video stream (e.g., the last ten seconds or 300 video frames) to a mobile video processing and display application executing on a wireless communication device carried by the person under surveillance. In this case, the mobile application may be configured to automatically play and display the received video to enable the person under surveillance to assess the potential threat and react thereto as necessary. Still further, the processor 1410 may communicate, via the communication interface 108, an emergency message to a remote emergency management system to inform an operator of the system (e.g., a police office or 911 emergency operator) as to potential suspicious activity at the location of the person under surveillance, including, without limitation, the possibility of a man-down, injured officer, or other urgent situation. The emergency alert message may include the video data that served as the basis for the processor 1410 to issue the emergency alert message.

In addition to detecting and analyzing target capture area video data to determine whether such data shows a predefined pattern moving suspiciously, the processor 1410 may analyze target capture area video data to detect individual component patterns within a composite predefined pattern, such as a composite front pattern 2514 or a composite rear pattern 2314 for a vehicle. For example, the processor 1410 may compare target capture area video data to data representing a license plate pattern stored in memory 114. Where such a license plate pattern is detected, the processor 1410 may communicate an image of the license plate 2320, 2520 to a motor vehicle department computer system for further analysis.

Additional embodiments of the processes and systems disclosed above may perform various additional functions and provide a variety of additional features in connection with using video analysis and pattern tracking to monitor for suspicious activity and otherwise serve to protect a person under surveillance. For example, according to one additional embodiment, the video processing system 1400 (e.g., through operation of the processor 1410) may determine whether the motor vehicle (e.g., police car 1803) that includes the video camera 101 or cameras 101-104 (e.g., cameras 1807-1809) has come to a stop and, if so, activate the video camera(s) 101-104. In other words, according to this embodiment, the vehicle-based cameras would be automatically activated when the vehicle stopped. To determine that the vehicle has stopped, video processing system 1400 may utilize the motion-sensing subsystem 1401 and the processor 1410. For example, the processor 1410 may determine that the vehicle stopped based on sensor data received from the motion-sensing subsystem 1401. Alternatively, the processor 1410 may be connected to the vehicle's on-board diagnostic system to enable the processor 1410 to detect when the vehicle has stopped.

According to another embodiment, the cameras 101-104 of the video processing system 100, 1400 may include a body camera 501, 1301 secured to the body of the person under surveillance, and the video processing system 100, 1400, through operation of its processor 110, 1410, may remotely activate the body camera responsive to determining that received video data representing a set of one or more video frames includes data representing one or more predefined patterns. In other words, according to this embodiment, the video processor 110, 1410 remotely actives the body camera 501, 1301 after detecting the presence of one or more predefined patterns in video data received from one or more other cameras 101-104, 502-510, 1807-1809. To remotely activate the body camera, the video processor 110, 1410 may communicate an activation signal to the body camera 501, 1301 via the communication interface 108. After the body camera is activated, it becomes an active camera in the video processing system 100, 1400 and communicates video data to the video processor 100, 1400. The video processor 100, 1400 may then record the body cam video data in memory 114.

According to yet another embodiment, the video processing system 100, 1400 may be used to detect and report a rollover or other sudden impact to a vehicle monitored by the video processing system 100, 1400. For this embodiment, the video processing system 100, 1400 includes or is coupled to one or more motion-sensing subsystems 1401. The motion-sensing subsystem 1401 may be incorporated into a camera 101, 502, 1807 or may be installed elsewhere in the vehicle. According to this embodiment, the video processing system 100, 1400, through operation of its processor 110, 1410, receives sensor data from at least one motion-sensing subsystem 1401. The sensor data may indicate changes in inertia and other movement of the motion-sensing subsystem 1401. Responsive to receiving sensor data indicating a rapid change in inertia of the video camera 101, 502, 1807, the motor vehicle 1803, 522 in which a person under surveillance (e.g., police officer, guard, messenger, courier, etc.) is travelling, or both, the video processing system may determine an orientation of the motor vehicle based upon such sensor data. In other words, depending on the configuration of the motion-sensing subsystem 1401, the sensor data supplied by the motion-sensing subsystem 1401 may enable to determine whether the vehicle rolled over and now remains upright, on its side, or upside down. The processor 110, 1410 may then communicate an emergency message to an emergency management system responsive to determining that the orientation of the motor vehicle is abnormal (e.g., on its side or upside down) or that the change in inertia indicates a rollover has occurred. Therefore, the video processing system 100, 1400 may include or interact with a motion-sensing subsystem 1401 to monitor for accidents or other incidents involving a vehicle that includes one or more cameras 502, 1807-1809 forming part of the video processing system 100, 1400. Upon detecting such an incident, an emergency message may be sent to emergency management authorities to facilitate expedited action to be taken.

According to yet another embodiment, the video processing system 100, 1400 may, through operation of its processor 110, 1410, insert and store a digital marker in video data received from a camera 101-104, 502, 1807-1809 responsive to receiving sensor data indicating a rapid change in inertia of the video camera 101, 502, 1807-1809, the motor vehicle 1803, 522 in which a person under surveillance (e.g., police officer, guard, messenger, courier, etc.) is travelling, or both. In other words, the video processor 110, 1410 may insert and store a digital marker in video data received by a camera 101, 502, 1807-1809 so as to identify the time at which the processor 110, 1410 received sensor data from a motion-sensing subsystem 1401, which sensor data indicated a rapid change in inertia of the video camera 101, 502, 1807-1809, the motor vehicle 1803, 522, or both. Marking the video in such a manner enables a person later investigating the accident or other incident to quickly view stored video from the time at which the incident occurred.

According to yet another embodiment, the video processing system 100, 1400 may, through operation of its processor 110, 1410, provide man-down detection and reporting after a rollover or other incident involving a vehicle transporting a person under surveillance by the video processing system 100, 1400. According to this embodiment, at least one of the system cameras 101-104 has a video capture area that includes an area within a cabin of the motor vehicle 1803, 522. Responsive to receiving sensor data from the motion-sensing subsystem 1401 indicating a rapid change in inertia of the video camera 101, 502, 1807-1809, the motor vehicle 1803, 522, or both, the video processor 110, 1410 may determine from video data capturing the inside of the vehicle's cabin whether a portion of a body of the person under surveillance is present within the video capture area(s) of the camera(s) and is moving. If, through analyzing the video data for the vehicle cabin, the video processor 110, 1410 determines that a portion of the body of the person under surveillance is within the vehicle's cabin but not moving, the video processor 110, 1410 may communicate, via the communication interface 108, an emergency message to an emergency management system. Thus, according to this embodiment, the video processing system 100, 1400 can be used to monitor and report emergency situations related to vehicular accidents involving a person under surveillance when the person appears to be seriously injured during the accident.

According to yet another embodiment, the video processing system 100, 1400 may, through operation of its processor 110, 1410 and the communication interface 108, be informed as to the status of system cameras 101-104, 502, 1807-1809 through receipt of messages indicating whether the cameras (e.g., image sensors) are active or inactive (i.e., on or off). The processor 110, 1410 can delay receiving video data for a camera until it first receives a data message from the camera indicating that the camera is active. Thus, the video processor 110, 1410 can withhold allocating resources to process video data from a camera until the camera has notified the video processor 110, 1410 that the camera is active. Additionally, if the video processor 110, 1410 determines that it has not received, within a preset amount of time (e.g., a preset amount of time after the video processor 110, 1410 detects that it is within communication range of the camera), a status message from the camera indicating that the camera is active, the video processor 110, 1410 may communicate a control message to the camera instructing the camera to activate and begin communicating video data to the video processor 110, 1410. For example, where the system cameras include a body camera 501 secured to the body of a person, which may be the person under surveillance, and a data message from the body camera 501 does not indicate that the body camera has been activated, the video processor 110, 1410 may communicate a control message to the body camera 501 causing the body camera 501 to activate and begin communicating video data to the video processor 110, 1410. Such a procedure may be used to keep the body camera 501 from transmitting video until instructed to do so in order to conserve the body cam's battery or to delay body cam transmissions until one or more other cameras are also transmitting, such as the vehicle-mounted cameras 1807-1809.

While several examples have been provided above with respect to detecting and tracking objects and people in connection with detecting suspicious activity and potential threats, the attached independent claims are not intended to be limited to such examples unless such claims include expressly limiting language. The disclosed examples are merely intended to assist those of skill in the art with an understanding of the various processes and systems that may be constructed using video analysis to track and detect suspicious activity and/or potential threats while conducting safety monitoring of a person under surveillance.

The present disclosure describes automated, human intervention-less, video analysis-based suspicious activity detection systems and methods. With such systems and methods, video data may be analyzed locally or in the cloud to determine, in real time or near real time, the presence of a potential threat or other suspicious behavior to a person located in or proximate to the video capture area(s) of camera(s) that produced the analyzed video data. Where suspicious behavior is detected, the systems and methods may alert the person under surveillance or an emergency management system in real time or near real time to give the person an opportunity to take defensive action or to allow emergency personnel to quickly respond to the suspicious activity. The systems and methods may also forward the received videos, as optionally augmented to include overlays highlighting the pattern or patterns being tracked as suspicious, to security or emergency personnel so as to enable such personnel to promptly respond to the activity. The systems and methods described herein are particularly, though not exclusively, advantageous for enhancing the protection of persons involved in providing cash management or transport services, package delivery services, public safety services, and other services that are provided in a mobile manner and have a higher than normal risk of being subject to criminal or other illicit activity.

As detailed above, embodiments of the disclosed systems and methods reside primarily in combinations of method steps and apparatus components related to detecting potential threats to persons based on real-time or near real-time video analysis. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, the drawings, and the appended claims, relational terms such as "first" and "second," "top" and "bottom," and the like may be used solely to distinguish one entity or action from another entity or action without necessarily requiring or implying any actual such relationship or order between such entities or actions. The terms "comprises," "comprising," "includes," "including," "has," "having," "contains," "containing," and any other variations thereof are intended to cover a non-exclusive inclusion, such that a process, method, article, apparatus, or system that comprises, includes, has, or contains a list of elements, characteristics, or features does not include only those elements but may include other elements not expressly listed or inherent to such process, method, article, apparatus, or system. The term "plurality of" as used in connection with any object or action means two or more of such object or action. A claim element proceeded by the article "a" or "an" does not, without more constraints, preclude the existence of additional identical elements in the process, method, article, apparatus, or system that includes the element.

In the foregoing specification, specific embodiments of the claimed invention have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of claimed invention. For example, it is expected that one of ordinary skill in the art, notwithstanding possibly significant effort and many design choices motivated by, for example, available time, current technology, and economic considerations, when guided by the concepts and principles disclosed herein will be readily capable of generating software instructions or programs and configuring integrated circuits and other hardware to implement the methods and systems recited in the appended claims without undue experimentation. The benefits, advantages, solutions to problems, and any element(s) that may cause any benefit, advantage, or solution to occur or become more pronounced are not to be construed as critical, required, or essential features or elements of any or all the claims. The present invention is defined solely by the appended claims including any amendments made during the pendency of this application and all equivalents of those claims as issued.

What is claimed is:

1. A method for detecting suspicious activity in a vicinity of a motor vehicle, the method comprising:
   receiving, by a processor of a video processing system, video data in real time or near real time from a video camera pivotally mounted in or to the motor vehicle, the video data including data representing a plurality of time-sequenced video frames, the video camera capturing images within a video capture area proximate the motor vehicle, the video capture area being defined by horizontal and vertical fields of view of a lens of the video camera;
   receiving, by the processor, sensor data in real time or near real time from a motion-sensing subsystem mounted in or to the motor vehicle, the sensor data indicating at least one of a change in orientation of the video camera, a change in orientation of the motor vehicle, and a direction of movement of the motor vehicle, the video data and the sensor data being time-synchronized;
   determining, by the processor based upon the sensor data, a reference longitudinal axis and an orientation of an optical axis of the lens of the video camera, the reference longitudinal axis corresponding to the direction of movement of the motor vehicle;
   determining, by the processor, one or more angular differences between the orientation of the optical axis of the lens of the video camera and the reference longitudinal axis;
   determining, by the processor based upon the one or more angular differences, a location of a target capture area within the horizontal and vertical fields of view of the lens of the video camera, wherein the target capture area is within the video capture area, centered on the reference longitudinal axis, and substantially parallel to a horizon;
   selecting, by the processor on a video frame-by-video frame basis, a portion of the video data received from the video camera corresponding to the target capture area to produce target capture area video data;
   determining, by the processor, whether the target capture area video data for a first set of one or more video frames of the plurality of video frames includes data representing one or more predefined patterns; and
   responsive to determining that the target capture area video data for the first set of video frames includes data representing the one or more predefined patterns, tracking, by the processor, the one or more predefined patterns within the target capture area video data to produce one or more tracked patterns.

2. The method of claim 1, wherein tracking the one or more predefined patterns within the target capture area video data comprises:
   defining, by the processor, a bounding area for a tracked pattern of the one or more tracked patterns to produce a tracked pattern bounding area; and
   monitoring, by the processor, for changes to the tracked pattern bounding area over time within the target capture area.

3. The method of claim 1, further comprising:
   determining, by the processor, whether the motor vehicle has come to a stop; and
   activating the video camera, by the processor, responsive to determining that the motor vehicle has come to a stop.

4. The method of claim 1, further comprising:
   responsive to determining that the target capture area video data in the first set of video frames includes data representing the one or more predefined patterns, remotely activating, by the processor, a body camera secured to an operator of the motor vehicle; and
   receiving and storing, by the processor, video data from the activated body camera.

5. The method of claim 1, wherein the one or more tracked patterns includes a pattern of a license plate, the method further comprising:
   communicating, by the processor, an image of the license plate to a motor vehicle department computer system for analysis.

6. The method of claim 1, further comprising:
   determining, by the processor, whether the sensor data indicates a rapid change in inertia of at least one of the motor vehicle and the video camera;
   responsive to determining that the sensor data indicates a rapid change in inertia of at least one of the motor vehicle and the video camera, inserting, by the processor, a digital marker within the video data at a time at which the sensor data was received; and
   storing, by the processor, the digital marker within the video data.

7. The method of claim 1, wherein the video capture area includes an area within a cabin of the motor vehicle, the method further comprising:
   determining, by the processor, whether the sensor data indicates a rapid change in inertia of at least one of the motor vehicle and the video camera;
   responsive to determining that the sensor data indicates a rapid change in inertia of at least one of the motor vehicle and the video camera, determining, by the processor from the video data, whether a body portion of an operator of the motor vehicle is present within the video capture area and moving; and
   communicating, by the processor, an emergency message to an emergency management system responsive to determining that a body portion of the motor vehicle operator is within the video capture area but not moving.

8. The method of claim 1, further comprising:
prior to receiving video data from the video camera, receiving, by the processor from the video camera, a data message indicating that the video camera has been activated; and
responsive to receiving the data message, communicating, by the processor, a control message to a body camera secured to a body of an operator of the motor vehicle, the control message causing the body camera to activate and begin communicating video data to the video processing system.

9. The method of claim 1, wherein the video camera operates together with at least one microphone, the method further comprising:
receiving, by the processor, audio data in real time or near real time from the at least one microphone, the audio data being time-synchronized with the video data;
responsive to receiving the audio data, determining, by the processor, whether the audio data includes data representing one or more predefined audio patterns;
responsive to determining that the audio data includes data representing a predefined audio pattern, inserting, by the processor, a digital marker within the video data at a time at which the predefined audio pattern commenced; and
storing, by the processor, the digital marker within the video data.

10. A method for detecting suspicious activity in a vicinity of a motor vehicle, the method comprising:
receiving, by a processor of a video processing system, video data in real time or near real time from a video camera pivotally mounted in or to the motor vehicle, the video data including data representing a plurality of time-sequenced video frames, the video camera capturing images within a video capture area proximate the motor vehicle, the video capture area being defined by horizontal and vertical fields of view of a lens of the video camera;
receiving, by the processor, sensor data in real time or near real time from a motion-sensing subsystem mounted in or to the motor vehicle, the sensor data indicating at least one of a change in orientation of the video camera and a direction of movement of the motor vehicle, the video data and the sensor data being time-synchronized;
determining, by the processor based upon the sensor data, a reference longitudinal axis and an orientation of an optical axis of a lens of the video camera, the reference longitudinal axis corresponding to the direction of movement of the motor vehicle;
determining, by the processor, one or more angular differences between the orientation of the optical axis of the lens of the video camera and the reference longitudinal axis;
determining, by the processor based upon the one or more angular differences, a location of a target capture area within the horizontal and vertical fields of view of the lens of the video camera, wherein the target capture area is within the video capture area, centered on the reference longitudinal axis, and substantially parallel to a horizon;
selecting, by the processor on a video frame-by-video frame basis, a portion of the video data received from the video camera corresponding to the target capture area to produce target capture area video data;
determining, by the processor, whether the target capture area video data for a first set of one or more video frames of the plurality of video frames includes data representing one or more predefined patterns;
responsive to determining that the target capture area video data for the first set of video frames includes data representing the one or more predefined patterns, tracking, by the processor, the one or more predefined patterns within the target capture area video data to produce one or more tracked patterns;
determining, by the processor, whether the target capture area video data for a second set of one or more video frames of the plurality of video frames includes data representing the one or more tracked patterns, wherein images in the second set of video frames were captured later in time than images in the first set of video frames;
responsive to determining that the target capture area video data for the second set of video frames includes data representing the one or more tracked patterns, determining, by the processor, whether the one or more tracked patterns have changed position in a suspicious manner; and
responsive to determining that the one or more tracked patterns have changed position in a suspicious manner, communicating, by at least the processor, an alert.

11. The method of claim 10, wherein tracking the one or more predefined patterns within the target capture area video data comprises:
defining, by the processor, a bounding area for a tracked pattern of the one or more tracked patterns to produce a tracked pattern bounding area; and
monitoring, by the processor, for changes to the tracked pattern bounding area over time within the target capture area.

12. The method of claim 11, wherein determining whether the one or more tracked patterns have changed position in a suspicious manner comprises:
setting, by the processor, a position of the motor vehicle as a reference origin for images captured by the video camera;
determining, by the processor, whether the tracked pattern bounding area is becoming at least one of progressively smaller and progressively farther from a bottom edge of the target capture area in the second set of video frames based upon the target capture area video data in the second set of video frames; and
responsive to determining that the tracked pattern bounding area is becoming at least one of progressively smaller and progressively farther from a bottom edge of the target capture area in the second set of video frames, determining, by the processor, that the tracked pattern has changed position in a suspicious manner.

13. The method of claim 12, wherein determining whether the tracked pattern bounding area is becoming progressively smaller in the second set of video frames comprises:
determining, by the processor, a size of the tracked pattern bounding area in each video frame of the second set of video frames to produce bounding area size data, wherein target capture area video data representing each video frame of the second set of video frames includes data representing the tracked pattern;
determining, by the processor based on the bounding area size data, a linear regression to represent how the size of the tracked pattern bounding area changes across the second set of video frames;
determining, by the processor, a gradient for the linear regression;
comparing, by the processor, the gradient to a threshold; and determining, by the processor, that the tracked pattern bounding area is becoming progressively smaller in the second set of video frames when the gradient is less than the threshold.

14. The method of claim 12, wherein determining whether the tracked pattern bounding area is becoming progressively farther from a bottom edge of the target capture area in the second set of video frames comprises:
   determining, by the processor, a position of a coordinate along a bottom edge of the tracked pattern bounding area in each video frame of the second set of video frames to produce bottom coordinate position data, wherein the target capture area video data in each video frame of the second set of video frames includes data representing the tracked pattern;
   determining, by the processor based on the bottom coordinate position data, a relationship between the position of the coordinate along the bottom edge of the tracked pattern bounding area and a position of a coordinate along the bottom edge of the target capture area for each video frame of the second set of video frames to produce bottom coordinate relationship data;
   determining, by the processor based on the bottom coordinate relationship data, a linear regression to represent how the relationship between the position of the coordinate along the bottom edge of the tracked pattern bounding area and the position of the coordinate along the bottom edge of the target capture area changes across the second set of video frames;
   determining, by the processor, a gradient for the linear regression;
   comparing, by the processor, the gradient to a threshold; and
   determining, by the processor, that the tracked pattern bounding area is becoming progressively farther from the bottom of the target capture area when the gradient is greater than the threshold.

15. The method of claim 11, wherein the tracked pattern is a pattern corresponding to at least one feature of an operator of the motor vehicle and wherein determining whether the one or more tracked patterns have changed position in a suspicious manner comprises:
   determining, by the processor, whether the tracked pattern bounding area moved downward rapidly over a sequence of video frames representing a time period of five seconds or less; and
   responsive to determining that the tracked pattern bounding area moved downward rapidly over a sequence of video frames representing a time period of five seconds or less, determining, by the processor, that the tracked pattern has changed position in a suspicious manner.

16. The method of claim 15, wherein communicating an alert comprises:
   communicating, by at least the processor, an emergency message to an emergency management system.

17. A system for detecting suspicious activity in a vicinity of a motor vehicle, the system comprising:
   a video camera pivotally mounted in or to the motor vehicle and positioned to capture images of a video capture area proximate the motor vehicle, the video capture area being defined by horizontal and vertical fields of view of a lens of the video camera, the video camera being operable to output video data in real time or near real time based upon the captured images, the video data including data representing a plurality of time-sequenced video frames;
   a motion-sensing subsystem mounted in or to the motor vehicle, the motion-sensing subsystem being operable to output sensor data in real time or near real time, the sensor data indicating at least one of a change in orientation of the video camera and a direction of movement of the motor vehicle, the video data and the sensor data being time-synchronized; and
   a video processing apparatus communicatively coupled to the video camera and the motion-sensing subsystem, the video processing apparatus including:
      at least one communication interface operable to receive the video data from the video camera and the sensor data from the motion-sensing subsystem; and
      a video processor operably coupled to the at least one communication interface and operable in accordance with a set of operating instructions to:
         determine, based upon the sensor data, a reference longitudinal axis and an orientation of an optical axis of the lens of the video camera, the reference longitudinal axis corresponding to the direction of movement of the motor vehicle;
         determine one or more angular differences between the orientation of the optical axis of the lens of the video camera and the reference longitudinal axis;
         determine, based upon the one or more angular differences, a location of a target capture area within the horizontal and vertical fields of view of the lens of the video camera, wherein the target capture area is within the video capture area, centered on the reference longitudinal axis, and substantially parallel to a horizon;
         select, on a video frame-by-video frame basis, a portion of the video data received from the video camera corresponding to the target capture area to produce target capture area video data; and
         determine whether the target capture area video data for a first set of one or more video frames of the plurality of video frames includes data representing one or more predefined patterns.

18. The system of claim 17, wherein the video processor is further operable in accordance with the set of operating instructions to:
   responsive to determining that the target capture area video data for the first set of video frames includes data representing the one or more predefined patterns, track the one or more predefined patterns within the target capture area video data to produce one or more tracked patterns;
   determine whether the target capture area video data for a second set of one or more video frames of the plurality of video frames includes data representing the one or more tracked patterns, wherein images in the second set of video frames were captured later in time than images in the first set of video frames;
   responsive to determining that the target capture area video data for the second set of video frames includes data representing the one or more tracked patterns, determine whether the one or more tracked patterns have changed position in a suspicious manner; and
   responsive to determining that the one or more tracked patterns have changed position in a suspicious manner, communicate an alert.

19. The system of claim 17, wherein the video processor is further operable in accordance with the set of operating instructions to:
   responsive to determining that the target capture area video data in the first set of video frames includes data representing the one or more predefined patterns, remotely activate a body camera secured to an operator of the motor vehicle; and receive and store video data received from the activated body camera.

20. The system of claim 17, wherein the video camera is secured to or forms part of a rear-view mirror assembly of the motor vehicle and is positioned to capture images from in front of the motor vehicle.

* * * * *